(12) United States Patent
Cai et al.

(10) Patent No.: US 12,479,848 B2
(45) Date of Patent: Nov. 25, 2025

(54) SUBSTITUTED FUSED HETEROAROMATIC BICYCLIC COMPOUNDS AS KINASE INHIBITORS AND THE USE THEREOF

(71) Applicant: IMPACT THERAPEUTICS (SHANGHAI), INC, Shanghai (CN)

(72) Inventors: Sui Xiong Cai, Shanghai (CN); Ye Edward Tian, Shanghai (CN); Xiaozhu Wang, Nanjing (CN)

(73) Assignee: IMPACT THERAPEUTICS (SHANGHAI), INC, Shanghai (CN)

( * ) Notice: Subject to any disclaimer, the term of this patent is extended or adjusted under 35 U.S.C. 154(b) by 836 days.

(21) Appl. No.: 17/618,362

(22) PCT Filed: Jun. 24, 2020

(86) PCT No.: PCT/CN2020/098159
§ 371 (c)(1),
(2) Date: Dec. 10, 2021

(87) PCT Pub. No.: WO2020/259601
PCT Pub. Date: Dec. 30, 2020

(65) Prior Publication Data
US 2022/0267332 A1 Aug. 25, 2022
US 2023/0242533 A9 Aug. 3, 2023

(30) Foreign Application Priority Data

Jun. 28, 2019 (CN) .......................... 201910587419.4
Dec. 26, 2019 (CN) .......................... 201911386062.X

(51) Int. Cl.
| | | |
|---|---|---|
| C07D 487/04 | (2006.01) | |
| A61K 31/5377 | (2006.01) | |
| A61K 45/06 | (2006.01) | |
| A61P 35/00 | (2006.01) | |
| A61P 35/02 | (2006.01) | |
| C07D 519/00 | (2006.01) | |

(52) U.S. Cl.
CPC ........ C07D 487/04 (2013.01); A61K 31/5377 (2013.01); A61K 45/06 (2013.01); A61P 35/00 (2018.01); A61P 35/02 (2018.01); C07D 519/00 (2013.01)

(58) Field of Classification Search
CPC ..... A61K 31/5377; A61K 45/06; A61P 35/00; A61P 35/02; C07D 471/04; C07D 487/04; C07D 519/00
See application file for complete search history.

(56) References Cited

U.S. PATENT DOCUMENTS

| | | |
|---|---|---|
| 3,915,968 A | 10/1975 | Bellasio et al. |
| 4,016,162 A | 4/1977 | Bellasio et al. |
| 6,194,410 B1 | 2/2001 | Bos et al. |
| 9,260,425 B2 | 2/2016 | Do et al. |
| 9,340,546 B2 | 5/2016 | Ahmad et al. |
| 2012/0059162 A1 | 3/2012 | Kusakabe et al. |
| 2013/0072481 A1 | 3/2013 | Liang |
| 2013/0150353 A1 | 6/2013 | Meng et al. |
| 2017/0283440 A1 | 10/2017 | Chesworth et al. |
| 2024/0059695 A1* | 2/2024 | Cai .......... A61P 35/02 |

FOREIGN PATENT DOCUMENTS

| | | |
|---|---|---|
| CN | 1236780 A | 12/1999 |
| CN | 1505509 A | 6/2004 |
| CN | 102875549 A | 1/2013 |
| CN | 103068391 A | 4/2013 |
| CN | 103874700 A | 6/2014 |
| CN | 104903325 A | 9/2015 |
| CN | 106795156 A | 5/2017 |
| CN | 107304202 A | 10/2017 |
| CN | 107304203 A | 10/2017 |
| CN | 108137600 A | 6/2018 |
| EP | 0941994 A1 | 9/1999 |
| EP | 1315492 B1 | 7/2008 |

(Continued)

OTHER PUBLICATIONS

Garcia-Fernandez et. al. (J. Am. Chem. Soc., 138, 13608-13614) (Year: 2016).*
CAS Registry File 2142644-18-4 (btained from the internet Nov. 26, 2024; entered into STN Nov. 14, 2017) (Year: 2017).*
CAS Registry File 56383-12-1 (Obtained from the internet Dec. 2, 2024; entered into STN Nov. 16, 1984) (Year: 1984).*
Cecil Textbook of Medicine, 20th Ed., vol. 1 (Year: 1997).*
Wu et. al., "Small-molecule inhibitors, immune checkpoint inhibitors, and more: FDA-approved novel therapeutic drugs for solid tumors from 1991 to 2021"; Journal of Hematology & Oncology, 15, 143 (Year: 2022).*
Enriquez-Rios, V., et al., "DNA-PKcs, ATM, and ATR Interplay Maintains Genome Integrity during Neurogenesis," J Neurosci 37(4):893-905, Society for Neuroscience, United States (Jan. 2017).

(Continued)

*Primary Examiner* — Jeffrey H Murray
*Assistant Examiner* — Daniel John Burkett
(74) *Attorney, Agent, or Firm* — Sterne, Kessler, Goldstein & Fox P.L.L.C.

(57) ABSTRACT

The disclosure provides novel substituted fused heteroaromatic compounds as represented in Formula I, wherein $A_1$-$A_6$ and $R_1$-$R_4$ are defined herein. The compounds of Formula I are kinase inhibitors, especially ATR kinase inhibitors. Therefore, the compounds of the disclosure may be used to treat ATR-mediated diseases, disorders and conditions, such as cancer.

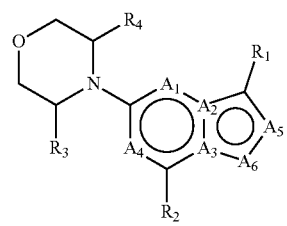

I

19 Claims, No Drawings

(56) References Cited

FOREIGN PATENT DOCUMENTS

| | | | |
|---|---|---|---|
| GB | 1480621 A | 7/1977 | |
| JP | 50-058092 A | 5/1975 | |
| JP | 2000186090 A | 7/2000 | |
| JP | 2007501801 A | 2/2007 | |
| JP | 2013-529212 | 7/2013 | |
| JP | 2015537008 A | 12/2015 | |
| JP | 2018529725 A | 10/2018 | |
| WO | WO-2005013907 A2 | 2/2005 | |
| WO | WO-2010118207 A1 | 10/2010 | |
| WO | WO-2011013729 A1 | 2/2011 | |
| WO | WO-2011154737 A1 * | 12/2011 | .............. A61P 43/00 |
| WO | WO-2011163527 A1 | 12/2011 | |
| WO | WO-2012027234 A1 * | 3/2012 | ........... C07D 471/14 |
| WO | WO-2012027240 A1 | 3/2012 | |
| WO | WO-2012178123 A1 | 12/2012 | |
| WO | WO-2013024002 A1 | 2/2013 | |
| WO | WO-2013039988 A1 | 3/2013 | |
| WO | WO-2014075168 A1 | 5/2014 | |
| WO | WO-2016020320 A1 | 2/2016 | |
| WO | WO-2016044650 A1 | 3/2016 | |
| WO | WO-2017055305 A1 | 4/2017 | |
| WO | WO-2017181973 A1 | 10/2017 | |
| WO | WO-2017181974 A1 | 10/2017 | |
| WO | WO-2018153968 A1 | 8/2018 | |
| WO | WO-2018206547 A1 | 11/2018 | |
| WO | WO-2019025440 A1 | 2/2019 | |
| WO | WO-2020049017 A1 | 3/2020 | |
| WO | WO-2020087170 A1 | 5/2020 | |
| WO | WO-2021098811 A1 | 5/2021 | |

OTHER PUBLICATIONS

International Search Report and Written Opinion for International Application No. PCT/CN2020/098159, mailed on Aug. 31, 2020, China National Intellectual Property Administration, China, 14 pages.

* cited by examiner

SUBSTITUTED FUSED HETEROAROMATIC BICYCLIC COMPOUNDS AS KINASE INHIBITORS AND THE USE THEREOF

TECHNICAL FIELD

This disclosure is in the field of medicinal chemistry. In particular, the disclosure relates to substituted fused heteroaromatic bicyclic compounds, and the use of these compounds as therapeutically effective kinase inhibitors and anticancer drugs.

BACKGROUND

Ataxia telangiectasia and Rad3-related kinase (ATR) is a protein kinase that responds to cells involved in DNA damage. Activated ATR can regulate cell life process through various signals, including interruption of cell cycle, inhibition of replication origin, initiation of replication fork, repair of DNA double strands, etc (Enriquez-Rios V, et al., 2017).

ATR kinase regulates cell response to DNA damage, which is usually called DNA damage response (DDR), by acting together with ATM (ataxia telangiectasia mutated) kinase and many other proteins. When a cell recognizes DNA damage through DDR, it will immediately initiate the DNA repair process, activate the cell cycle checkpoint, and hinder the process of normal cell cycle, thereby providing time for DNA repair. Without DDR, cells are more sensitive to endogenous cell damage or DNA damage caused by chemotherapy and radiotherapy for treating cancer, and are more likely to die.

Healthy cells can rely on different proteins for DNA repair, including ATM, ATR kinase in DDR, etc. Under normal circumstances, these proteins can repair DNA by regulating downstream regulatory factors. However, many cancer cells have defects in DNA repair pathway, therefore they are more dependent on the remaining intact DNA repair proteins, including ATR. ATR is a key member of DDR that responds to damaged DNA replication, and is crucial to maintain the stability and integrity of a genome and improve cell survival. When intracellular DNA damage occurs, ATR is recruited to the site of DNA damage, which in turn results in various proteins participating in the regulation of ATR activation. Activated ATR regulates some important cellular processes. Many cancer cells lack key tumor suppressor genes, which can cause cancer cells more dependent on ATR pathway than normal cells to regulate DNA damage repair and improve cell survival, making ATR a promising target for cancer treatment.

ATR inhibitors can be used alone or in combination with DNA damaging agents for cancer treatment, since they block the DNA replication mechanism, which is more important for cell survival in many cancer cells than healthy normal cells. In fact, ATR inhibitors have been shown to be effective as single active agents for cancer cells and as sensitizers for radiotherapy and chemotherapy. At the same time, ATR inhibitors can also be used in combination with other DDR-related targeted drugs, such as PARP inhibitors.

Various ATR kinase inhibitors have been disclosed. For example, WO2011154737 disclosed morpholino pyrimidine compounds as ATR kinase inhibitors; WO2016020320 disclosed 2-(morpholin-4-yl)-1,7-naphthyridine compounds as ATR kinase inhibitors; WO 2018153968 disclosed an inhibitor of ATR kinase, for use in a method of treating a hyper-proliferative disease; WO2020049017 disclosed 5-morpholin-4-yl-pyrazolo[4,3-b]pyridine derivatives as ATR kinase inhibitors; and WO2020087170 disclosed morpholino 5-membered heterocyclic fused pyridine compounds as ATR kinase inhibitors.

SUMMARY OF THE DISCLOSURE

The disclosure provides substituted fused heteroaromatic bicyclic compounds as represented in Formulae I, II, IIIa, IIIb and IV, the compounds can be used as kinase inhibitors.

The disclosure also provides pharmaceutical compositions comprising an effective amount of the compound of Formula I, II, IIIa, IIIb or IV for the treatment of cancer.

In a specific embodiment, the pharmaceutical composition may also contain one or more pharmaceutically acceptable carriers or diluents, for the treatment of cancer.

In a specific embodiment, the pharmaceutical composition may also contain at least one known anticancer drug or pharmaceutically acceptable salts thereof, for the treatment of cancer.

The disclosure is also directed to methods for the preparation of novel compounds of Formulae I, II, IIIa, IIIb and IV.

DETAILED DESCRIPTION OF THE DISCLOSURE

It should be understood that the characteristics of the embodiments described herein can be arbitrarily combined to form the technical solution of this disclosure. The definition of each group herein can apply to any of the embodiments described herein. For example, the definitions of the substituents of alkyl herein apply to any of the embodiments described herein unless the substituents of alkyl are clearly defined in the embodiment.

Specifically, the disclosure provides compounds represented by Formula I:

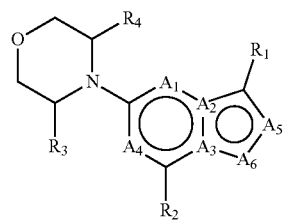

I or stereoisomers, tautomers, N-oxides, hydrates, isotope-substituted derivatives, solvates or pharmaceutically acceptable salts thereof, or mixtures thereof, or prodrugs thereof, wherein:

$A_1$ and $A_4$-$A_6$ are independently $CR_5$ or N;
$A_2$ and $A_3$ are independently C or N; preferably, when one of $A_2$ and $A_3$ is C, the other is N or C; more preferably, one of $A_2$ and $A_3$ is N, and the other is C;
$R_1$ is an optionally substituted aryl, an optionally substituted heterocyclic group, an optionally substituted cycloalkyl, an optionally substituted heteroaryl,

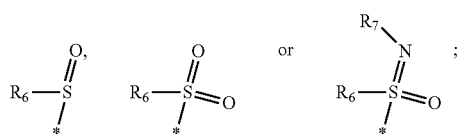

wherein * indicates an attachment position of the group to the rest of the compound;

R$_2$ is halogen, C$_1$-C$_6$ alkyl, C$_1$-C$_6$ alkoxy, C$_3$-C$_6$ cycloalkyl, C$_2$-C$_6$ alkenyl, C$_2$-C$_6$ alkynyl, carbocyclic group, heterocyclic group, aryl, heteroaryl, —NR$_8$R$_9$, —(CO)R$_8$, —(CO)OR$_8$, —(CO)NR$_8$R$_9$, —(SO)R$_6$, —(SO$_2$)R$_6$, —SR$_6$, —(SO$_2$)NR$_8$R$_9$, —NR$_8$(SO$_2$)R$_6$, —((SO)=NR$_7$)R$_{10}$, —N=(SO)R$_6$R$_{10}$, —SiR$_7$R$_{10}$R$_{11}$, —(PO)(OR$_8$)$_2$, —(PO)(OR$_8$)R$_{10}$ or —(PO)(R$_{10}$)$_2$, wherein the said C$_1$-C$_6$ alkyl, C$_1$-C$_6$ alkoxy, C$_3$-C$_6$ cycloalkyl, C$_2$-C$_6$ alkenyl, C$_2$-C$_6$ alkynyl, carbocyclic group, heterocyclic group, aryl and heteroaryl each are optionally substituted; wherein R$_6$ and R$_{10}$ in —N=(SO)R$_6$R$_{10}$ may together form a 5-8 membered heterocycloalkyl;

R$_3$ and R$_4$ are independently hydrogen or C$_1$-C$_6$ alkyl;

R$_5$ is hydrogen, halogen, C$_1$-C$_6$ alkyl, C$_1$-C$_6$ alkoxy, C$_2$-C$_6$ alkenyl, C$_2$-C$_6$ alkynyl, amino, nitro, cyano, acylamino, acyloxy, hydroxy, thiol, alkylthiol, azido or carboxy; wherein the said C$_1$-C$_6$ alkyl, C$_2$-C$_6$ alkoxy, C$_2$-C$_6$ alkenyl, C$_2$-C$_6$ alkynyl, amino, acylamino, acyloxy, hydroxy, thiol, alkylthiol and carboxy each are optionally substituted;

R$_6$ is an optionally substituted alkyl or an optionally substituted alkylaryl, preferably the aryl is phenyl;

R$_7$ is hydrogen, an optionally substituted alkyl, —(CO)OR$_8$ or —(CO)NR$_8$R$_9$;

R$_8$ and R$_9$ are independently hydrogen, an optionally substituted C$_1$-C$_{10}$ alkyl, an optionally substituted cycloalkyl, an optionally substituted heterocyclic group, an optionally substituted aryl or an optionally substituted heteroaryl; or R$_8$ and R$_9$ together with the N and C to which they are attached form an optionally substituted 4-7 membered cyclic amino group, which optionally comprises one or more additional heteroatoms selected from O, N and S;

R$_{10}$ is C$_1$-C$_4$ alkyl, or in the case of —N=(SO)R$_6$R$_{10}$, R$_6$ and R$_{10}$ together with the S to which they attached form a 5-8 membered heterocycloalkyl; and R$_{11}$ is hydrogen or C$_1$-C$_4$ alkyl.

In one or more embodiments, A$_1$ in the compound of Formula I is N or CH. Preferably, A$_1$ is N.

In one or more of the foregoing embodiments of the compound of Formula I, at least two or three of A$_1$ to A$_6$ is N.

In one or more of the foregoing embodiments of the compound of Formula I, one of A$_2$ and A$_3$ is N, and the other is C. Preferably, in some embodiments, in the compound of Formula I, A$_2$ is N, and A$_3$ is C.

In one or more of the foregoing embodiments of the compound of Formula I, A$_5$ is N or CH. Preferably, A$_5$ is N.

In one or more of the foregoing embodiments of the compound of Formula I, at least A$_1$, A$_2$ and A$_5$ are N.

In one or more of the foregoing embodiments of the compound of Formula I, R$_5$ is hydrogen.

In one or more of the foregoing embodiments of the compound of Formula I, the penta-fused hexa-heteroaryl containing A$_2$ and A$_3$ is:

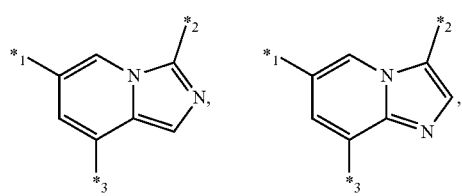

-continued

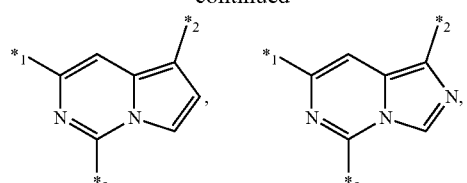

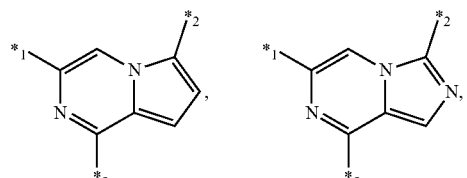

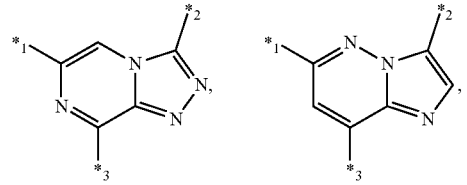

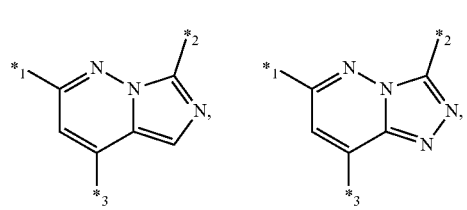

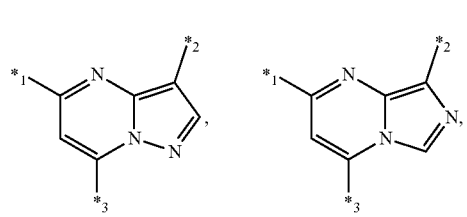

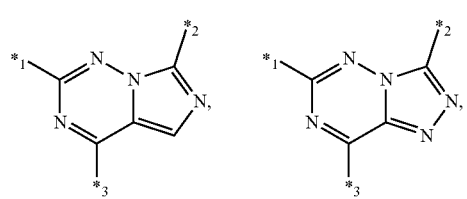

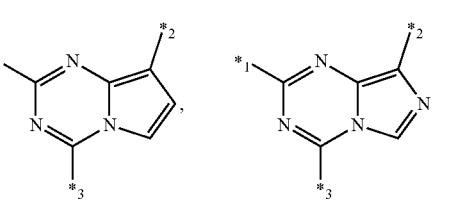

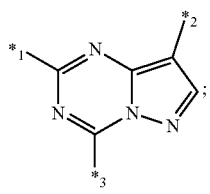 or

;

preferably, the penta-fused hexa-heteroaryl containing $A_2$ and $A_3$ is:

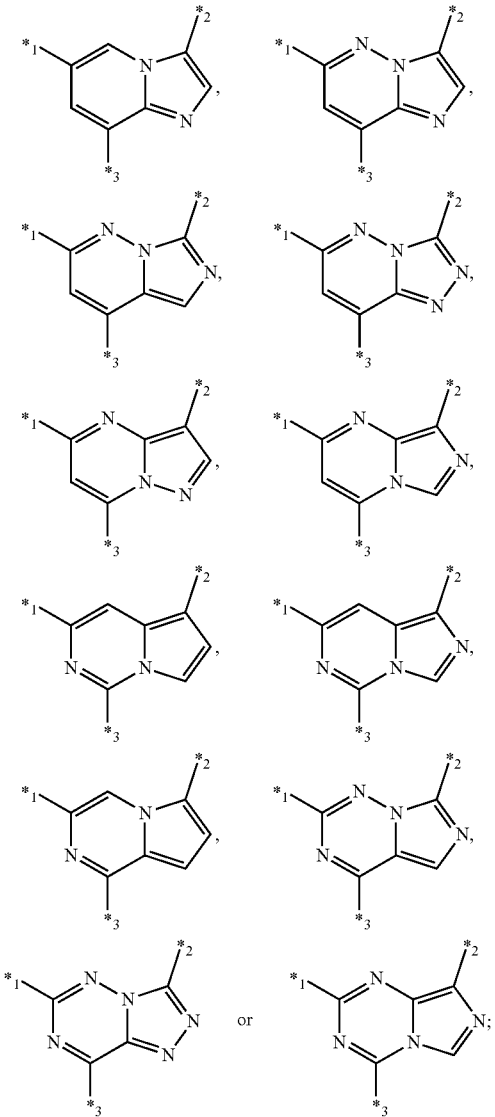

more preferably, the penta-fused hexa-heteroaryl containing $A_2$ and $A_3$ is:

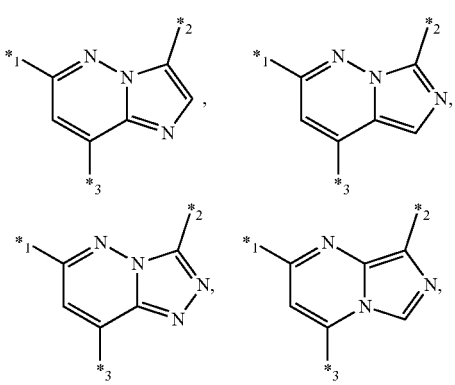

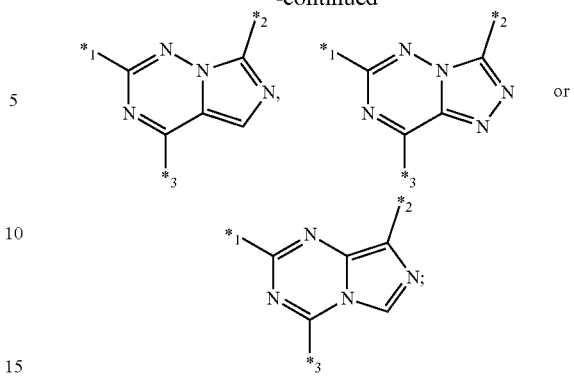

wherein, $*_1$, $*_2$ and $*_3$ refer to an attachment position of the group to morpholinyl, $R_1$ and $R_2$ of the compound of Formula I, respectively.

In one or more of the foregoing embodiments of the compound of Formula I, $R_2$ is $C_3$-$C_6$ cycloalkyl, carbocyclic group, heterocyclic group, aryl, heteroaryl, —$NR_8R_9$, —$NR_8(SO_2)R_6$ or —N=(SO)$R_6R_{10}$, wherein, the said $C_3$-$C_6$ cycloalkyl, carbocyclic group, heterocyclic group, aryl and heteroaryl each are optionally substituted; wherein, $R_8$ and $R_9$ are independently hydrogen, $C_1$-$C_6$ alkyl, $C_3$-$C_6$ cycloalkyl, or an optionally substituted phenyl; $R_{10}$ is $C_1$-$C_4$ alkyl, or $R_6$ and $R_{10}$ in —N=(SO)$R_6R_{10}$ together with the S to which they are attached form a 5-8 membered heterocycloalkyl. Preferably, $R_2$ is an optionally substituted $C_3$-$C_6$ cycloalkyl, an optionally substituted aryl, an optionally substituted heterocyclic group or an optionally substituted heteroaryl. More preferably, the heteroaryl is a 5- or 6-membered heteroaryl containing at least one nitrogen atom, preferably a 5-membered heteroaryl containing two nitrogen atoms. Preferably, $R_2$ is an optionally substituted cyclopropyl, an optionally substituted phenyl, an optionally substituted pyrazolyl, an optionally substituted pyrrolyl, an optionally substituted imidazolyl, an optionally substituted triazolyl, an optionally substituted furanyl, an optionally substituted morpholinyl, an optionally substituted dihydropyranyl, an optionally substituted tetrahydropyranyl, an optionally substituted pyridyl, an optionally substituted pyrimidinyl, or an optionally substituted pyrrolopyridyl. Preferably, the substituents on $R_2$ are selected from optionally substituted $C_1$-$C_6$ alkyl, cyano, hydroxy, carboxyl, amino, halogen, optionally substituted alkylsulfinyl and optionally substituted alkylsulfonyl; preferably, the $C_1$-$C_6$ alkyl is optionally substituted by one or more substituents selected from the group consisting of halogen. The number of substituents on $R_2$ may be 1-3.

In one or more of the foregoing embodiments of the compound of Formula I, $R_3$ is hydrogen; $R_4$ is $C_1$-$C_4$ alkyl, such as methyl. Preferably, $R_3$ is in an R-configuration.

In one or more of the foregoing embodiments of the compound of Formula I, $R_1$ is an optionally substituted alkylsulfonyl, an optionally substituted aryl, an optionally substituted heterocyclic group, an optionally substituted cycloalkyl or an optionally substituted heteroaryl. Preferably, the heteroaryl is a 5- or 6-membered heteroaryl containing at least one nitrogen atom, preferably a 5-membered heteroaryl containing two nitrogen atoms. Preferably, the substituents of the alkylsulfonyl, heterocyclic group, cycloalkyl, aryl and heteroaryl may be selected from a group consisting of $C_1$-$C_4$ alkyl, halogen, hydroxy, $C_1$-$C_4$ alkoxy and amino. Preferably, the number of substituents on $R_1$ may be 1-3. More preferably, $R_1$ is sulfonyl substituted with $C_1$-$C_4$ alkyl; or pyrazolyl, pyrrolyl, or imidazolyl optionally substituted with 1 or 2 substituents selected from a group consisting of $C_1$-$C_4$ alkyl, halogen, hydroxyl, $C_1$-$C_4$ alkoxy and amino. In some embodiments, $R_1$ is unsubstituted pyrazolyl, unsubstituted pyrrolyl, or unsubstituted imidazolyl.

In one or more of the foregoing embodiments of the compound of Formula I, the isotope-substituted derivative of the compound of Formula I is a compound with one or more hydrogen atoms substituted by one or more D atoms.

One group of preferred compounds of the present disclosure are represented by Formula II:

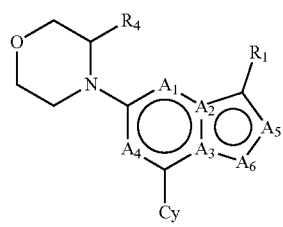

II or stereoisomers, tautomers, N-oxides, hydrates, isotope-substituted derivatives, solvates or pharmaceutically acceptable salts thereof, or mixtures thereof, or prodrugs thereof, wherein:

$A_1$-$A_6$, $R_1$ and $R_4$ are as defined in Formula I;

Cy is $C_3$-$C_6$ cycloalkyl, carbocyclic group, heterocyclic group, aryl, heteroaryl, —$NR_8R_9$, —$NR_8(SO_2)R_6$ or —N=(SO)$R_6R_{10}$, wherein, the said $C_3$-$C_6$ cycloalkyl, carbocyclic group, heterocyclic group, aryl and heteroaryl each are optionally substituted; wherein, $R_8$ and $R_9$ each are dependently hydrogen, an optionally substituted $C_1$-$C_{10}$ alkyl, an optionally substituted cycloalkyl, an optionally substituted aryl, or an optionally substituted heteroaryl; or $R_8$ and $R_9$ together is an optionally substituted 4-7 membered cyclic amino group, which optionally comprises one additional heteroatom selected from O, N and S; $R_{10}$ is $C_1$-$C_4$ alkyl, or in the case of —N=(SO)$R_6R_{10}$, $R_6$ and $R_{10}$ together form a 5-8 membered heterocycloalkyl.

In one or more of the foregoing embodiments of the compound of Formula II, $A_1$ is N or CH. Preferably, $A_1$ is N.

In one or more of the foregoing embodiments of the compound of Formula II, one of $A_2$ and $A_3$ is N, the other is C. Preferably, in some embodiments, in the compound of Formula II, $A_2$ is N, $A_3$ is C.

In one or more of the foregoing embodiments of the compound of Formula II, $A_5$ is N or CH. Preferably, $A_5$ is N.

In one or more of the foregoing embodiments of the compound of Formula II, $R_5$ is hydrogen.

In one or more of the foregoing embodiments of the compound of Formula II, the penta-fused hexa-heteroaryl containing $A_2$ and $A_3$ is:

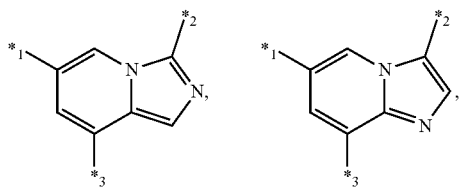

-continued

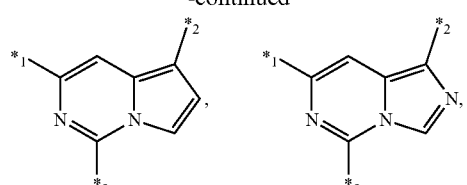

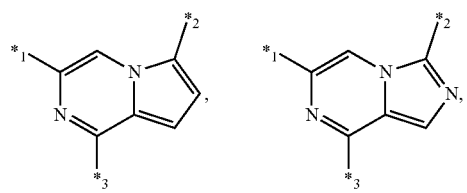

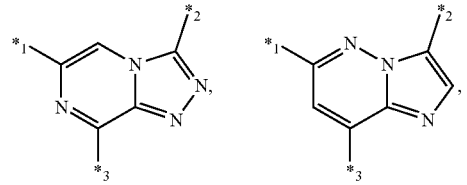

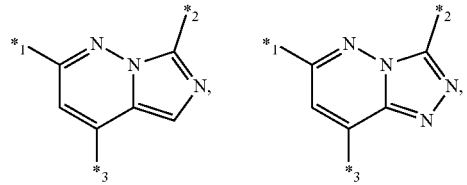

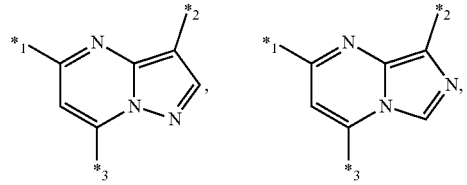

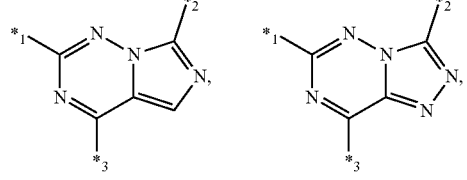

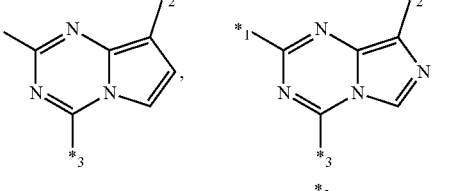

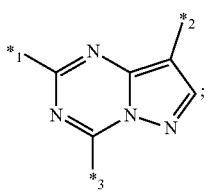 or preferably, the penta-fused hexa-heteroaryl containing $A_2$ and $A_3$ is:

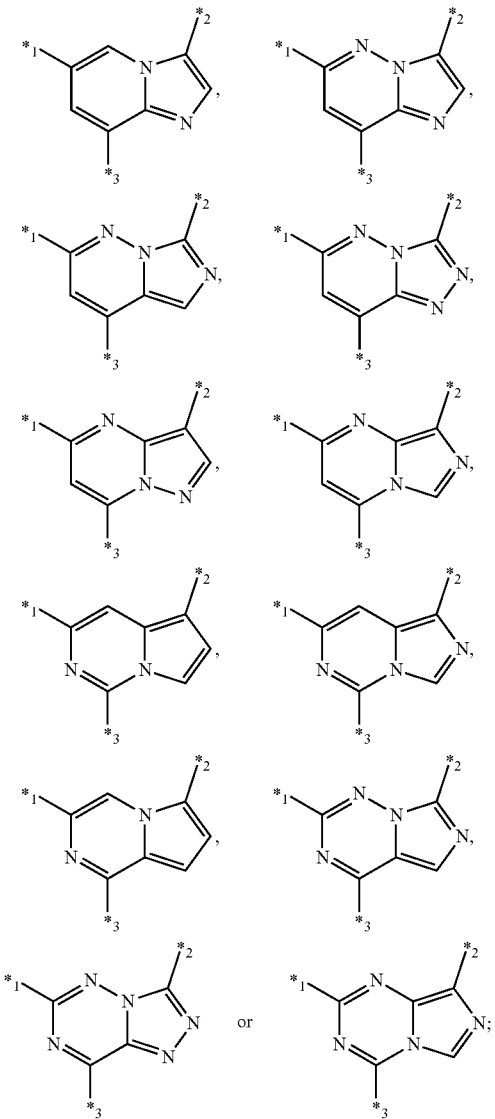

more preferably, the penta-fused hexa-heteroaryl containing $A_2$ and $A_3$ is:

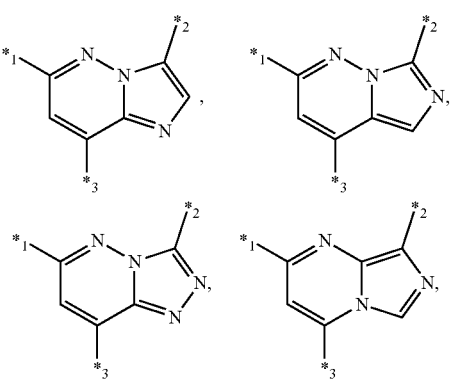

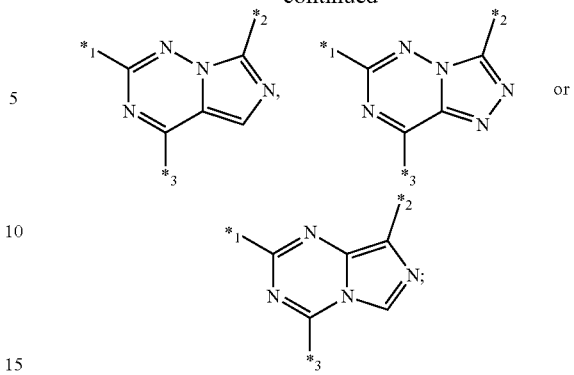

wherein, $*_1$, $*_2$ and $*_3$ refer to the attachment position of the group to morpholinyl, $R_1$ and $R_2$ of the compound of Formula II, respectively.

In one or more of the foregoing embodiments of the compound of Formula II, Cy is $C_3$-$C_6$ cycloalkyl, carbocyclic group, heterocyclic group, aryl, heteroaryl, —$NR_8R_9$, —$NR_8(SO_2)R_6$ or —$N=(SO)R_6R_{10}$, wherein, the $C_3$-$C_6$ cycloalkyl, carbocyclic group, heterocyclic group, aryl and heteroaryl each are optionally substituted; wherein $R_8$ and $R_9$ each are dependently hydrogen, an optionally substituted $C_1$-$C_6$ alkyl, an optionally substituted $C_3$-$C_6$ cycloalkyl, or an optionally substituted phenyl; $R_{10}$ is $C_1$-$C_4$ alkyl, or $R_6$ and $R_{10}$ in —$N=(SO)R_6R_{10}$ together with the S to which they are attached may form a 5-8 membered heterocycloalkyl. Preferably, Cy is an optionally substituted $C_3$-$C_6$ cycloalkyl, an optionally substituted aryl, an optionally substituted heterocyclic group, or an optionally substituted heteroaryl group. Preferably, the heteroaryl is a 5- or 6-membered heteroaryl containing at least one nitrogen atom, preferably a 5-membered heteroaryl containing two nitrogen atoms. More preferably, Cy is an optionally substituted cyclopropyl, an optionally substituted phenyl, an optionally substituted pyrazolyl, an optionally substituted pyrrolyl, an optionally substituted imidazolyl, an optionally substituted triazolyl, an optionally substituted furanyl, an optionally substituted pyridyl, an optionally substituted pyrimidinyl, an optionally substituted morpholinyl, an optionally substituted dihydropyranyl, an optionally substituted tetrahydropyranyl, or an optionally substituted pyrrolopyridyl. Preferably, the substituent on Cy is selected from optionally substituted $C_1$-$C_6$ alkyl, cyano, hydroxy, carboxyl, amino, halogen, optionally substituted alkylsulfinyl and optionally substituted alkylsulfonyl. The number of substituents on Cy may be 1-3. In some embodiments, Cy is a pyrazolyl optionally substituted with one or more, preferably 1, 2 or 3, $C_1$-$C_6$ alkyl; preferably one or two N atoms of the pyrazolyl are substituted by an $C_1$-$C_6$ alkyl; preferably the $C_1$-$C_6$ alkyl can further be substituted by one or more, such as 1-5, halogen. In some embodiments, Cy is a pyrazolyl optionally substituted by one or two substituents selected from the group consisting of unsubstituted $C_1$-$C_4$ alkyl and $C_1$-$C_4$ alkyl substituted by 1-3 halogen.

In one or more of the foregoing embodiments of the compound of Formula II, $R_4$ is $C_1$-$C_4$ alkyl, such as methyl. Preferably, $R_4$ is in an R-configuration.

In one or more of the foregoing embodiments of the compound of Formula II, $R_1$ is an optionally substituted alkylsulfonyl, an optionally substituted aryl, an optionally substituted heterocyclic group, an optionally substituted cycloalkyl or an optionally substituted heteroaryl. Preferably, the heteroaryl is a 5- or 6-membered heteroaryl containing at least one nitrogen atom, preferably a 5-membered heteroaryl containing two nitrogen atoms. Preferably, the substituents of the alkylsulfonyl, aryl, heterocyclic group, cycloalkyl and heteroaryl may be selected from a group consisting of $C_1$-$C_4$ alkyl, halogen, hydroxy, $C_1$-$C_4$ alkoxy and amino. Preferably, the number of substituents may be 1-3. More preferably, $R_1$ is sulfonyl substituted with $C_1$-$C_4$ alkyl; or pyrazolyl, pyrrolyl, or imidazolyl optionally substituted with 1 or 2 substituents selected from a group consisting of $C_1$-$C_4$ alkyl, halogen, hydroxy, $C_1$-$C_4$ alkoxy and amino. In some embodiments, $R_1$ is unsubstituted pyrazolyl, unsubstituted pyrrolyl, or unsubstituted imidazolyl.

One group of preferred compounds of the present disclosure are represented by Formulae IIIa and IIIb:

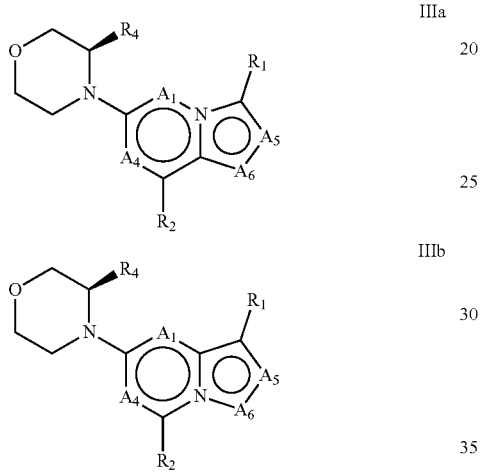

or stereoisomers, tautomers, N-oxides, hydrates, isotope-substituted derivatives, solvates or pharmaceutically acceptable salts thereof, or mixtures thereof, or prodrugs thereof, wherein $A_1$, $A_4$, $A_5$, $A_6$, $R_1$, $R_2$ and $R_4$ are as defined in Formula I or II.

In one or more of the foregoing embodiments of compounds of Formulae IIIa and IIIb, $A_1$ is N or CH. Preferably, $A_1$ is N.

In one or more of the foregoing embodiments of compounds of Formulae IIIa and IIIb, $A_4$ is N or CH. Preferably, $A_4$ is CH.

In one or more of the foregoing embodiments of compounds of Formulae IIIa and IIIb, $A_5$ is N or CH. Preferably, $A_5$ is N.

In one or more of the foregoing embodiments of compounds of Formulae IIIa and IIIb, $A_6$ is N or CH. Preferably, $A_6$ is CH.

In one or more of the foregoing embodiments of compounds of Formulae IIIa and IIIb, the penta-fused hexa-heteroaryl containing $A_1$, $A_4$, $A_5$ and $A_6$ is:

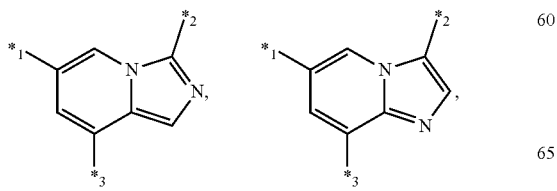

-continued

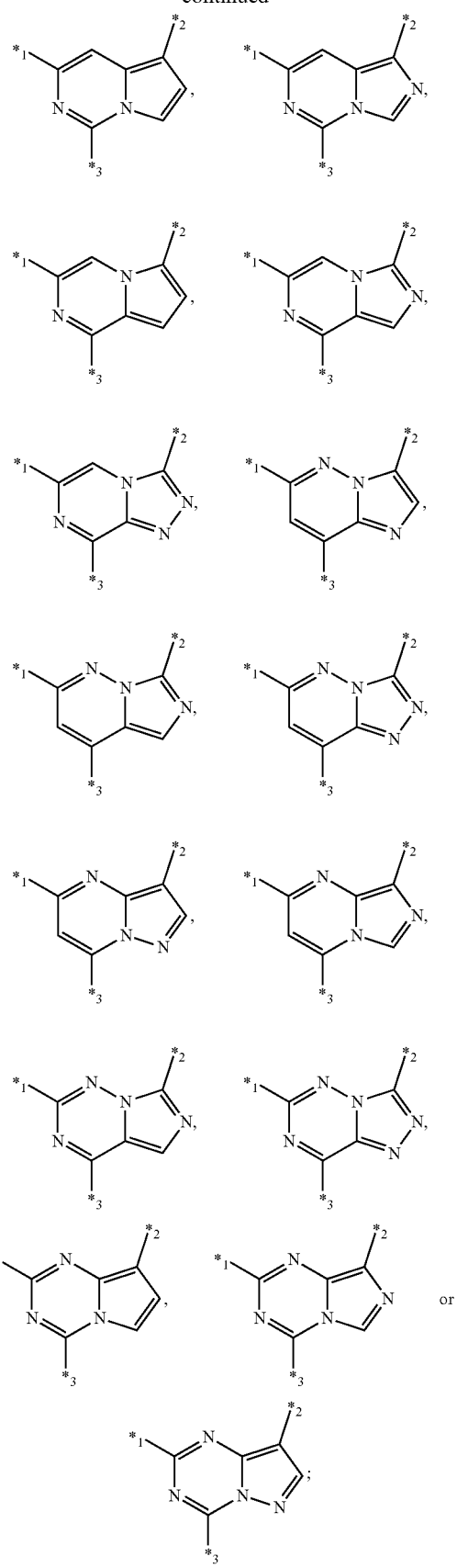

or preferably, the penta-fused hexa-heteroaryl containing $A_1$, $A_4$, $A_5$ and $A_6$ is:

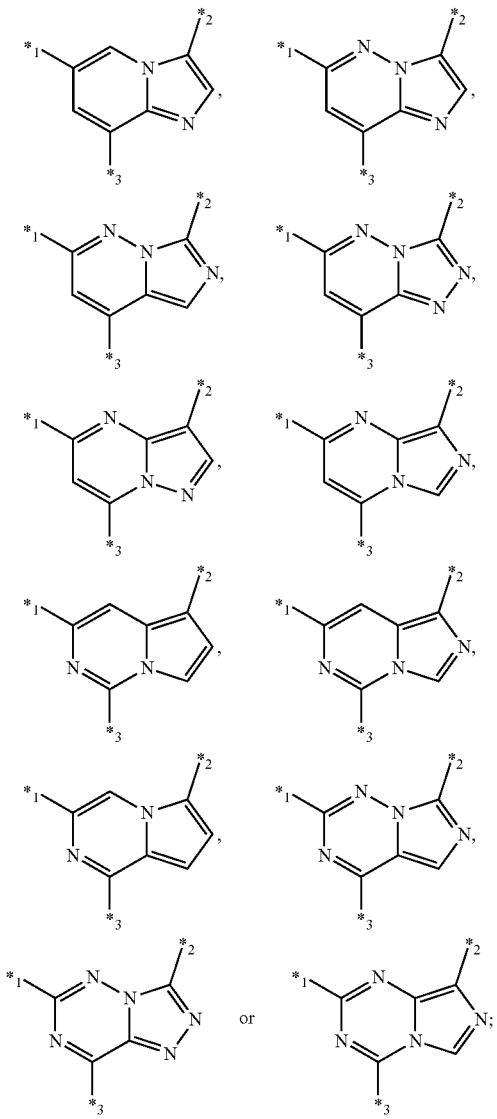

more preferably, the penta-fused hexa-heteroaryl containing $A_1$, $A_4$, $A_5$ and $A_6$ is:

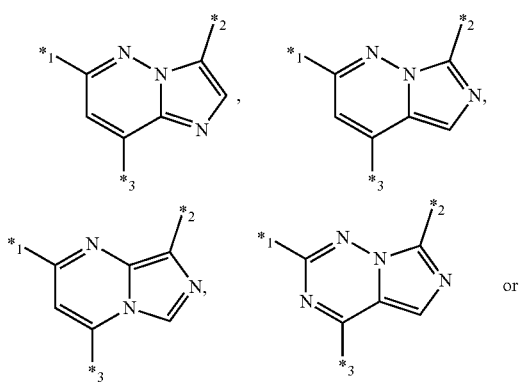

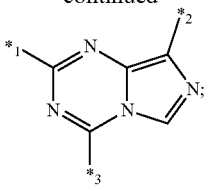

wherein, $*_1$, $*_2$ and $*_3$ refer to the attachment position of the group to morpholinyl, $R_1$ and $R_2$ of the compound of Formula IIIa or IIIb, respectively.

In one or more of the foregoing embodiments of compounds of Formulae IIIa and IIIb, $R_1$ is optionally substituted alkylsulfonyl, an optionally substituted aryl, an optionally substituted heterocyclic group, an optionally substituted cycloalkyl or an optionally substituted heteroaryl. Preferably, the heteroaryl is a 5- or 6-membered heteroaryl containing at least one nitrogen atom, preferably a 5-membered heteroaryl containing two nitrogen atoms. Preferably, the substituents of the heterocyclic group, cycloalkyl, aryl and heteroaryl may be selected from a group consisting of $C_1$-$C_4$ alkyl, halogen, hydroxy, $C_1$-$C_4$ alkoxy and amino. Preferably, the number of substituents on $R_1$ may be 1-3. More preferably, $R_1$ is sulfonyl substituted with $C_1$-$C_4$ alkyl; or pyrrolyl, imidazolyl or pyrazolyl optionally substituted with 1 or 2 substituents selected from a group consisting of $C_1$-$C_4$ alkyl, halogen, hydroxyl, $C_1$-$C_4$ alkoxy and amino. In some embodiments, $R_1$ is unsubstituted pyrazolyl, unsubstituted pyrrolyl, or unsubstituted imidazolyl.

In one or more of the foregoing embodiments of compounds of Formulae IIIa and IIIb, $R_2$ is $C_3$-$C_6$ cycloalkyl, carbocyclic group, heterocyclic group, aryl, heteroaryl, —$NR_8R_9$, —$NR_8(SO_2)R_6$ or —$N$=$(SO)R_6R_{10}$, wherein the said $C_3$-$C_6$ cycloalkyl, carbocyclic group, heterocyclic group, aryl and heteroaryl each are optionally substituted; wherein $R_8$ and $R_9$ each are dependently hydrogen, an optionally substituted $C_1$-$C_6$ alkyl, an optionally substituted $C_3$-$C_6$ cycloalkyl, or an optionally substituted phenyl; $R_{10}$ is $C_1$-$C_4$ alkyl, or in the case of —$N$=$(SO)R_6R_{10}$, $R_6$ and $R_{10}$ together with the S to which they are attached may form a 5-8 membered heterocycloalkyl. Preferably, the heteroaryl is a 5- or 6-membered heteroaryl containing at least one nitrogen atom, preferably a 5-membered heteroaryl containing two nitrogen atoms. Preferably, $R_2$ is an optionally substituted $C_3$-$C_6$ cycloalkyl, an optionally substituted aryl, an optionally substituted heterocyclic group, or an optionally substituted heterocyclic group; more preferably, $R_2$ is an optionally substituted cyclopropyl, an optionally substituted phenyl, an optionally substituted pyrazolyl, an optionally substituted pyrrolyl, an optionally substituted imidazolyl, an optionally substituted triazolyl, an optionally substituted furanyl, an optionally substituted pyridyl, an optionally substituted pyrimidinyl, an optionally substituted morpholinyl, an optionally substituted dihydropyranyl, an optionally substituted tetrahydropyranyl, or an optionally substituted pyrrolopyridyl. Preferably, the substituent on $R_2$ is selected from optionally substituted $C_1$-$C_6$ alkyl, cyano, hydroxy, carboxyl, amino, halogen, optionally substituted alkylsulfinyl and optionally substituted alkylsulfonyl. The number of substituents on $R_2$ may be 1-3. In some embodiments, $R_2$ is a pyrazolyl optionally substituted with optionally substituted $C_1$-$C_6$ alkyl, and preferably one or two ring N atoms of the pyrazolyl are substituted; preferably the $C_1$-$C_6$ alkyl can further be substituted by one or more, such as 1-5, halogen. In some embodiments, $R_2$ is a pyrazolyl optionally substituted by one or two substituents selected from the group consisting of unsubstituted $C_1$-$C_4$ alkyl and $C_1$-$C_4$ alkyl substituted by 1-3 halogen.

In one or more of the foregoing embodiments of compounds of Formulae IIIa and IIIb, $R_4$ is $C_1$-$C_4$ alkyl, such as methyl.

One group of preferred compounds of the present disclosure are represented by Formulae IV:

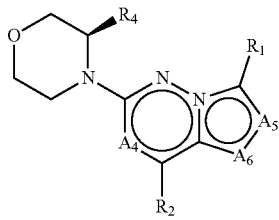

IV or stereoisomers, tautomers, N-oxides, hydrates, isotope-substituted derivatives, solvates or pharmaceutically acceptable salts thereof, or mixtures thereof, or prodrugs thereof, wherein:

$A_4$, $A_5$, $A_6$, $R_1$, $R_2$ and $R_4$ are as defined in Formula I, II, or IIIa or IIb;

In one or more of the foregoing embodiments of the compound of Formula IV, $A_4$ is N or CH. Preferably, $A_4$ is CH.

In one or more of the foregoing embodiments of the compound of Formula IV, $A_5$ is N or CH. Preferably, $A_5$ is N.

In one or more of the foregoing embodiments of the compound of Formula IV, $A_6$ is N or CH. Preferably, $A_6$ is CH.

In one or more of the foregoing embodiments of the compound of Formula IV, the penta-fused hexa-heteroaryl containing $A_4$, $A_5$ and $A_6$ is selected from the following groups:

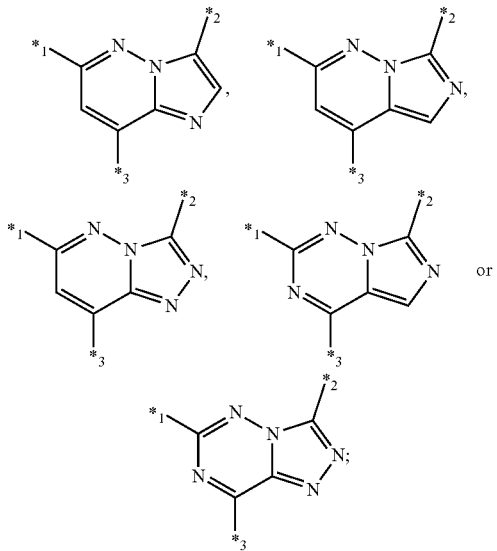

preferably,

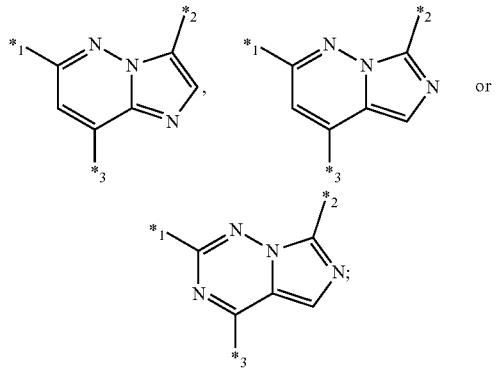

wherein, $*_1$, $*_2$ and $*_3$ refer to the attachment position of the group to morpholinyl, $R_1$ and $R_2$ of the compound of Formula IV, respectively.

In one or more of the foregoing embodiments of the compound of Formula IV, $R_1$ is an optionally substituted alkylsulfonyl, an optionally substituted aryl, an optionally substituted heterocyclic group, an optionally substituted cycloalkyl or an optionally substituted heteroaryl. Preferably, the heteroaryl is a 5- or 6-membered heteroaryl containing at least one nitrogen atom, preferably a 5-membered heteroaryl containing two nitrogen atoms. Preferably, the substituents of the alkylsulfonyl, heterocyclic group, aryl and heteroaryl may be selected from a group consisting of $C_1$-$C_4$ alkyl, halogen, hydroxy, $C_1$-$C_4$ alkoxy and amino. Preferably, the number of substituents on $R_1$ may be 1-3. More preferably, $R_1$ is sulfonyl substituted with $C_1$-$C_4$ alkyl; or pyrazolyl, pyrrolyl, or imidazolyl optionally substituted with 1 or 2 substituents selected from a group consisting of $C_1$-$C_4$ alkyl, halogen, hydroxyl, $C_1$-$C_4$ alkoxy and amino. In some embodiments, $R_1$ is unsubstituted pyrazolyl, unsubstituted pyrrolyl, or unsubstituted imidazolyl.

In one or more of the foregoing embodiments of the compound of Formula IV, $R_2$ is $C_3$-$C_6$ cycloalkyl, carbocyclic group, heterocyclic group, aryl, heteroaryl, —$NR_8R_9$, —$NR_8(SO_2)R_6$ or —$N=(SO)R_6R_{10}$, wherein the said $C_3$-$C_6$ cycloalkyl, carbocyclic group, heterocyclic group, aryl and heteroaryl each are optionally substituted; wherein, $R_8$ and $R_9$ each are dependently hydrogen, an optionally substituted $C_1$-$C_6$ alkyl, an optionally substituted $C_3$-$C_6$ cycloalkyl, or an optionally substituted phenyl; $R_{10}$ is $C_1$-$C_4$ alkyl, or in the case of —$N=(SO)R_6R_{10}$, $R_6$ and $R_{10}$ together with the S to which they are attached may form a 5-8 membered heterocycloalkyl. Preferably, the heteroaryl is a 5- or 6-membered heteroaryl containing at least one nitrogen atom, preferably a 5-membered heteroaryl containing two nitrogen atoms. Preferably, $R_2$ is an optionally substituted $C_3$-$C_6$ cycloalkyl, an optionally substituted aryl, an optionally substituted heterocyclic group, or an optionally substituted heterocyclic group; more preferably, $R_2$ is an optionally substituted cyclopropyl, an optionally substituted phenyl, an optionally substituted pyrazolyl, an optionally substituted pyrrolyl, an optionally substituted imidazolyl, an optionally substituted triazolyl, an optionally substituted furanyl, an optionally substituted pyridyl, an optionally substituted pyrimidinyl, an optionally substituted morpholinyl, an optionally substituted dihydropyranyl, an optionally substituted tetrahydropyranyl, or an optionally substituted pyrrolopyridyl. Preferably, the substituent on $R_2$ is selected from a group consisting of optionally substituted $C_1$-$C_6$ alkyl, cyano, hydroxy, carboxyl, amino, halogen, optionally substituted alkylsulfinyl and optionally substituted alkylsulfonyl. The number of substituents may be 1-3. In some embodiments, $R_2$ is a pyrazolyl optionally substituted with optionally substituted $C_1$-$C_6$ alkyl, and preferably one or two ring N atoms of the pyrazolyl are substituted; preferably the $C_1$-$C_6$ alkyl can further be substituted by one or more, such as 1-5, halogen. In some embodiments, $R_2$ is a pyrazolyl optionally substituted by one or two substituents selected from the group consisting of unsubstituted $C_1$-$C_4$ alkyl and $C_1$-$C_4$ alkyl substituted by 1-3 halogen.

In one or more of the foregoing embodiments of the compound of Formula IV, $R_4$ is $C_1$-$C_4$ alkyl, such as methyl.

In one or more of the foregoing embodiments of compounds of Formulae I, II, IIIa, IIIb and IV, the penta-fused hexa-heteroaryl is:

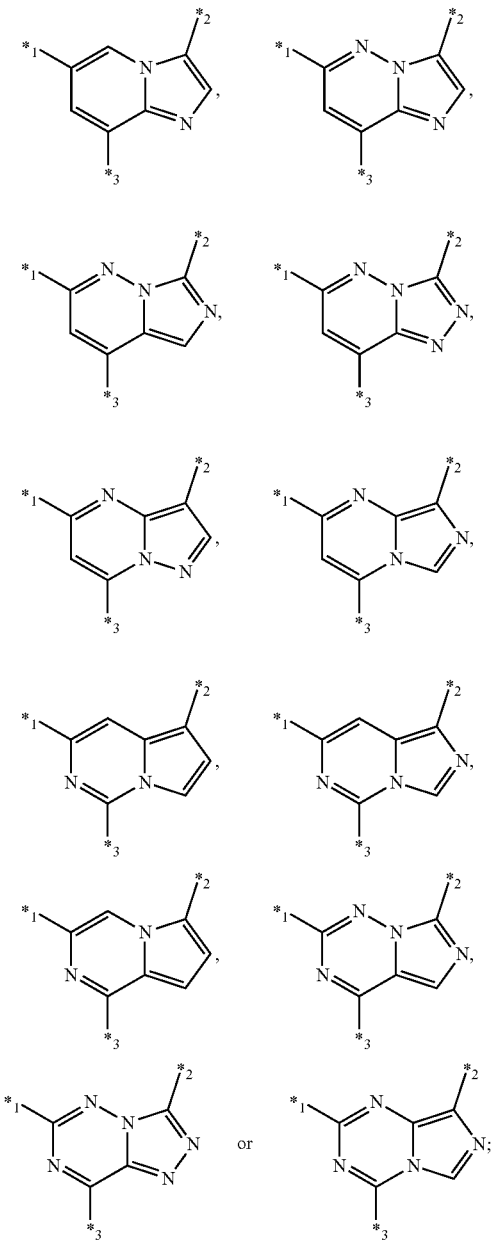

preferably,

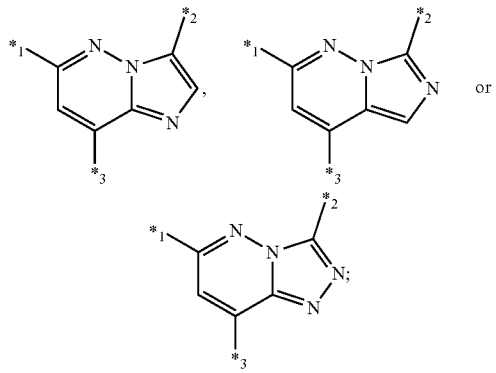

$R_1$ is selected from a group consisting of: alkylsulfonyl; heteroaryl (preferably pyrazolyl, pyrrolyl and imidazolyl) which is optionally substituted with 1-3 substitutents selected from a group consisting of $C_1$-$C_4$ alkyl, halogen, hydroxy, $C_1$-$C_4$ alkoxy and amino; aryl which is optionally substituted with 1-3 substituents selected from a group consisting of $C_1$-$C_4$ alkyl, halogen, hydroxy, $C_1$-$C_4$ alkoxy and amino; heterocyclic group which is optionally substituted with 1-3 substituents selected from a group consisting of $C_1$-$C_4$ alkyl, halogen, hydroxy, $C_1$-$C_4$ alkoxy and amino; and cycloalkyl which is optionally substituted with 1-3 substituents selected from a group consisting of $C_1$-$C_4$ alkyl, halogen, hydroxy, $C_1$-$C_4$ alkoxy and amino; preferably, $R_1$ is heteroaryl (preferably pyrazolyl, pyrrolyl and imidazolyl) which is optionally substituted by 1-3 substituents selected from a group consisting of $C_1$-$C_4$ alkyl, halogen, hydroxyl, $C_1$-$C_4$ alkoxy and amino, or alkylsulfonyl;

$R_2$ or Cy is an optionally substituted $C_3$-$C_6$ cycloalkyl, an optionally substituted aryl, an optionally substituted heterocyclic group, or an optionally substituted heteroaryl group; more preferably, $R_2$ or Cy is an optionally substituted cyclopropyl, an optionally substituted phenyl, an optionally substituted pyrazolyl, an optionally substituted pyrrolyl, an optionally substituted imidazolyl, an optionally substituted triazolyl, an optionally substituted furanyl, an optionally substituted morpholinyl, an optionally substituted dihydropyranyl, an optionally substituted tetrahydropyranyl, an optionally substituted pyridyl, an optionally substituted pyrimidinyl, or an optionally substituted pyrrolopyridyl; preferably, the substituent on $R_2$ or Cy is selected from a group consisting of $C_1$-$C_6$ alkyl, cyano, alkylsulfinyl, halogen, hydroxy, carboxyl, amino, and alkylsulfonyl, and preferably, the number of substituents may be 1-3; more preferably, $R_2$ or Cy is pyrazolyl optionally substituted with unsubstituted $C_1$-$C_6$ alkyl or $C_1$-$C_6$ alkyl substituted by 1-3 halogen, and preferably one or two ring N atoms of the pyrazolyl are substituted;

$R_3$ is H; and $R_4$ is $C_1$-$C_4$ alkyl, preferably methyl.

In one or more of preferred embodiments of Formula I, $A_1$ is N, $A_2$ is N, $A_3$ is C, $A_4$ is $CR_5$, $A_5$ is $CR_5$, $A_6$ is N; $R_1$ is a heteroaryl (preferably pyrazolyl, pyrrolyl and imidazolyl) optionally substituted with 1-2 $C_1$-$C_4$ alkyl, such as pyrazolyl optionally substituted by a $C_1$-$C_3$ alkyl; $R_2$ is a heteroaryl (preferably pyrazolyl, pyridinyl, pyrrolopyridinyl and imidazolyl) optionally substituted by one or two $C_1$-$C_4$ alkyl, an aryl (preferably phenyl) optionally substituted with 1-2 substituents selected from the group consisting of $C_1$-$C_4$ alkylsulfonyl and halogen, or a heterocyclic group (preferably morpholinyl) optionally substituted by one or two $C_1$-$C_4$ alkyl, such as 2,6-di$C_1$-$C_4$ alkyl-morpholinyl; one of $R_3$ and $R_4$ is H, the other is $C_1$-$C_4$ alkyl; and each $R_5$ is independently H or $C_1$-$C_4$ alkyl, preferably H.

In one or more of preferred embodiments of Formula I, $A_1$ is N, $A_2$ is N, $A_3$ is C, $A_4$ is $CR_5$, $A_5$ is N, $A_6$ is $CR_5$; $R_1$ is a heteroaryl (preferably pyrazolyl, pyrrolyl and imidazolyl, more preferably pyrazolyl) optionally substituted with 1-2 $C_1$-$C_4$ alkyl, such as pyrazolyl optionally substituted by a $C_1$-$C_3$ alkyl; $R_2$ is a heteroaryl (preferably pyrazolyl, pyrrolyl, pyridinyl, pyrrolopyridinyl, pyrimidinyl, triazolyl, and imidazolyl) optionally substituted by one or two substituents selected from the group consisting of halogen, $C_1$-$C_4$ alkylsulfonyl, $C_1$-$C_4$ alkylsulfinyl, $C_1$-$C_4$ alkyl optionally substituted by one to three halogen atoms, an aryl (preferably phenyl) optionally substituted with 1-2 substituents selected from the group consisting of $C_1$-$C_4$ alkyl, —CN, $C_1$-$C_4$ alkylsulfonyl and halogen, or a heterocyclic group (preferably morpholinyl, dihydropyranyl and tetrahydropyranyl) optionally substituted by one or two $C_1$-$C_4$ alkyl; $R_3$ and $R_4$ are independently selected from the group consisting of H and $C_1$-$C_4$ alkyl; and each $R_5$ is independently H or $C_1$-$C_4$ alkyl, preferably H.

In one or more of preferred embodiments of Formula I, $A_1$ is N, $A_2$ is N, $A_3$ is C, $A_4$ is $CR_5$, $A_5$ is N, $A_6$ is $CR_5$; $R_1$ is pyrazolyl optionally substituted by a $C_1$-$C_3$ alkyl; $R_2$ is pyrazolyl optionally substituted by one or two substituents selected from the group consisting of unsubstituted $C_1$-$C_4$ alkyl and $C_1$-$C_4$ alkyl substituted by one to three halogen atoms; $R_3$ and $R_4$ are independently selected from the group consisting of H and $C_1$-$C_4$ alkyl; and each $R_5$ is independently H or $C_1$-$C_4$ alkyl, preferably H. In further preferred embodiments, $R_2$ is pyrazolyl substituted by one or two substituents selected from the group consisting of unsubstituted $C_1$-$C_4$ alkyl and $C_1$-$C_4$ alkyl substituted by one to three halogen atoms, with at most one of the nitrogen atoms of the pyrazolyl is substituted by the substituent, preferably one of the nitrogen of the pyrazolyl is substituted. In further or alternative embodiments, one of $R_3$ and $R_4$ is H and the other is methyl.

In one or more of preferred embodiments of Formula I, $A_1$ and $A_4$-$A_6$ are independently N or $CR_5$; $A_2$ and $A_3$ are independently C or N; $R_1$ is pyrazolyl optionally substituted by a $C_1$-$C_3$ alkyl; $R_2$ is pyrazolyl optionally substituted by one or two substituents selected from the group consisting of unsubstituted $C_1$-$C_4$ alkyl and $C_1$-$C_4$ alkyl substituted by one to three halogen atoms; $R_3$ and $R_4$ are independently selected from the group consisting of H and $C_1$-$C_4$ alkyl; and each $R_5$ is independently H or $C_1$-$C_4$ alkyl, preferably H.

In one or more of the foregoing embodiments, preferred compounds of Formula I include, without limitation:
(R)-3-methyl-4-(8-(1-methyl-1H-pyrazol-5-yl)-3-(1H-pyrazol-5-yl)imidazo[1,2-a]pyridin-6-yl)morpholine (Example 1);
(R)-3-methyl-4-(8-(1-methyl-1H-pyrazol-5-yl)-3-(1H-pyrazol-5-yl)imidazo[1,2-b]pyridazin-6-yl)morpholine (Example 2);
(R)-3-methyl-4-(8-(1-ethyl-1H-pyrazol-5-yl)-3-(1H-pyrazol-5-yl)imidazo[1,2-b]pyridazin-6-yl)morpholine (Example 3);
(R)-3-methyl-4-(8-(1-isopropyl-1H-pyrazol-5-yl)-3-(1H-pyrazol-5-yl)imidazo[1,2-b]pyridazin-6-yl)morpholine (Example 4);
(R)-3-methyl-4-(8-(1-methyl-1H-imidazol-5-yl)-3-(1H-pyrazol-5-yl)imidazo[1,2-b]pyridazin-6-yl)morpholine (Example 5);
(R)-3-methyl-4-(8-(6-methylpyridin-3-yl)-3-(1H-pyrazol-5-yl)imidazo[1,2-b]pyridazin-6-yl)morpholine (Example 6);
(R)-3-methyl-4-(8-(4-(methylsulfonyl)phenyl)-3-(1H-pyrazol-5-yl)imidazo[1,2-b]pyridazin-6-yl)morpholine (Example 7);
(R)-3-methyl-4-(8-(2-fluorophenyl)-3-(1H-pyrazol-5-yl)imidazo[1,2-b]pyridazin-6-yl)morpholine (Example 8);
(R)-3-methyl-4-(8-morpholinyl-3-(1H-pyrazol-5-yl)imidazo[1,2-b]pyridazin-6-yl)morpholine (Example 9);
(2S,6R)-2,6-dimethyl-4-(6-((R)-3-methylmorpholino)-3-(1H-pyrazol-5-yl)imidazo[1,2-b]pyridazin-8-yl)morpholine (Example 10);
4-(4-(1-methyl-1H-pyrazol-5-yl)-7-(1H-pyrazol-5-yl)imidazo[1,5-b]pyridazin-2-yl)morpholine (Example 11);
4-(8-(1-methyl-1H-pyrazol-5-yl)-3-(1H-pyrazol-5-yl)-[1,2,4]triazolo[4,3-b]pyridazin-6-yl)morpholine (Example 12);
(R)-3-methyl-4-(4-(1-methyl-1H-pyrazol-5-yl)-7-(1H-pyrazol-5-yl)imidazo[1,5-b]pyridazin-2-yl)morpholine (Example 13);
(R)-3-methyl-4-(3-(1H-pyrazol-5-yl)-8-(1H-pyrrolo[2,3-b]pyridin-4-yl)imidazo[1,2-b]pyridazin-6-yl)morpholine (Example 14);
(R)-3-methyl-4-(8-(1-methyl-1H-pyrazol-5-yl)-3-(1H-pyrazol-5-yl)-[1,2,4]triazolo[4,3-b]pyridazin-6-yl)morpholine (Example 15);
(R)-3-methyl-4-(7-(1-methyl-1H-pyrazol-5-yl)-3-(1H-pyrazol-5-yl)pyrazolo[1,5-a]pyrimidin-5-yl)morpholine (Example 16);
(R)-3-methyl-4-(5-(methylsulfonyl)-1-(1H-pyrrolo[2,3-b]pyridin-4-yl)pyrrolo[1,2-c]pyrimidin-3-yl)morpholine (Example 17);
(R)-3-methyl-4-(1-(methylsulfonyl)-5-(1H-pyrrolo[2,3-b]pyridin-4-yl)imidazo[1,5-c]pyrimidin-7-yl)morpholine (Example 18);
(R)-3-methyl-4-(6-(methylsulfonyl)-1-(1H-pyrrolo[2,3-b]pyridin-4-yl)pyrrolo[1,2-a]pyrazin-3-yl)morpholine (Example 19);
(R)-3-methyl-4-(3-(methylsulfonyl)-8-(1H-pyrrolo[2,3-b]pyridin-4-yl)-[1,2,4]triazolo[4,3-a]pyrazin-6-yl)morpholine (Example 20);
(R)-3-methyl-4-(4-(1-methyl-1H-pyrazol-5-yl)-7-(1H-pyrrol-3-yl)imidazo[1,5-b]pyridazin-2-yl)morpholine (Example 21);
(R)-3-methyl-4-(4-(1-methyl-1H-pyrazol-5-yl)-7-(1H-pyrrol-2-yl)imidazo[1,5-b]pyridazin-2-yl)morpholine (Example 22);
(R)-4-(7-(1H-imidazol-4-yl)-4-(1-methyl-1H-pyrazol-5-yl)imidazo[1,5-b]pyridazin-2-yl)-3-methylmorpholine (Example 23);
(R)-3-methyl-4-(4-(6-methylpyridin-3-yl)-7-(1H-pyrazol-5-yl)imidazo[1,5-b]pyridazin-2-yl)morpholine (Example 24);
(R)-4-(4-(2-fluorophenyl)-7-(1H-pyrazol-5-yl)imidazo[1,5-b]pyridazin-2-yl)-3-methylmorpholine (Example 25);
(R)-4-(4-(1-isopropyl-1H-pyrazol-5-yl)-7-(1H-pyrazol-5-yl)imidazo[1,5-b]pyridazin-2-yl)-3-methylmorpholine (Example 26);
(R)-4-(4,7-di(1H-pyrazol-5-yl)imidazol[1,5-b]pyridazin-2-yl)-3-methylmorpholine (Example 27);
(R)-3-methyl-4-(4-(1-methyl-1H-pyrazol-5-yl)-8-(1H-pyrazol-5-yl)imidazo[1,5-a]pyrimidin-2-yl)morpholine (Example 28);

(R)-3-methyl-4-(4-(1-methyl-1H-pyrazol-5-yl)-7-(1H-pyrazol-3-yl)imidazo[5,1-f][1,2,4]triazin-2-yl)morpholine (Example 29);

(R)-3-methyl-4-(8-(1-methyl-1H-pyrazol-5-yl)-3-(1H-pyrazol-5-yl)-[1,2,4]triazolo[3,4-f][1,2,4]triazin-6-yl)morpholine (Example 30);

(R)-3-methyl-4-(4-(1-methyl-1H-pyrazol-5-yl)-8-(1H-pyrazol-5-yl)imidazo[1,5-a][1,3,5]triazin-2-yl)morpholine (Example 31);

(R)-4-(4-cyclopropyl-7-(1H-pyrazol-5-yl)imidazo[1,5-b]pyridazin-2-yl)-3-methylmorpholine (Example 32);

(S)-3-methyl-4-(4-(1-methyl-1H-pyrazol-5-yl)-7-(1H-pyrazol-5-yl)imidazo[1,5-b]pyridazin-2-yl)morpholine (Example 33);

(3R,5R)-3,5-dimethyl-4-(4-(1-methyl-1H-pyrazol-5-yl)-7-(1H-pyrazol-5-yl)imidazo[1,5-b]pyridazin-2-yl)morpholine (Example 34);

(R)-3-methyl-4-(4-(4-(methylsulfonyl)phenyl)-7-(1H-pyrazol-5-yl)imidazo[1,5-b]pyridazin-2-yl)morpholine (Example 35);

(R)-4-(4-(2,5-dimethyl-1H-pyrrol-1-yl)-7-(1H-pyrazol-5-yl)imidazo[1,5-b]pyridazin-2-yl)-3-methylmorpholine (Example 36);

(R)-4-(4-(1-ethyl-1H-pyrazol-5-yl)-7-(1H-pyrazol-5-yl)imidazo[1,5-b]pyridazin-2-yl)-3-methylmorpholine (Example 37);

(R)-3-methyl-4-(4-(3-methyl-1H-pyrazol-4-yl)-7-(1H-pyrazol-5-yl)imidazo[1,5-b]pyridazin-2-yl)morpholine (Example 38);

(R)-3-methyl-4-(7-(3-methyl-1H-pyrazol-5-yl)-4-(6-methylpyridin-3-yl)imidazo[1,5-b]pyridazin-2-yl)morpholine (Example 39);

(R)-4-(7-(1H-pyrazol-5-yl)-4-(o-tolyl)imidazo[1,5-b]pyridazin-2-yl)-3-methylmorpholine (Example 40);

(R)-4-(4-(1,4-dimethyl-1H-pyrazol-5-yl)-7-(1H-pyrazol-5-yl)imidazo[1,5-b]pyridazin-2-yl)-3-methylmorpholine (Example 41);

(R)-3-methyl-4-(4-(2-methylpyridin-3-yl)-7-(1H-pyrazol-5-yl)imidazo[1,5-b]pyridazin-2-yl)morpholine (Example 42);

(R)-4-(4-(3-fluoropyridin-4-yl)-7-(1H-pyrazol-5-yl)imidazo[1,5-b]pyridazin-2-yl)-3-methylmorpholine (Example 43);

(R)-3-methyl-4-(4-(4-methyl-6-(methylsulfonyl)pyridin-3-yl)-7-(1H-pyrazol-5-yl)imidazo[1,5-b]pyridazin-2-yl)morpholine (Example 44);

(R)-3-methyl-4-(4-(4-methylpyrimidin-5-yl)-7-(1H-pyrazol-5-yl)imidazo[1,5-b]pyridazin-2-yl)morpholine (Example 45);

(R)-3-methyl-4-(4-morpholino-7-(1H-pyrazol-5-yl)imidazo[1,5-b]pyridazin-2-yl)morpholine (Example 46);

(R)-4-(7-(1H-pyrazol-5-yl)-4-(2-(trifluoromethyl)pyridin-3-yl)imidazo[1,5-b]pyridazin-2-yl)-3-methylmorpholine (Example 47);

(R)-3-methyl-4-(4-(2-methyl-6-(methylsulfonyl)pyridin-3-yl)-7-(1H-pyrazol-5-yl)imidazo[1,5-b]pyridazin-2-yl)morpholine (Example 48);

(R)-3-methyl-4-(4-(2-methyl-4-(methylsulfonyl)phenyl)-7-(1H-pyrazol-5-yl)imidazo[1,5-b]pyridazin-2-yl)morpholine (Example 49);

(3R)-3-methyl-4-(4-(2-methyl-6-(methylsulfinyl)pyridin-3-yl)-7-(1H-pyrazol-5-yl)imidazo[1,5-b]pyridazin-2-yl)morpholine (Example 50);

(R)-3-methyl-4-(4-(3-methylpyridin-4-yl)-7-(1H-pyrazol-5-yl)imidazo[1,5-b]pyridazin-2-yl)morpholine (Example 51);

(R)-3-(2-(3-methylmorpholino)-7-(1H-pyrazol-5-yl)imidazo[1,5-b]pyridazin-4-yl)benzonitrile (Example 52);

(R)-4-(4-(3,6-dihydro-2H-pyran-4-yl)-7-(1H-pyrazol-5-yl)imidazo[1,5-b]pyridazin-2-yl)-3-methylmorpholine (Example 53);

(R)-4-(7-(1H-pyrazol-5-yl)-4-(tetrahydro-2H-pyran-4-yl)imidazo[1,5-b]pyridazin-2-yl)-3-methylmorpholine (Example 54);

(R)-4-(7-(1H-pyrazol-5-yl)-4-(1H-pyrrolo[2,3-b]pyridin-4-yl)imidazo[1,5-b]pyridazin-2-yl)-3-methylmorpholine (Example 55);

(R)-4-(4-(1,5-dimethyl-1H-pyrazol-4-yl)-7-(1H-pyrazol-5-yl)imidazo[1,5-b]pyridazin-2-yl)-3-methylmorpholine (Example 56);

(R)-3-methyl-4-(4-(1-methyl-1H-imidazol-5-yl)-7-(1H-pyrazol-5-yl)imidazo[1,5-b]pyridazin-2-yl)morpholine (Example 57);

(R)-4-(4-(1,3-dimethyl-1H-pyrazol-4-yl)-7-(1H-pyrazol-5-yl)imidazo[1,5-b]pyridazin-2-yl)-3-methylmorpholine (Example 58);

(R)-4-(4-(1,5-dimethyl-1H-1,2,3-triazol-4-yl)-7-(1H-pyrazol-5-yl)imidazo[1,5-b]pyridazin-2-yl)-3-methylmorpholine (Example 59);

(R)-4-(4-(1-(2-fluoroethyl)-1H-pyrazol-5-yl)-7-(1H-pyrazol-5-yl)imidazo[1,5-b]pyridazin-2-yl)-3-methylmorpholine (Example 60);

(R)-4-(4-(1-(2-fluoroethyl)-1H-pyrazol-3-yl)-7-(1H-pyrazol-5-yl)imidazo[1,5-b]pyridazin-2-yl)-3-methylmorpholine (Example 61);

(R)-4-(4-(1-(difluoromethyl)-1H-pyrazol-5-yl)-7-(1H-pyrazol-5-yl)imidazo[1,5-b]pyridazin-2-yl)-3-methylmorpholine (Example 62);

(R)-4-(4-(1-(difluoromethyl)-1H-pyrazol-3-yl)-7-(1H-pyrazol-5-yl)imidazo[1,5-b]pyridazin-2-yl)-3-methylmorpholine (Example 63);

or stereoisomers, tautomers, N-oxides, hydrates, isotope-substituted derivatives, solvates or pharmaceutically acceptable salts thereof, or mixtures thereof.

It should be understood that in the disclosure, $A_1$-$A_6$ should be selected to make the resulting ring meet the bond-valence theory.

The term "hydrogen (H)" as employed herein includes its isotopes D and T.

The term "alkyl" as used herein refers to alkyl itself or a straight or branched chain radical of up to ten carbons. Useful alkyl groups include straight-chain or branched $C_1$-$C_{10}$ alkyl groups, preferably $C_1$-$C_6$ alkyl groups. In some embodiments, alkyl is $C_1$-$C_4$ alkyl. Typical $C_1$-$C_{10}$ alkyl groups include methyl, ethyl, propyl, isopropyl, butyl, sec-butyl, tert-butyl, 3-pentyl, hexyl and octyl groups, which may be optionally substituted.

The term "alkenyl" as used herein refers to a straight or branched chain radical of 2-10 carbon atoms, unless the chain length is limited thereto, wherein there is at least one double bond between two of the carbon atoms in the chain; preferably, $C_2$-$C_6$ alkenyl. Typical alkenyl groups include ethenyl, 1-propenyl, 2-propenyl, 2-methyl-1-propenyl, 1-butenyl and 2-butenyl.

The term "alkynyl" as used herein refers to a straight or branched chain radical of 2-10 carbon atoms, unless the chain length is limited thereto, wherein there is at least one triple bond between two of the carbon atoms in the chain; preferably, $C_2$-$C_6$ alkynyl. Typical alkynyl groups include ethynyl, 1-propynyl, 1-methyl-2-propynyl, 2-propynyl, 1-butynyl and 2-butynyl.

Useful alkoxy groups include oxygen substituted by the above mentioned $C_1$-$C_{10}$ alkyl groups, preferred $C_1$-$C_6$ alkyl groups or $C_1$-$C_4$ alkyl groups, e.g., methoxy, ethoxy, etc. The alkyl in the alkoxy groups may be optionally substituted. Substituents of alkoxy groups include, without limitation, halogen, morpholino, amino (including alkylamino and dialkylamino), and carboxy (including esters thereof).

Useful alkylthio groups include sulfur substituted by the above mentioned $C_1$-$C_{10}$ alkyl groups, preferred $C_1$-$C_6$ alkyl groups. The alkyl in the alkylthio groups may be optionally substituted. Also included are the sulfoxides and sulfones of such alkylthio groups.

Useful amino and optionally substituted amino groups include —$NH_2$, —$NHR_8$ and —$NR_8R_9$, wherein $R_8$ and $R_9$ each are independently hydrogen, an optionally substituted $C_1$-$C_{10}$ alkyl, an optionally substituted cycloalkyl, an optionally substituted aryl or an optionally substituted heteroaryl; or $R_8$ and $R_9$ together with the N to which they are attached form an optionally substituted 4-7 membered cyclic amino group, which optionally comprises one or more (such as 2, 3) additional heteroatoms selected from O, N and S.

The term "aryl" as used herein by itself or as part of another group refers to monocyclic, bicyclic or tricyclic aromatic groups containing 6 to 14 carbon atoms. Aryl may be substituted by one or more substituents as described herein.

Useful aryl groups include $C_6$-$C_{14}$ aryl groups, preferably $C_6$-$C_{10}$ aryl groups. Typical $C_6$-$C_{14}$ aryl groups include phenyl, naphthyl, phenanthryl, anthracyl, indenyl, azulyl, biphenyl, biphenylene and fluorenyl.

The term "carbocycle (carbocyclic group)" as used herein include cycloalkyl and partially saturated carbocyclic groups. Useful cycloalkyl groups are $C_3$-$C_8$ cycloalkyl. Typical cycloalkyl groups include cyclopropyl, cyclobutyl, cyclopentyl, cyclohexyl and cycloheptyl. Carbocyclic group may be substituted by one or more substituents as described herein.

Useful partially saturated carbocyclic groups include cycloalkenyl groups, such as $C_3$-$C_8$ cycloalkenyl groups, e.g., cyclopentenyl, cycloheptenyl and cyclooctenyl.

Useful halo or halogen groups include fluoro, chloro, bromo and iodo.

Useful acylamino (acylamido) groups are any $C_1$-$C_6$ acyl (alkanoyl) attached to an amino nitrogen, e.g., acetamino, propionamido, butanoylamido, pentanoylamido and hexanoylamido, as well as aryl-substituted $C_1$-$C_6$ acylamino groups, e.g., benzoylamido. Useful acyl groups include $C_1$-$C_6$ acyl groups, such as acetyl. Acyl may be optionally substituted by group selected from aryl and halo, wherein the aryl may be optionally substituted. When acyl is substituted by halo, the number of halogen substituents may be in the range of 1-5. Examples of substituted acyls include chloroacetyl and pentafluorobenzoyl.

Useful acyloxy groups are any $C_1$-$C_6$ acyl (alkanoyl) attached to an oxygen (—O—), e.g., formyloxy, acetoxy, propionoyloxy, butanoyloxy, pentanoyloxy and hexanoyloxy.

The term "heterocycle (heterocyclic group)" as used herein refers to a saturated or partially saturated 3-7 membered monocyclic, or 7-10 membered bicyclic ring system, which consists of carbon atoms and one to four heteroatoms independently selected from O, N, and S, wherein the nitrogen and/or sulfur heteroatoms can be optionally oxidized and the nitrogen can be optionally quaternized, and the term also includes any bicyclic ring system in which any of the above-defined heterocyclic rings is fused to a benzene ring. The heterocycle can be substituted on carbon atom or nitrogen atom if the resulting compound is stable. Heterocyclic group may be substituted by one or more substituents as described herein.

Useful saturated or partially saturated heterocyclic groups include tetrahydrofuranyl, pyranyl, piperidinyl, piperazinyl, 1,4-diazepanyl, pyrrolidinyl, imidazolidinyl, imidazolinyl, indolinyl, isoindolinyl, quinuclidinyl, morpholinyl, isochromanyl, chromanyl, pyrazolidinyl, pyrazolinyl, tetrahydroisoquinolinyl, tetronoyl and tetramoyl, which may be optionally substituted by one or more substituents as described herein.

The term "heteroaryl (heteroaromatic ring)" as used herein refers to a group having 5 to 14 ring atoms, with 6, 10 or 14 π electrons shared in a cyclic array. Ring atoms are carbon atoms and 1-3 heteroatoms selected from oxygen, nitrogen and sulfur. Heteroaryl may be optionally substituted by one or more substituents as described herein.

Useful heteroaryl groups include thienyl (thiophenyl), benzo[d]isothiazol-3-yl, benzo[b]thienyl, naphtho[2,3-b]thienyl, thianthrenyl, furyl (furanyl), pyranyl, isobenzofuranyl, chromenyl, xanthenyl, phenoxanthiinyl, pyrrolyl, imidazolyl, pyrazolyl, pyridyl (pyridinyl, including without limitation 2-pyridyl, 3-pyridyl, and 4-pyridyl), pyrazinyl, pyrimidinyl, pyridazinyl, indolizinyl, isoindolyl, 3H-indolyl, indolyl, indazolyl, purinyl, 4H-quinolizinyl, isoquinolyl, quinolyl, phthalzinyl, naphthyridinyl, quinozalinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, phenoxazinyl, 1,4-dihydroquinoxaline-2,3-dione, 7-amino-isocoumarin, pyrido[1,2-a]pyrimidin-4-one, tetrahydrocyclopenta[c]pyrazol-3-yl, benzoisoxazolyl such as 1,2-benzoisoxazol-3-yl, benzimidazolyl, 2-oxindolyl, thiadiazolyl, 2-oxobenzimidazolyl, imidazopyridazinyl, imidazopyridyl, triazolopyridazinyl, pyrazolopyrimidinyl, pyrrolopyrimidinyl, pyrrolopyridyl, pyrrolopyrazinyl or triazolopyrazinyl. Where the heteroaryl group contains a nitrogen atom in a ring, such nitrogen atom may be in the form of an N-oxide, e.g., a pyridyl N-oxide, pyrazinyl N-oxide and pyrimidinyl N-oxide.

In this disclosure, unless otherwise described, when substituted, the $C_1$-$C_{10}$ alkyl, cycloalkyl, heterocyclic alkyl, alkoxy, heterocyclic alkoxy, alkenyl, heterocyclic alkenyl, alkynyl, amino, acylamino, acyloxy, carboxyl, hydroxy, thiol, alkylthio, sulfonyl, sulfinyl, silyl, phosphocarboxyl, phosphonyl, carbocyclic group, heterocyclic group, aryl or heteroaryl as described in any embodiment herein may be substituted by one or more (such as 1, 2, 3, or 4) substituents selected from the group consisting of halogen, hydroxy, carboxyl, amino, nitro, cyano, $C_1$-$C_6$ acylamino, $C_1$-$C_6$ acyloxy, $C_1$-$C_6$ alkoxy, aryloxy, alkylthio, $C_1$-$C_6$ alkyl, $C_1$-$C_6$ acyl, $C_6$-$C_{10}$ aryl, $C_3$-$C_8$ cycloalkyl, $C_2$-$C_6$ chain alkenyl, $C_2$-$C_6$ alkynyl, heterocyclic group, heteroaryl, methylenedioxy, ureido, thiol, azido, carbonyl, alkylsulfonyl, aminosulfonyl, dialkylaminosulfonyl, and alkylsulfiniyl, and the like. The substituent itself may also be optionally substituted. Preferred substituents include without limitation halo, hydroxy, carboxyl, amino, $C_1$-$C_6$ acylamino, $C_1$-$C_6$ acyloxy, $C_1$-$C_6$ alkoxy, $C_1$-$C_6$ alkyl, $C_1$-$C_6$ acyl, and alkylsulfonyl.

It should be understood that in each embodiment, when the substituent is heterocyclic group, aryl or heteroaryl, the number thereof is usually 1.

Some of the compounds of the present disclosure may exist as stereoisomers including optical isomers. The disclosure includes all stereoisomers and the racemic mixtures of such stereoisomers as well as the individual enantiomers that may be separated according to methods that are well known to those of ordinary skill in the art.

Examples of pharmaceutically acceptable salts include inorganic and organic acid salts, such as hydrochloride, hydrobromide, phosphate, sulphate, citrate, lactate, tartrate, maleate, fumarate, mandelate and oxalate; and inorganic and organic base salts formed with bases, such as sodium hydroxy, tris(hydroxymethyl)aminomethane (TRIS, tromethamine) and N-methyl-glucamine.

Examples of prodrugs of the compounds of the disclosure include the simple esters of carboxylic acid-containing compounds (e.g., those obtained by condensation with a $C_1$-$C_4$ alcohol according to methods known in the art); esters of hydroxy containing compounds (e.g., those obtained by condensation with a $C_1$-$C_4$ carboxylic acid, $C_3$-$C_6$ diacid or anhydride thereof, such as succinic anhydride and fumaric anhydride according to methods known in the art); imines of amino containing compounds (e.g., those obtained by condensation with a $C_1$-$C_4$ aldehyde or ketone according to methods known in the art); carbamate of amino containing compounds, such as those described by Leu, et al., (*J. Med. Chem.* 42:3623-3628 (1999)) and Greenwald, et al., (*J. Med Chem.* 42:3657-3667 (1999)); and acetals and ketals of alcohol-containing compounds (e.g., those obtained by condensation with chloromethyl methyl ether or chloromethyl ethyl ether according to methods known in the art).

The disclosure also includes all suitable isotopic variations of the compounds of the present disclosure or pharmaceutically acceptable salts thereof. Isotopic variations of the compounds of the present disclosure or pharmaceutically acceptable salts thereof are defined as those in which at least one atom is replaced by an atom having the same atomic number but an atomic mass different from the atomic mass often found in nature. Isotopes that can be incorporated into the compounds of the present disclosure and their pharmaceutically acceptable salts thereof include but are not limited to H, C, N and O, for example, $^2$H, $^3$H, $^{11}$C, $^{13}$C, $^{14}$C, $^{15}$N, $^{17}$O, $^{18}$O, $^{35}$S, $^{18}$F, $^{36}$Cl and $^{125}$I. Suitable isotopic variations of the compounds or pharmaceutically acceptable salts thereof of the present disclosure may be prepared by conventional techniques using appropriate isotopic variants of suitable reagents.

The compounds of this disclosure may be prepared using methods known to those skilled in the art, or the novel methods of this disclosure. The disclosure is also directed to the novel methods for the preparation of these novel compounds of Formula I, II, IIIa, IIIb or IV, as exemplified in Scheme 1-7. Specifically, the compounds of this disclosure with Formula I can be prepared as illustrated by the exemplary reaction in Scheme 1. 6-Chloro-8-bromoimidazo[1,2-b]pyridazine, N-iodosuccinimide, and trifluoroacetic acid in chloroform were reacted at room temperature to produce 8-bromo-6-chloro-3-iodoimidazo[1,2-b]pyridazine. Under the catalysis of potassium phosphate trihydrate and tetratriphenylphosphine palladium, 8-bromo-6-chloro-3-iodoimidazo[1,2-b]pyridazine and 1-(tetrahydro-2H-pyran-2-yl)-1H-pyrazol-5-boronic acid pinacol ester were reacted in a mixed solvent of dioxane and water under heating to produce 8-bromo-6-chloro-3-(1-tetrahydro-2H-pyran-2-yl)-1H-pyrazol-5-yl)imidazo[1,2-b]pyridazine. Under the catalysis of potassium phosphate trihydrate and [1,1'-bis(diphenylphosphino)ferrocene]dichloropalladium, 8-bromo-6-chloro-3-(1-tetrahydro-2H-pyran-2-yl)-1H-pyrazol-5-yl)imidazo[1,2-b]pyridazine and 1-methyl-1H-pyrazol-5-boronic acid pinacol ester were reacted in a mixed solvent of dioxane and water under heating to produce 6-chloro-8-(1-methyl-1H-pyrazol-5-yl)-3-(1-tetrahydro-2H-pyran-2-yl)-1H-pyrazol-5-yl)imidazo[1,2-b]pyridazine. Under the catalysis of sodium tert-butoxide and tris(dibenzylideneacetone)dipalladium, 6-chloro-8-(1-methyl-1H-pyrazol-5-yl)-3-(1-tetrahydro-2H-pyran-2-yl)-1H-pyrazol-5-yl)imidazo[1,2-b]pyridazine and (R)-3-methylmorpholine were reacted in toluene under heating to produce (3R)-3-methyl-4-(8-(1-methyl-1H-pyrazol-5-yl)-3-(1-tetrahydro-2H-pyran-2-yl)-1H-pyrazol-5-yl)imidazo[1,2-b]pyridazin-6-yl)morpholine. (3R)-3-Methyl-4-(8-(1-methyl-1H-pyrazol-5-yl)-3-(1-tetrahydro-2H-pyran-2-yl)-1H-pyrazol-5-yl)imidazo[1,2-b]pyridazin-6-yl)morpholine and concentrated hydrochloric acid in ethanol were reacted at room temperature to produce the target compound (R)-3-methyl-4-(8-(1-methyl-1H-pyrazol-5-yl)-3-(1H-pyrazol-5-yl)imidazo[1,2-b]pyridazin-6-yl)morpholine.

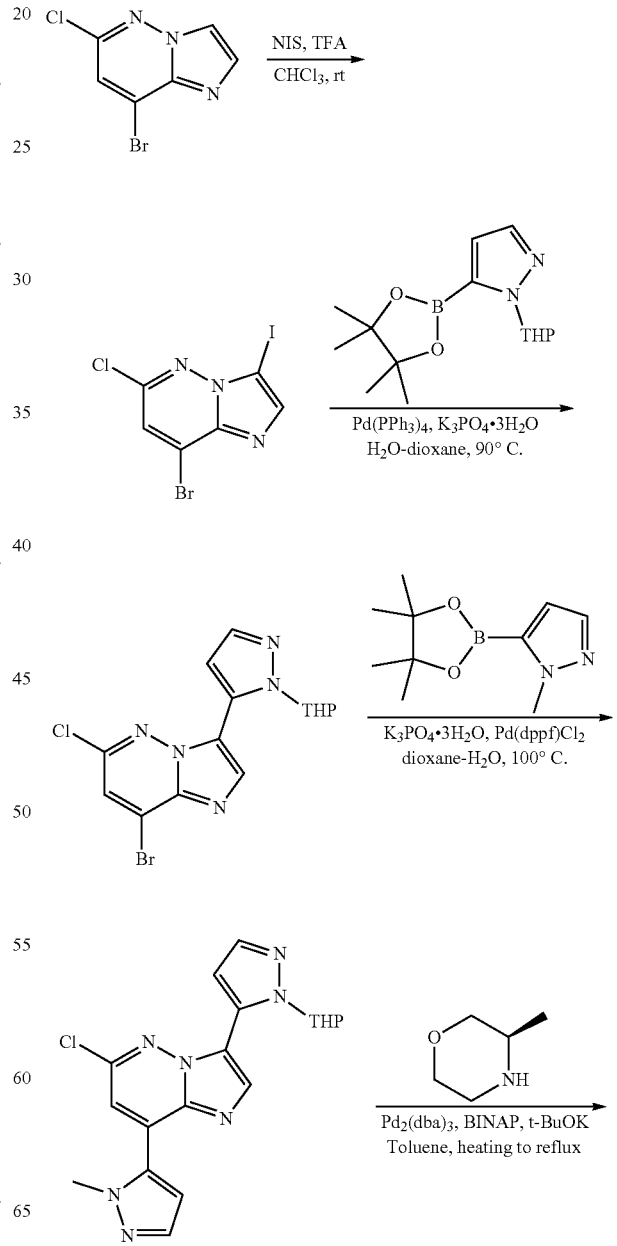

Scheme 1

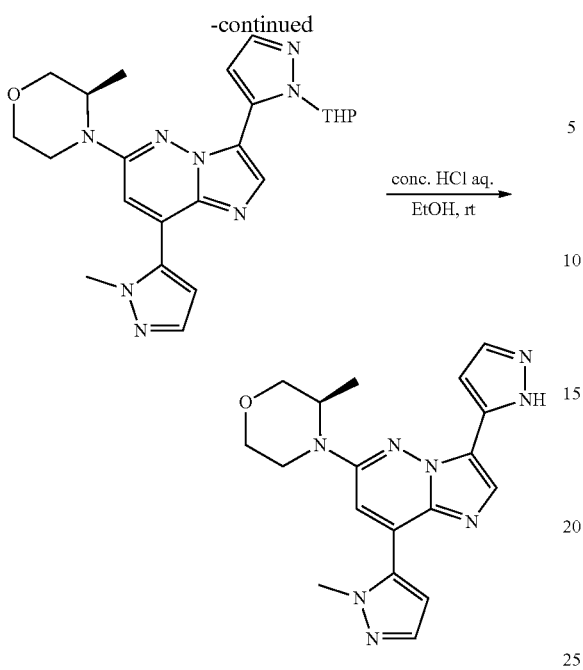

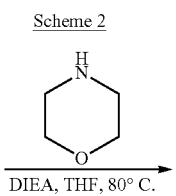

room temperature to produce the target compound (R)-3-methyl-4-(8-morpholinyl-3-(1H-pyrazol-5-yl)imidazo[1,2-b]pyridazin-6-yl)morpholine.

Scheme 2

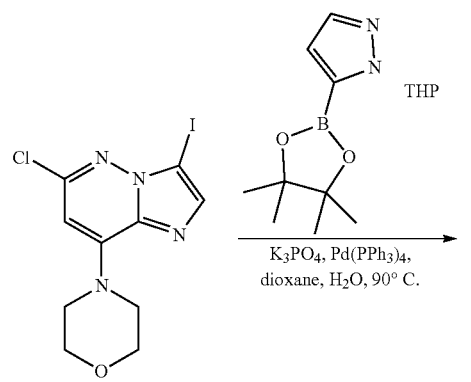

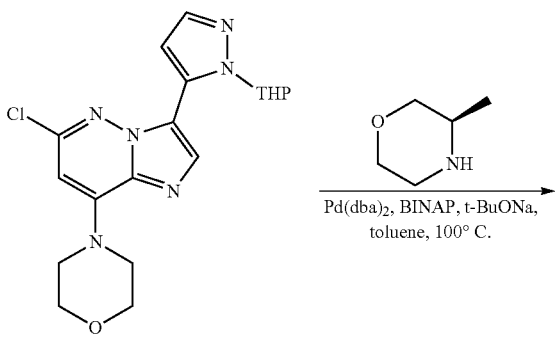

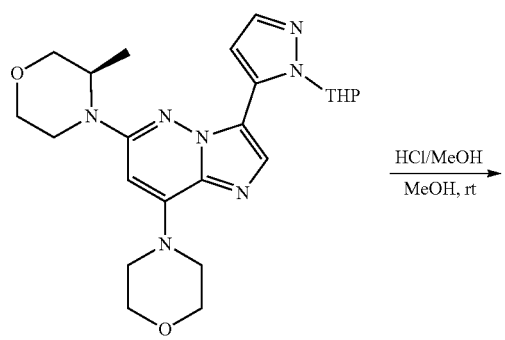

Other related compounds can be prepared similarly. For example, replacement of 1-methyl-1H-pyrazol-5-boronic acid pinacol ester with 1-methyl-1H-imidazol-5-boronic acid pinacol ester produced the target compound (R)-3-methyl-4-(8-(1-methyl-1H-imidazol-5-yl)-3-(1H-pyrazol-5-yl)imidazo[1,2-b]pyridazin-6-yl)morpholine; replacement of 6-chloro-8-bromoimidazo[1,2-b]pyridazine with 8-bromo-6-chloroimidazo[1,2-a]pyridine produced the target compound (R)-3-methyl-4-(8-(1-methyl-1H-pyrazol-5-yl)-3-(1H-pyrazol-5-yl)imidazo[1,2-a]pyridin-6-yl)morpholine; replacement of 1-methyl-1H-pyrazol-5-boronic acid pinacol ester with 6-methylpyridin-3-boronic acid pinacol ester produced the target compound (R)-3-methyl-4-(8-(6-methylpyridin-3-yl)-3-(1H-pyrazol-5-yl)imidazo[1,2-b]pyridazin-6-yl)morpholine; replacement of 1-methyl-1H-pyrazol-5-boronic acid pinacol ester with 4-(methylsulfonyl)phenylboronic acid pinacol ester produced the target compound (R)-3-methyl-4-(8-(4-(methylsulfonyl)phenyl)-3-(1H-pyrazol-5-yl)imidazo[1,2-b]pyridazin-6-yl)morpholine.

The compounds of this disclosure can be prepared as illustrated by the exemplary reaction in Scheme 2. 8-Bromo-6-chloro-3-iodoimidazo[1,2-b]pyridazine, morpholine and DIEA were reacted in THE under heating to produce 4-(6-chloro-3-iodoimidazo[1,2-b]pyridazin-8-yl)morpholine. 4-(6-Chloro-3-iodoimidazo[1,2-b]pyridazin-8-yl)morpholine, 1-(tetrahydro-2H-pyran-2-yl)-1H-pyrazol-5-boronic acid pinacol ester, Pd(PPh₃)₄ and K₃PO₄ aqueous solution were reacted in dioxane under heating to produce 4-(6-chloro-3-(1-(tetrahydro-2H-pyran-2-yl)-1H-pyrazol-5-yl)imidazo[1,2-b]pyridazin-8-yl)morpholine. 4-(6-Chloro-3-(1-(tetrahydro-2H-pyran-2-yl)-1H-pyrazol-5-yl)imidazo[1,2-b]pyridazin-8-yl)morpholine, (R)-3-methylmorpholine, t-BuONa, Pd(dba)₂ and binaphthyldiphenylphosphorus were reacted in toluene under heating to produce (3R)-3-methyl-4-(8-morpholin-3-(1-(tetrahydro-2H-pyran-2-yl)-1H-pyrazol-5-yl)imidazo[1,2-b]pyridazin-6-yl)morpholine. (3R)-3-Methyl-4-(8-morpholin-3-(1-(tetrahydro-2H-pyran-2-yl)-1H-pyrazol-5-yl)imidazo[1,2-b]pyridazin-6-yl)morpholine and HCl/methanol solution were reacted in methanol at

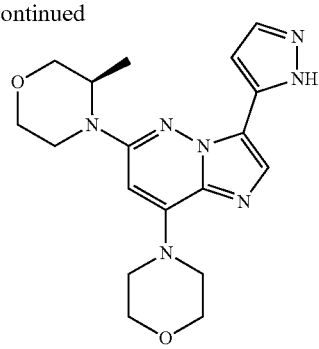

Other related compounds can be prepared using similar methods. For example, replacement of morpholine with (2S,6R)-2,6-dimethylmorpholine produced the target compound (2S,6R)-2,6-dimethyl-4-(6-((R)-3-methylmorpholino)-3-(1H-pyrazol-5-yl)imidazo[1,2-b]pyridazin-8-yl) morpholine.

The compounds of this disclosure can be prepared as illustrated by the exemplary reaction in Scheme 3. 4-Bromo-1,2-dihydropyridazin-3,6-dione, (1-methyl-1H-pyrazol-5-yl)boronic acid, potassium phosphate aqueous solution and [1,1'-bis(diphenylphosphino)ferrocene]dichloropalladium (Pd(dppf)Cl₂) in N,N-dimethylformamide (DMF) were reacted under heating to produce 4-(1-methyl-1H-pyrazol-5-yl)-1,2-dihydropyridazin-3,6-dione. 4-(1-Methyl-1H-pyrazol-5-yl)-1,2-dihydropyridazin-3,6-dione and phosphorus oxychloride were reacted under heating to produce 3,6-dichloro-4-(1-methyl-1H-pyrazol-5-yl)pyridazine. 3,6-Dichloro-4-(1-methyl-1H-pyrazol-5-yl)pyridazine and (R)-3-methylmorpholine were reacted in N-methylpyrrolidone in the presence of N,N-diisopropylethylamine (DIEA) and CuBr under heating to produce (R)-4-(6-chloro-5-(1-methyl-1H-pyrazol-5-yl)pyridazin-3-yl)-3-methylmorpholine. (R)-4-(6-Chloro-5-(1-methyl-1H-pyrazol-5-yl)pyridazin-3-yl)-3-methylmorpholine and Zn(CN)₂ with the catalysis of [1,1'-bis(diphenylphosphino)ferrocene]dichloropalladium (DPPF) and Pd₂(dba)₃ were reacted in DMF and a small amount of water under heating to produce (R)-4-(1-methyl-1H-pyrazol-5-yl)-6-(3-methylmorpholinyl)pyridazin-3-carbonitrile. (R)-4-(1-Methyl-1H-pyrazol-5-yl)-6-(3-methylmorpholinyl)pyridazin-3-carbonitrile were reacted under hydrogen atmosphere with the catalysis of Raney Ni at room temperature to produce (R)-(4-(1-methyl-1H-pyrazol-5-yl)-6-(3-methylmorpholinyl)pyridazin-3-yl)methylamine. (R)-(4-(1-Methyl-1H-pyrazol-5-yl)-6-(3-methylmorpholinyl)pyridazin-3-yl)methylamine and 1H-pyrazol-5-carboxylic acid were reacted in DMF in the presence of 2-(7-azabenzotriazol)-N,N,N',N'-tetramethyluronium hexafluorophosphate (HATU) and DIEA at room temperature to produce N-((4-(1-methyl-1H-pyrazol-5-yl)-6-((R)-3-methylmorpholinyl)-2,3-dihydropyridazin-3-yl)methyl)-1H-pyrazol-5-carboxamide. N-((4-(1-Methyl-1H-pyrazol-5-yl)-6-((R)-3-methylmorpholinyl)-2,3-dihydropyridazin-3-yl)methyl)-1H-pyrazol-5-carboxamide was reacted in POCl₃ under heating to produce the target compound (R)-3-methyl-4-(4-(1-methyl-1H-pyrazol-5-yl)-7-(1H-pyrazol-5-yl)imidazo[1,5-b]pyridazin-2-yl)morpholine.

Scheme 3

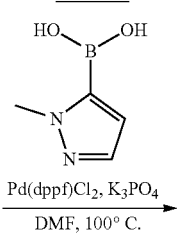

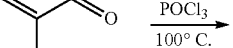

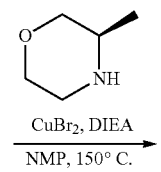

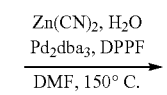

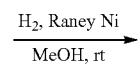

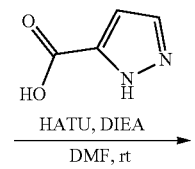

-continued

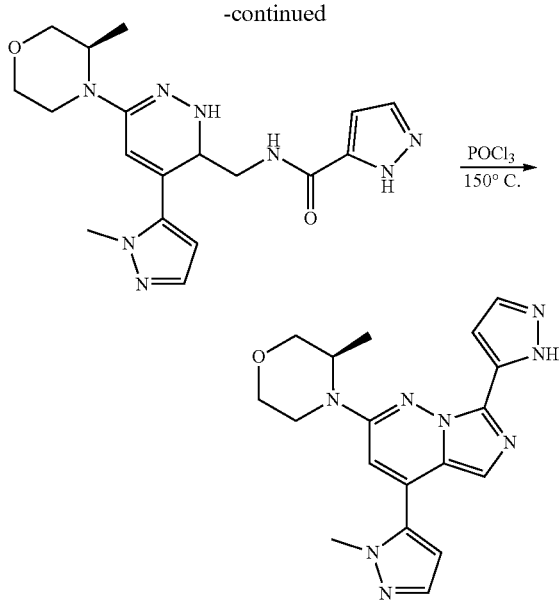

Other related compounds can be prepared using similar methods. For example, replacement of morpholine with (R)-3-methylmorpholine produced the target compound 4-(8-(1-methyl-1H-pyrazol-5-yl)-3-(1H-pyrazol-5-yl)-[1,2,4]triazolo[4,3-b]pyridazin-6-yl)morpholine; replacement of 1H-pyrazol-5-carboxylic acid with 1H-pyrrol-3-carboxylic acid produced the target compound (R)-3-methyl-4-(4-(1-methyl-1H-pyrazol-5-yl)-7-(1H-pyrrol-3-yl)imidazo[1,5-b]pyridazin-2-yl)morpholine; replacement of 1H-pyrazol-5-carboxylic acid with 1H-imidazol-4-carboxylic acid produced the target compound (R)-4-(7-(1H-imidazol-4-yl)-4-(1-methyl-1H-pyrazol-5-yl)imidazo[1,5-b]pyridazin-2-yl)-3-methylmorpholine; replacement of (1-methyl-1H-pyrazol-5-yl)boronic acid with (6-methylpyridin-3-yl)boronic acid produced the target compound (R)-3-methyl-4-(4-(6-methylpyridin-3-yl)-7-(1H-pyrazol-5-yl)imidazo[1,5-b]pyridazin-2-yl)morpholine; replacement of (1-methyl-1H-pyrazol-5-yl)boronic acid with (2-fluorophenyl)boronic acid produced the target compound (R)-4-(4-(2-fluorophenyl)-7-(1H-pyrazol-5-yl)imidazo[1,5-b]pyridazin-2-yl)-3-methylmorpholine.

The compounds of this disclosure can be prepared as illustrated by the exemplary reaction in Scheme 4. Reaction of 3,6-dichloropyridazin-4-amine, hexane-2,5-dione and TsOH·H₂O in toluene under heating, produced 3,6-dichloro-4-(2,5-dimethyl-1H-pyrrol-1-yl)pyridazine. Reaction of 3,6-dichloro-4-(2,5-dimethyl-1H-pyrrol-1-yl)pyridazine, (R)-3-methylmorpholine and DIEA in NMP under heating, produced (R)-4-(6-chloro-5-(2,5-dimethyl-1H-pyrrol-1-yl)pyridazin-3-yl)-3-methylmorpholine. Reaction of (R)-4-(6-chloro-5-(2,5-dimethyl-1H-pyrrol-1-yl)pyridazin-3-yl)-3-methylmorpholine, Zn(CN)₂, 1,1'-Bis(diphenylphosphino)ferrocene (DPPF), Pd₂(dba)₃ and water in DMF under heating, produced (R)-4-(2,5-dimethyl-1H-pyrrol-1-yl)-6-(3-methylmorpholino)pyridazine-3-carbonitrile. Reaction of (R)-4-(2,5-dimethyl-1H-pyrrol-1-yl)-6-(3-methylmorpholino)pyridazine-3-carbonitrile, H₂, and Raney Ni in MeOH at room temperature, produced (R)-(4-(2,5-dimethyl-1H-pyrrol-1-yl)-6-(3-methylmorpholino)pyridazin-3-yl)methanamine. (R)-(4-(2,5-Dimethyl-1H-pyrrol-1-yl)-6-(3-methylmorpholino)pyridazin-3-yl)methanamine, 1H-pyrazole-5-carboxylic acid, HATU and DIEA in DMF were reacted at room temperature, and then K₂CO₃ was added and the mixture was reacted at room temperature, produced (R)—N-((4-(2,5-dimethyl-1H-pyrrol-1-yl)-6-(3-methylmorpholino)pyridazin-3-yl)methyl)-1H-pyrazole-5-carboxamid. Reaction of (R)—N-((4-(2,5-dimethyl-1H-pyrrol-1-yl)-6-(3-methylmorpholino)pyridazin-3-yl)methyl)-1H-pyrazole-5-carboxamide in POCl₃ under heating, produced (R)-4-(4-(2,5-dimethyl-1H-pyrrol-1-yl)-7-(1H-pyrazol-5-yl)imidazo[1,5-b]pyridazin-2-yl)-3-methylmorpholine. Reaction of (R)-4-(4-(2,5-dimethyl-1H-pyrrol-1-yl)-7-(1H-pyrazol-5-yl)imidazo[1,5-b]pyridazin-2-yl)-3-methylmorpholine in TFA/H₂O under heating, produced (R)-2-(3-methylmorpholino)-7-(1H-pyrazol-5-yl)imidazo[1,5-b]pyridazin-4-ol. (R)-2-(3-Methylmorpholino)-7-(1H-pyrazol-5-yl)imidazo[1,5-b]pyridazin-4-ol and TEA in dry DCM were reacted at 0° C., and then Tf₂O was added and the mixture was reacted at from 0° C. to rt, produced (R)-2-(3-methylmorpholino)-7-(1-((trifluoromethyl)sulfonyl)-1H-pyrazol-5-yl)imidazo[1,5-b]pyridazin-4-yl trifluoromethanesulfonate. (R)-2-(3-Methylmorpholino)-7-(1-((trifluoromethyl)sulfonyl)-1H-pyrazol-5-yl)imidazo[1,5-b]pyridazin-4-yl trifluoromethanesulfonate, 1-isopropyl-5-(4,4,5,5-tetramethyl-1,3,2-dioxaborolan-2-yl)-1H-pyrazole, K₂CO₃, and Pd(dppf)Cl₂ in dioxane were reacted under heating, and then aq. LiOH was added, and the mixture was reacted at room temperature, produced the targeted compound (R)-4-(4-(1-isopropyl-1H-pyrazol-5-yl)-7-(1H-pyrazol-5-yl)imidazo[1,5-b]pyridazin-2-yl)-3-methylmorpholine.

Scheme 4

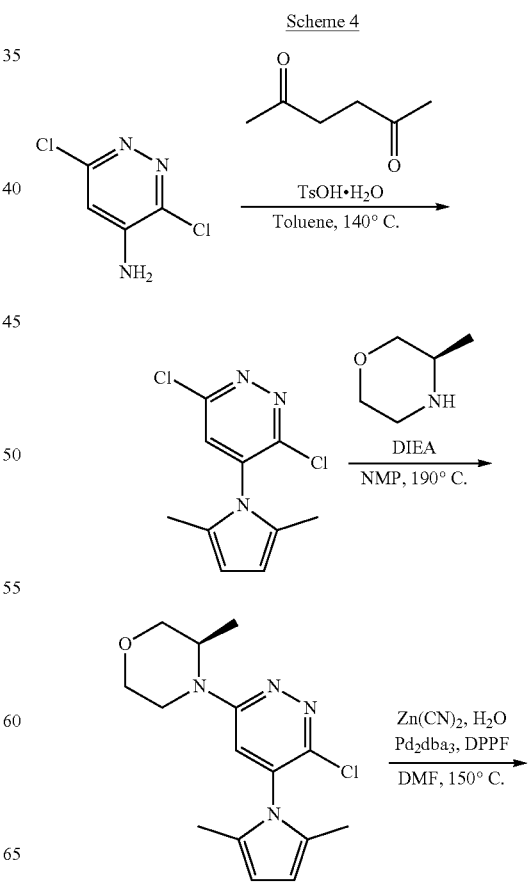

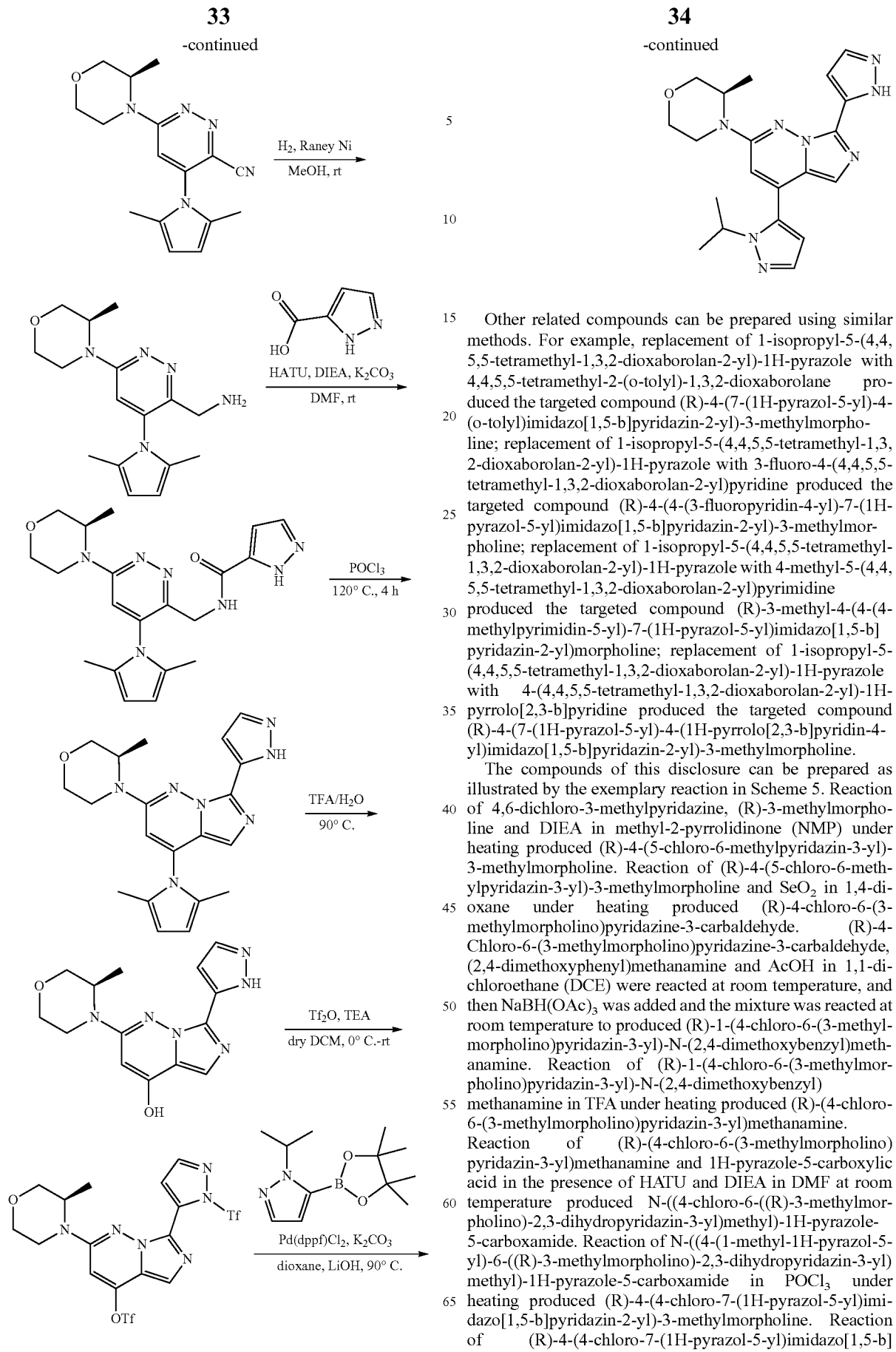

Other related compounds can be prepared using similar methods. For example, replacement of 1-isopropyl-5-(4,4,5,5-tetramethyl-1,3,2-dioxaborolan-2-yl)-1H-pyrazole with 4,4,5,5-tetramethyl-2-(o-tolyl)-1,3,2-dioxaborolane produced the targeted compound (R)-4-(7-(1H-pyrazol-5-yl)-4-(o-tolyl)imidazo[1,5-b]pyridazin-2-yl)-3-methylmorpholine; replacement of 1-isopropyl-5-(4,4,5,5-tetramethyl-1,3,2-dioxaborolan-2-yl)-1H-pyrazole with 3-fluoro-4-(4,4,5,5-tetramethyl-1,3,2-dioxaborolan-2-yl)pyridine produced the targeted compound (R)-4-(4-(3-fluoropyridin-4-yl)-7-(1H-pyrazol-5-yl)imidazo[1,5-b]pyridazin-2-yl)-3-methylmorpholine; replacement of 1-isopropyl-5-(4,4,5,5-tetramethyl-1,3,2-dioxaborolan-2-yl)-1H-pyrazole with 4-methyl-5-(4,4,5,5-tetramethyl-1,3,2-dioxaborolan-2-yl)pyrimidine produced the targeted compound (R)-3-methyl-4-(4-(4-methylpyrimidin-5-yl)-7-(1H-pyrazol-5-yl)imidazo[1,5-b]pyridazin-2-yl)morpholine; replacement of 1-isopropyl-5-(4,4,5,5-tetramethyl-1,3,2-dioxaborolan-2-yl)-1H-pyrazole with 4-(4,4,5,5-tetramethyl-1,3,2-dioxaborolan-2-yl)-1H-pyrrolo[2,3-b]pyridine produced the targeted compound (R)-4-(7-(1H-pyrazol-5-yl)-4-(1H-pyrrolo[2,3-b]pyridin-4-yl)imidazo[1,5-b]pyridazin-2-yl)-3-methylmorpholine.

The compounds of this disclosure can be prepared as illustrated by the exemplary reaction in Scheme 5. Reaction of 4,6-dichloro-3-methylpyridazine, (R)-3-methylmorpholine and DIEA in methyl-2-pyrrolidinone (NMP) under heating produced (R)-4-(5-chloro-6-methylpyridazin-3-yl)-3-methylmorpholine. Reaction of (R)-4-(5-chloro-6-methylpyridazin-3-yl)-3-methylmorpholine and SeO$_2$ in 1,4-dioxane under heating produced (R)-4-chloro-6-(3-methylmorpholino)pyridazine-3-carbaldehyde. (R)-4-Chloro-6-(3-methylmorpholino)pyridazine-3-carbaldehyde, (2,4-dimethoxyphenyl)methanamine and AcOH in 1,1-dichloroethane (DCE) were reacted at room temperature, and then NaBH(OAc)$_3$ was added and the mixture was reacted at room temperature to produced (R)-1-(4-chloro-6-(3-methylmorpholino)pyridazin-3-yl)-N-(2,4-dimethoxybenzyl)methanamine. Reaction of (R)-1-(4-chloro-6-(3-methylmorpholino)pyridazin-3-yl)-N-(2,4-dimethoxybenzyl)methanamine in TFA under heating produced (R)-(4-chloro-6-(3-methylmorpholino)pyridazin-3-yl)methanamine. Reaction of (R)-(4-chloro-6-(3-methylmorpholino)pyridazin-3-yl)methanamine and 1H-pyrazole-5-carboxylic acid in the presence of HATU and DIEA in DMF at room temperature produced N-((4-chloro-6-((R)-3-methylmorpholino)-2,3-dihydropyridazin-3-yl)methyl)-1H-pyrazole-5-carboxamide. Reaction of N-((4-(1-methyl-1H-pyrazol-5-yl)-6-((R)-3-methylmorpholino)-2,3-dihydropyridazin-3-yl)methyl)-1H-pyrazole-5-carboxamide in POCl$_3$ under heating produced (R)-4-(4-chloro-7-(1H-pyrazol-5-yl)imidazo[1,5-b]pyridazin-2-yl)-3-methylmorpholine. Reaction of (R)-4-(4-chloro-7-(1H-pyrazol-5-yl)imidazo[1,5-b]

pyridazin-2-yl)-3-methylmorpholine, cyclopropylboronic acid, K$_3$PO$_4$·3H$_2$O with the catalyst Pd(OAc)$_2$ and tricyclohexylphosphine in the mixed solvent of 1,4-dioxane and toluene under heating produced the targeted compound (R)-4-(4-cyclopropyl-7-(1H-pyrazol-5-yl)imidazo[1,5-b]pyridazin-2-yl)-3-methylmorpholine.

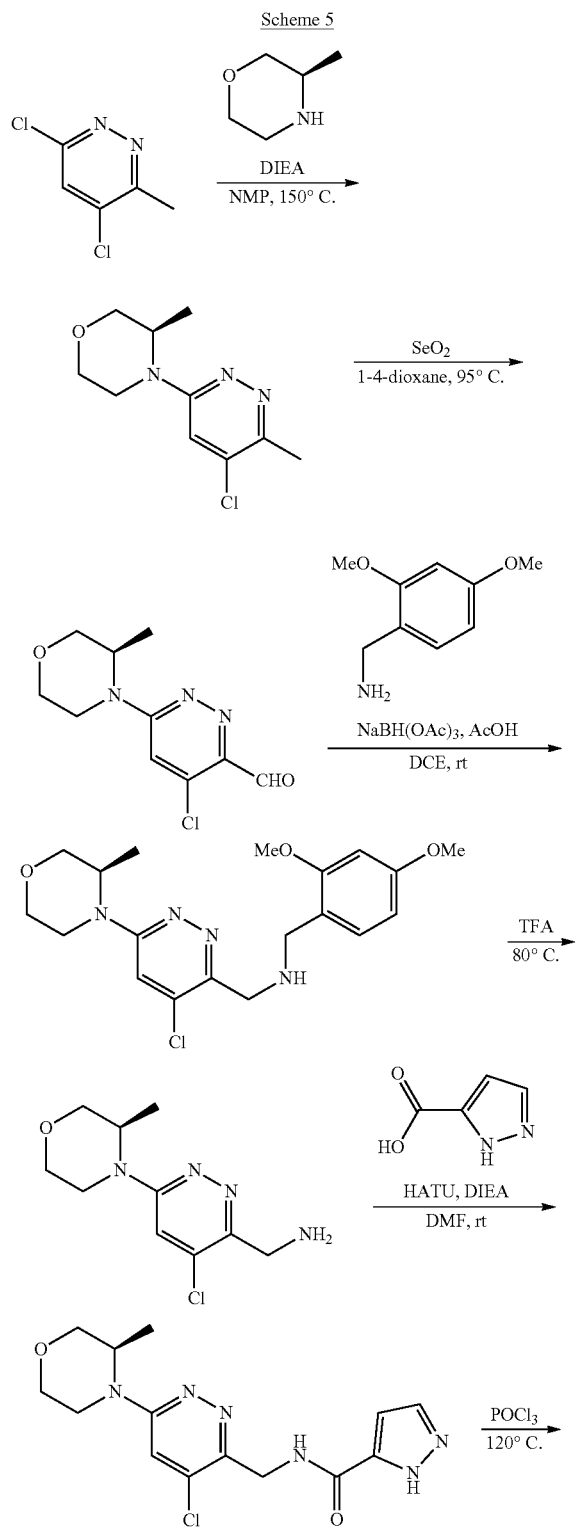

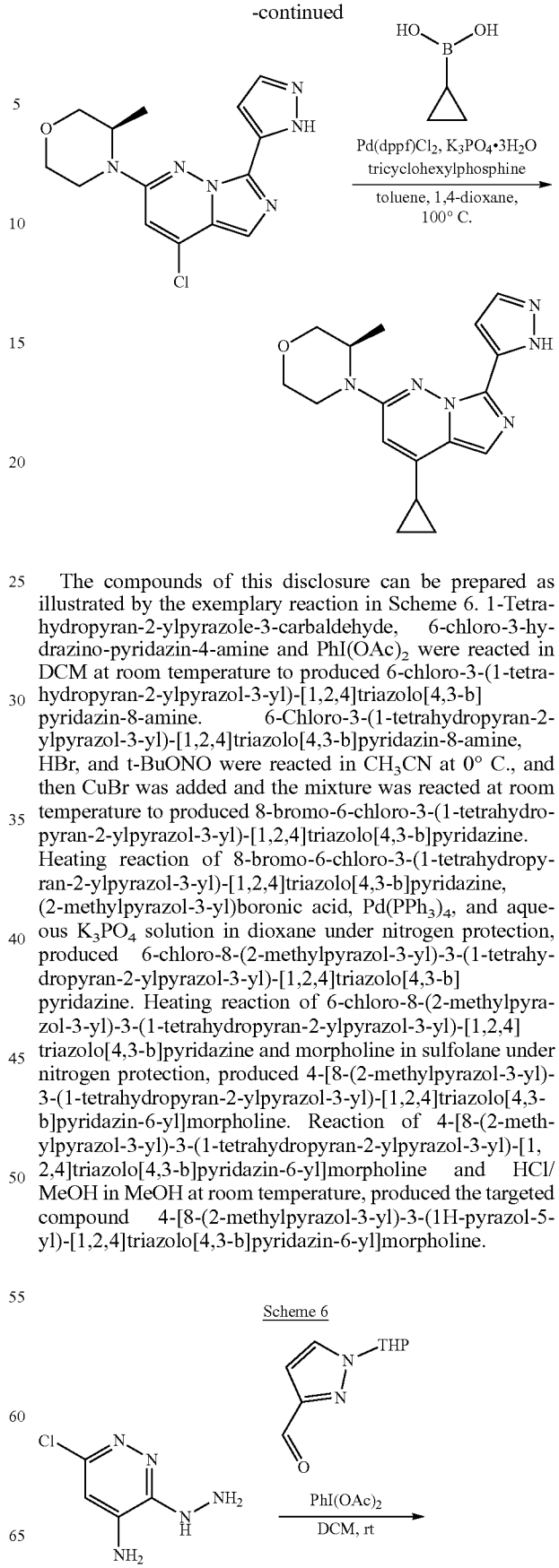

The compounds of this disclosure can be prepared as illustrated by the exemplary reaction in Scheme 6. 1-Tetrahydropyran-2-ylpyrazole-3-carbaldehyde, 6-chloro-3-hydrazino-pyridazin-4-amine and PhI(OAc)$_2$ were reacted in DCM at room temperature to produced 6-chloro-3-(1-tetrahydropyran-2-ylpyrazol-3-yl)-[1,2,4]triazolo[4,3-b]pyridazin-8-amine. 6-Chloro-3-(1-tetrahydropyran-2-ylpyrazol-3-yl)-[1,2,4]triazolo[4,3-b]pyridazin-8-amine, HBr, and t-BuONO were reacted in CH$_3$CN at 0° C., and then CuBr was added and the mixture was reacted at room temperature to produced 8-bromo-6-chloro-3-(1-tetrahydropyran-2-ylpyrazol-3-yl)-[1,2,4]triazolo[4,3-b]pyridazine. Heating reaction of 8-bromo-6-chloro-3-(1-tetrahydropyran-2-ylpyrazol-3-yl)-[1,2,4]triazolo[4,3-b]pyridazine, (2-methylpyrazol-3-yl)boronic acid, Pd(PPh$_3$)$_4$, and aqueous K$_3$PO$_4$ solution in dioxane under nitrogen protection, produced 6-chloro-8-(2-methylpyrazol-3-yl)-3-(1-tetrahydropyran-2-ylpyrazol-3-yl)-[1,2,4]triazolo[4,3-b]pyridazine. Heating reaction of 6-chloro-8-(2-methylpyrazol-3-yl)-3-(1-tetrahydropyran-2-ylpyrazol-3-yl)-[1,2,4]triazolo[4,3-b]pyridazine and morpholine in sulfolane under nitrogen protection, produced 4-[8-(2-methylpyrazol-3-yl)-3-(1-tetrahydropyran-2-ylpyrazol-3-yl)-[1,2,4]triazolo[4,3-b]pyridazin-6-yl]morpholine. Reaction of 4-[8-(2-methylpyrazol-3-yl)-3-(1-tetrahydropyran-2-ylpyrazol-3-yl)-[1,2,4]triazolo[4,3-b]pyridazin-6-yl]morpholine and HCl/MeOH in MeOH at room temperature, produced the targeted compound 4-[8-(2-methylpyrazol-3-yl)-3-(1H-pyrazol-5-yl)-[1,2,4]triazolo[4,3-b]pyridazin-6-yl]morpholine.

Scheme 6

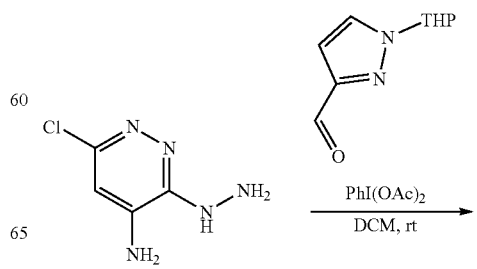

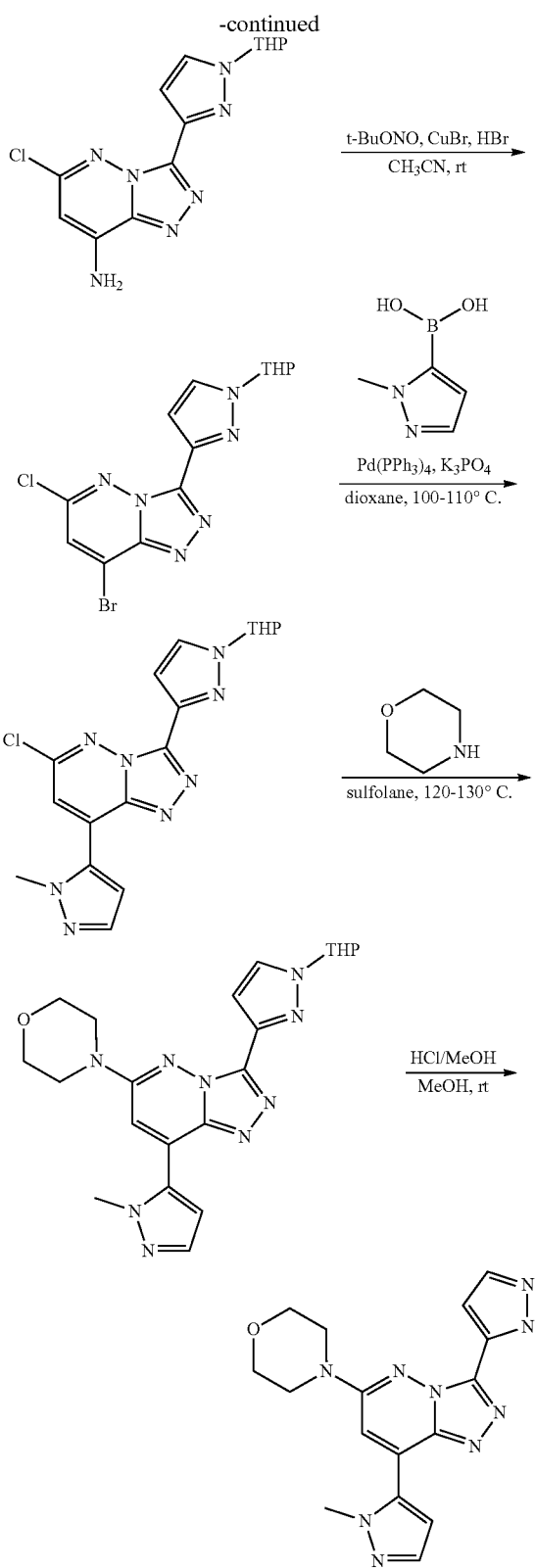

The compounds of this disclosure can be prepared as illustrated by the exemplary reaction in Scheme 7. Reaction of 5,7-dichloropyrazolo[1,5-a]pyrimidine, Pd(dppf)Cl$_2$ and aqueous K$_3$PO$_4$ solution in dioxane under heating, produced 5-chloro-7-(1-methyl-1H-pyrazol-5-yl)pyrazolo[1,5-a]pyrimidine. Heating reaction of 5-chloro-7-(1-methyl-1H-pyrazol-5-yl)pyrazolo[1,5-a]pyrimidine, sodium tert-butoxide, (±)-2,2'-bis(diphenylphosphino)-1,1'-binaphthalene (BINAP), and tris(dibenzylideneacetone)dipalladium in toluene at room temperature produced (R)-3-methyl-4-(7-(1-methyl-1H-pyrazol-5-yl)pyrazolo[1,5-a]pyrimidin-5-yl)morpholine. Reaction of (R)-3-methyl-4-(7-(1-methyl-1H-pyrazol-5-yl)pyrazolo[1,5-a]pyrimidin-5-yl)morpholine, N-iodosuccinimide (NIS) and trifluoroacetic acid (TFA) in CHCl$_3$ at room temperature, produced (R)-4-(3-iodo-7-(1-methyl-1H-pyrazol-5-yl)pyrazolo[1,5-a]pyrimidin-5-yl)-3-methylmorpholine. Reaction of (R)-4-(3-iodo-7-(1-methyl-1H-pyrazol-5-yl)pyrazolo[1,5-a]pyrimidin-5-yl)-3-methylmorpholine, 1-(tetrahydro-2H-pyran-2-yl)-5-(4,4,5,5-tetramethyl-1,3,2-dioxaborolan-2-yl)-1H-pyrazole, potassium trihydrate phosphate and Pd(dppf)Cl$_2$ in the mixed solvent of dioxane and water under heating, produced (3R)-3-methyl-4-(7-(1-methyl-1H-pyrazol-5-yl)-3-(1-(tetrahydro-2H-pyran-2-yl)-1H-pyrazol-5-yl)pyrazolo[1,5-a]pyrimidin-5-yl)morpholine. Reaction of (3R)-3-methyl-4-(7-(1-methyl-1H-pyrazol-5-yl)-3-(1-(tetrahydro-2H-pyran-2-yl)-1H-pyrazol-5-yl)pyrazolo[1,5-a]pyrimidin-5-yl)morpholine, HCl/dioxane and water at room temperature, produced the targeted compound (R)-3-methyl-4-(7-(1-methyl-1H-pyrazol-5-yl)-3-(1H-pyrazol-5-yl)pyrazolo[1,5-a]pyrimidin-5-yl)morpholine.

Scheme 7

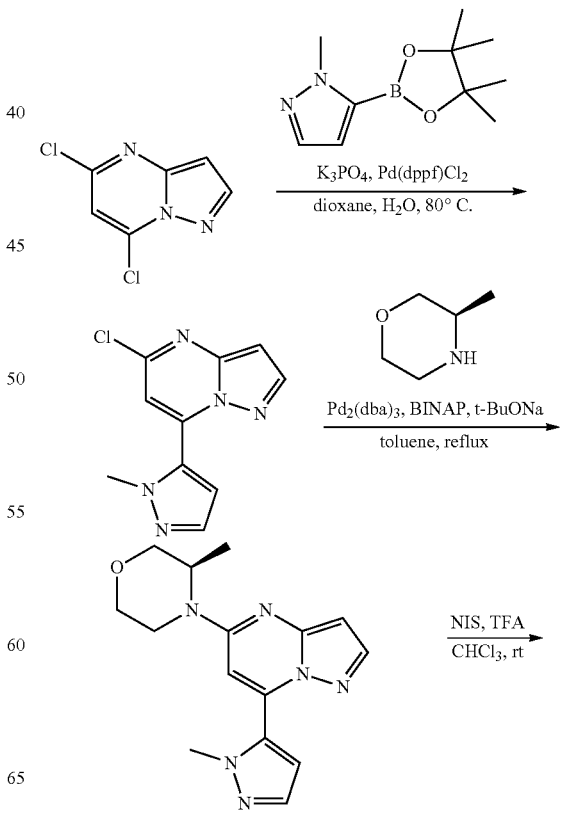

Other related compounds can be prepared using similar methods. For example, replacement of morpholine with (R)-3-methylmorpholine produced the targeted compound (R)-3-methyl-4-(8-(1-methyl-1H-pyrazol-5-yl)-3-(1H-pyrazol-5-yl)-[1,2,4]triazolo[4,3-b]pyridazin-6-yl)morpholine.

-continued

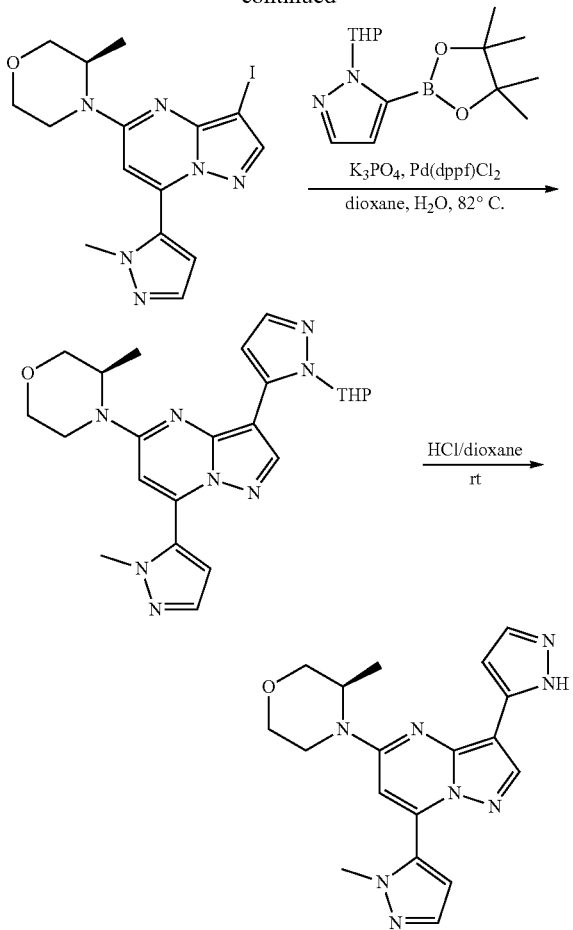

One important aspect of the present disclosure is the find that the compounds of Formula I (including the compounds of Formulae II, IIIa, IIIb and IV as described herein) or stereoisomers, tautomers, N-oxides, hydrates, isotope-substituted derivatives, solvates or pharmaceutically acceptable salts thereof, or mixtures thereof, or prodrugs thereof are kinase inhibitors, especially ATR kinase inhibitors. Therefore, the compounds of Formula I (including the compounds of Formulae II, IIIa, IIIb and IV as described herein) can be used to treat an ATR kinase-mediated related disease, such as cancer; or be used to prepare medicaments for the treatment of an ATR kinase-mediated related disease, such as cancer.

The present disclosure also includes methods for the treatment or prevention of kinase-mediated diseases, especially ATR kinase-mediated related diseases, comprising administering to an object (especially mammal, more specifically human) in need an effective amount of the compound of Formula I (including the compound of Formulae II, IIIa, IIIb and IV as described herein) or stereoisomers, tautomers, N-oxides, hydrates, isotope-substituted derivatives, solvates or pharmaceutically acceptable salts thereof, or mixtures thereof, or prodrugs thereof, or a pharmaceutical composition comprising an effective amount of the compound of Formula I (including the compound of Formulae II, IIIa, IIIb and IV as described herein) or stereoisomers, tautomers, N-oxides, hydrates, isotope-substituted derivatives, solvates or pharmaceutically acceptable salts thereof, or mixtures thereof, or prodrugs thereof. In the disclosure, the kinase-mediated diseases include cancer, especially ATR kinase-mediated cancer. The ATR kinase-mediated diseases that can be treated or prevented by the methods or pharmaceutical compositions of the disclosure include without limitation liver cancer, melanoma, Hodgkin's disease, non-Hodgkin's lymphoma, acute lymphocytic leukemia, chronic lymphocytic leukemia, multiple myeloma, neuroblastoma, breast cancer, ovarian cancer, lung cancer, Wilms tumor, cervical cancer, testicular cancer, soft tissue sarcoma, primary macroglobulinemia, bladder cancer, chronic myeloid leukemia, primary brain cancer, malignant melanoma, small cell lung cancer, gastric cancer, colon cancer, malignant pancreatic islet tumor, malignant carcinoid cancer, choriocarcinoma, mycosis fungoides, head and neck cancer, osteogenic sarcoma, pancreatic cancer, acute myeloid leukemia, hairy cell leukemia, rhabdomyosarcoma, Kaposi's sarcoma, urogenital tumors, thyroid cancer, esophageal cancer, malignant hypercalcemia, cervical hyperplasia, renal cell carcinoma, endometrial cancer, polycythemia vera, idiopathic thrombocythemia, adrenocortical carcinoma, skin cancer, and prostate cancer.

The present disclosure also includes use for the treatment or prevention of other diseases caused by excessive or abnormal cell proliferation, including proliferative or hyperproliferative diseases, such as myeloproliferative diseases, especially proliferative or hyperproliferative diseases caused by excessive or abnormal cell proliferation mediated by ATR kinase. Therefore, the disclosure also includes the preparation of medicaments for the treatment or prevention of other diseases caused by excessive or abnormal cell proliferation, especially proliferative or hyperproliferative diseases caused by excessive or abnormal cell proliferation mediated by ATR kinase, using the compound of Formula I (including the compound of Formulae II, IIIa, IIIb and IV as described herein) or stereoisomers, tautomers, N-oxides, hydrates, isotope-substituted derivatives, solvates or pharmaceutically acceptable salts thereof, or mixtures thereof, or prodrugs thereof.

In practicing the therapeutic methods, effective amounts of pharmaceutical preparations are administered to an individual exhibiting the symptoms of one or more of these disorders. The pharmaceutic preparations comprise therapeutically effective concentrations of the compounds of Formula I, II, IIIa, IIIb or IV, or stereoisomers, tautomers, N-oxides, hydrates, isotope-substituted derivatives, solvates or pharmaceutically acceptable salts thereof, or mixtures thereof, or prodrugs thereof formulated for oral, intravenous, local or topical application, for the treatment of cancer and other diseases. The amounts are effective to ameliorate or eliminate one or more symptoms of the disorders. An effective amount of a compound for treating a particular disease is an amount that is sufficient to ameliorate or in some manner reduce the symptoms associated with the disease. Such amount may be administered as a single dosage or may be administered according to an effective regimen. The amount may cure the disease but, typically, is administered in order to ameliorate the symptoms of the disease. Typically, repeated administration is required to achieve the desired amelioration of symptom.

In another embodiment, there is provided a pharmaceutical composition comprising a compound of Formula I, II, IIIa, IIIb or IV, or stereoisomers, tautomers, N-oxides, hydrates, isotope-substituted derivatives, solvates or pharmaceutically acceptable salts thereof, or mixtures thereof, or prodrugs thereof as an ATR kinase inhibitor, and a pharmaceutically acceptable carrier.

Another embodiment of the present disclosure is directed to a pharmaceutical composition effective to treat cancer comprising a compound of Formula I, II, IIIa, IIIb or IV, or stereoisomers, tautomers, N-oxides, hydrates, isotope-substituted derivatives, solvates or pharmaceutically acceptable salts thereof, or mixtures thereof, or prodrug thereof, which functions as a kinase inhibitor, in combination with at least one known anticancer agent or a pharmaceutically acceptable salt thereof. In particular, the compound herein can be combined with other anticancer drugs related to the mechanism of DNA damage and repair, including PARP inhibitors, such as Olaparib, Niraprib, Rucaparib, Talazoparib and Senaparib; HDAC inhibitors such as Volinota, Romididesin, Papiseta and Bailesta; and so on. And the compound herein can be combined with other anticancer drugs related to cell division detection sites, including Chk1/2 inhibitors, CDK4/6 inhibitors such as Paposinib, ATM inhibitors, Wee1 inhibitors, DNA-PK inhibitors, and so on. Other known anticancer agents which may be used for anticancer combination therapy include, but are not limited to alkylating agents, such as busulfan, melphalan, chlorambucil, cyclophosphamide, ifosfamide, temozolomide, bendamustine, cis-platin, mitomycin C, bleomycin and carboplatin; topoisomerase I inhibitors, such as camptothecin, irinotecan and topotecan; topoisomerase II inhibitors, such as doxorubicin, epirubicin, aclacinomycin, mitoxantrone, elliptinium and etoposide; RNA/DNA antimetabolites, such as 5-azacytidine, gemcitabine, 5-fluorouracil, capecitabine and methotrexate; DNA antimetabolites, such as 5-fluoro-2'-deoxyuridine, fludarabine, nelarabine, ara-C, pralatrexate, pemetrexed, hydroxyurea and thioguanine; antimitotic agent such as colchicine, vinblastine, vincristine, vinorelbine, paclitaxel, ixabepilone, cabazitaxel and docetaxel; antibodies such as mAb, panitumumab, necitumumab, nivolumab, pembrolizumab, ramucirumab, bevacizumab, pertuzumab, trastuzumab, cetuximab, obinutuzumab, ofatumumab, rituximab, alemtuzumab, ibritumomab, tositumomab, brentuximab, daratumumab, elotuzumab, T-DM1, Ofatumumab, Dinutuximab, Blinatumomab, ipilimumab, avastin, herceptin and mabthera; kinase inhibitors such as imatinib, gefitinib, erlotinib, osimertinib, afatinib, ceritinib, alectinib, crizotinib, erlotinib, lapatinib, sorafenib, regorafenib, vemurafenib, dabrafenib, aflibercept, sunitinib, nilotinib, dasatinib, bosutinib, ponatinib, ibrutinib, cabozantinib, lenvatinib, vandetanib, trametinib, cobimetinib, axitinib, temsirolimus, Idelalisib, pazopanib, Torisel and everolimus. Other known anticancer agents which may be used for anticancer combination therapy include tamoxifen, letrozole, fulvestrant, mitoguazone, octreotide, retinoic acid, arsenic, zoledronic acid, bortezomib, carfilzomib, Ixazomib, vismodegib, sonidegib, denosumab, thalidomide, lenalidomide, Venetoclax, Aldesleukin (recombinant human interleukin-2) and Sipueucel-T (prostate cancer treatment vaccine).

In practicing the methods of the present disclosure, the compound of the disclosure may be administered together with at least one known anticancer agent in a unitary pharmaceutical composition. Alternatively, the compound of the disclosure may be administered separately from at least one known anticancer agent. In one embodiment, the compound of the disclosure and at least one known anticancer agent are administered substantially simultaneously, i.e. all agents are administered at the same time or one after another, provided that compounds reach therapeutic levels in the blood at the same time. In another embodiment, the compound of the disclosure and at least one known anti-cancer agent are administered according to individual dose schedule, provided that the compounds reach therapeutic levels in the blood.

Another embodiment of the present disclosure is directed to a bioconjugate, which functions as a kinase inhibitor, that comprises a compound described herein and is effective to inhibit tumor. The bioconjugate that inhibits tumor is consisted of the compound described herein and at least one known therapeutically useful antibody, such as trastuzumab or rituximab, or growth factor, such as EGF or FGF, or cytokine, such as IL-2 or IL-4, or any molecule that can bind to cell surface. The antibodies and other molecules could deliver the compound described herein to its targets, making it an effective anticancer agent. The bioconjugates could also enhance the anticancer effect of the therapeutically useful antibodies, such as trastuzumab or rituximab.

Another embodiment of the present disclosure is directed to a pharmaceutical composition effective to inhibit tumor comprising the kinase inhibitor of Formula I (including the compound of Formulae II, IIIa, IIIb and IV as described herein), or stereoisomers, tautomers, N-oxides, hydrates, isotope-substituted derivatives, solvates or pharmaceutically acceptable salts thereof, or mixtures thereof, or prodrug, in combination with radiation therapy. In this embodiment, the compound of the disclosure may be administered at the same time as the radiation therapy or at a different time.

Yet another embodiment of the present disclosure is directed to a pharmaceutical composition effective for post-surgical treatment of cancer, comprising the kinase inhibitor of Formula I, II, IIIa, IIIb or IV, or stereoisomers, tautomers, N-oxides, hydrates, isotope-substituted derivatives, solvates or pharmaceutically acceptable salts thereof, or mixtures thereof, or prodrug. The disclosure also relates to a method of treating cancer by surgically removing tumor and then treating the mammal with the pharmaceutical composition described herein.

Pharmaceutical compositions of this disclosure include all pharmaceutical preparations which contain the compounds of the present disclosure in an amount that is effective to achieve its intended purpose. While individual needs vary, determination of optimal amounts of each component in the pharmaceutical preparations is within the skill of the art. Typically, the compounds or the pharmaceutically acceptable salt thereof may be administered to mammals, orally at a dose of about 0.0025 to 50 mg per kg body weight per day. Preferably, from approximately 0.01 mg/kg to approximately 10 mg/kg body weight is orally administered. If a known anticancer agent is also administered, it is administered in an amount that is effective to achieve its intended purpose. The optimal amounts of such known anticancer agents are well known to those skilled in the art.

The unit oral dose may comprise from approximately 0.01 to approximately 50 mg, preferably approximately 0.1 to approximately 10 mg of the compound of the disclosure. The unit dose may be administered one or more times, with one or more tablets daily, each containing from approximately 0.1 to approximately 50 mg, conveniently approximately 0.25 to 10 mg of the compound of the disclosure or its solvates.

In a topical formulation, the compound of the disclosure may be present at a concentration of approximately 0.01 to 100 mg per gram of carrier.

The compound of the disclosure may be administered as a raw chemical. The compounds of the disclosure may also be administered as part of a suitable pharmaceutical preparation containing pharmaceutically acceptable carriers (comprising excipients and auxiliaries), which facilitate the processing of the compounds into pharmaceutically acceptable preparations. Preferably, the pharmaceutical preparations, particularly oral preparations and those used for the preferred administration, such as tablets, dragees, and capsules, as well as solutions suitable for injection or oral administration, contain from approximately 0.01% to 99%, preferably from approximately 0.25% to 75% of active compound(s), together with excipient(s).

Also included within the scope of the present disclosure are the non-toxic pharmaceutically acceptable salts of the compounds of the present disclosure. Acid addition salts are formed by mixing a solution of the compounds of the present disclosure with a solution of a pharmaceutically acceptable non-toxic acid, such as hydrochloric acid, fumaric acid, maleic acid, succinic acid, acetic acid, citric acid, tartaric acid, carbonic acid, phosphoric acid, oxalic acid, and the like. Base addition salts are formed by mixing a solution of the compounds of the present disclosure with a solution of a pharmaceutically acceptable non-toxic base, such as sodium hydroxide, potassium hydroxide, choline hydroxide, sodium carbonate, tris(hydroxymethyl)aminomethane, N-methyl-glucamine and the like.

The pharmaceutical preparations of the disclosure may be administered to any mammal, so long as they may experience the therapeutic effects of the compounds of the disclosure. Foremost among such mammals are humans and veterinary animals, although the disclosure is not intended to be so limited.

The pharmaceutical preparations of the present disclosure may be administered by any means that achieve their intended purpose. For example, administration may be by parenteral, subcutaneous, intravenous, intramuscular, intraperitoneal, transdermal, buccal, intrathecal, intracranial, intranasal or topical routes. Alternatively or concurrently, administration may be by oral route. The dosage administered will be dependent upon the age, health, and weight of the recipient, type of concurrent treatment, frequency of treatment, and the nature of the effect desired.

The pharmaceutical preparations of the present disclosure are manufactured in a known manner, e.g., by means of conventional mixing, granulating, dragee-making, dissolving, or lyophilizing processes. Pharmaceutical preparations for oral use may be obtained by combining the active compounds with solid excipients, optionally grinding the resulting mixture, processing the mixture of granules after adding suitable auxiliaries if desired or necessary, thereby obtaining tablets or dragee cores.

Suitable excipients are, in particular, fillers, such as saccharides, e.g. lactose or sucrose, mannitol or sorbitol; cellulose preparations and/or calcium phosphates, e.g. tricalcium phosphate or calcium hydrogen phosphate; as well as binders, such as starch paste, including, e.g., maize starch, wheat starch, rice starch, potato starch, gelatin, tragacanth, methylcellulose, hydroxypropylmethylcellulose, sodium carboxymethylcellulose, and/or polyvinyl pyrrolidone. If desired, disintegrating agents may be added, such as the above-mentioned starches and also carboxymethyl-starch, cross-linked polyvinyl pyrrolidone, agar, or alginic acid or a salt thereof, such as sodium alginate. Auxiliaries are, in particular, flow-regulating agents and lubricants, e.g., silica, talc, stearic acid or salts thereof, such as magnesium stearate or calcium stearate, and/or polyethylene glycol. Dragee cores are provided with suitable coatings which, if desired, are resistant to gastric juices. For this purpose, concentrated saccharide solutions may be used, which may optionally contain gum arabic, talc, polyvinyl pyrrolidone, polyethylene glycol and/or titanium dioxide, lacquer solutions and suitable organic solvents or solvent mixtures. In order to produce coatings resistant to gastric juices, solutions of suitable cellulose preparations, such as acetylcellulose phthalate or hydroxypropylmethylcellulose phthalate, are used. Dyes or pigments may be added to the tablets or dragee coatings, e.g., for identification or in order to characterize combinations of active compound doses.

Other pharmaceutical preparations, which may be used orally, include push-fit capsules made of gelatin, as well as soft, sealed capsules made of gelatin and a plasticizer, such as glycerol or sorbitol. The push-fit capsules may contain the active compounds in the form of granules, which may be mixed with fillers, such as lactose; binders, such as starches; and/or lubricants, such as talc or magnesium stearate and stabilizers. In soft capsules, the active compounds are preferably dissolved or suspended in suitable liquids, such as fatty oils, or liquid paraffin. In addition, stabilizers may be added.

Suitable formulations for parenteral administration include aqueous solutions of the active compounds, e.g., aqueous solutions and alkaline solutions of water-soluble salts. In addition, suspensions of the active compounds as appropriate oily injection suspensions may be administered. Suitable lipophilic solvents or vehicles include fatty oils, e.g., sesame oil, or synthetic fatty acid esters, e.g., ethyl oleate or triglycerides or polyethylene glycol-400, or cremophor, or cyclodextrins. Aqueous injection suspensions may contain substances which increase the viscosity of the suspension, e.g., sodium carboxymethyl cellulose, sorbitol, and/or dextran. Optionally, suspension stabilizers may also be contained.

In accordance with one aspect of the present disclosure, compounds of the disclosure are employed in topical and parenteral formulations and are used for the treatment of skin cancer.

The topical formulations of this disclosure are formulated preferably as oils, creams, lotions, ointments and the like by choice of appropriate carriers. Suitable carriers include vegetable or mineral oils, white petrolatum (white soft paraffin), branched chain fats or oils, animal fats and high molecular weight alcohol (greater than $C_{12}$). The preferred carriers are those in which the active ingredient is soluble. Emulsifiers, stabilizers, humectants and antioxidants may also be included, as well as agents imparting color or fragrance, if desired. Additionally, transdermal penetration enhancers may be employed in these topical formulations. Examples of such enhancers are found in U.S. Pat. Nos. 3,989,816 and 4,444,762.

Creams are preferably formulated from a mixture of mineral oil, self-emulsifying beeswax and water in which the active ingredient, dissolved in a small amount of an oil, such as almond oil, is admixed. A typical example of such a cream is one which includes approximately 40 parts water, approximately 20 parts beeswax, approximately 40 parts mineral oil and approximately 1 part almond oil.

Ointments may be formulated by mixing a solution of the active ingredient in a vegetable oil, such as almond oil, with warm soft paraffin and allowing the mixture to cool. A typical example of such an ointment is one which includes approximately 30% almond oil and approximately 70% white soft paraffin by weight.

The present disclosure also involves use of the compounds of the disclosure for the preparation of medicaments for the treatment of clinical symptoms in response to the effect of inhibiting the activity of kinases (especially ATR kinase). These medicaments may include the above-mentioned pharmaceutical compositions.

The following examples are illustrative, but not limiting, of the method and compositions of the present disclosure. Other suitable modifications and adaptations of the variety of conditions and parameters normally encountered in clinical therapy and which are obvious to those skilled in the art are within the spirit and scope of the disclosure.

EXAMPLES

General Remarks

All reagents were of commercial quality. Solvents were dried and purified by standard methods. Mass spectrum analyses were recorded on a Platform II (Agilent 6110) quadrupole mass spectrometer fitted with an electrospray interface. $^1$H NMR spectra was recorded at 400 MHz, on a Brucker Ascend 400 apparatus. Chemical shifts were recorded in parts per million (ppm) downfield from TMS (0.00 ppm), and J coupling constants were reported in hertz (Hz).

Example 1

(R)-3-methyl-4-(8-(1-methyl-1H-pyrazol-5-yl)-3-(1H-pyrazol-5-yl)imidazo[1,2-a]pyridin-6-yl)morpholine

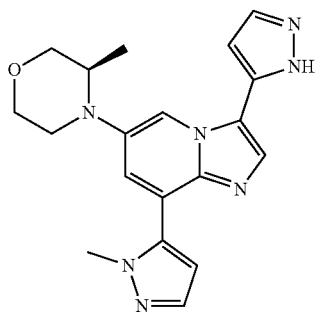 [SMILES: C[C@@H]1COCCN1c1cc(-c2ccnn2C)c2ncc(-c3ccn[nH]3)n2c1]

a) Preparation of 8-bromo-6-chloro-3-iodoimidazo[1,2-a]pyridine: At room temperature, N-iodosuccinimide (3.94 g, 17.28 mmol) and trifluoroacetic acid (2.68 mL, 34.6 mmol) were added to a solution of 8-bromo-6-chloroimidazo[1,2-a]pyridine (4.0 g, 17.28 mmol) in chloroform (50 mL). The reaction solution was stirred for 2 hrs at room temperature. The reaction was quenched with saturated sodium bicarbonate aqueous solution (80 mL). The reaction liquid was extracted with dichloromethane (50 mL×3). The extraction liquid was washed with saline solution (50 mL×2), dried over sodium sulfate, filtered and concentrated to obtain the crude product, which was purified by column chromatography (silica gel, dichloromethane:ethyl acetate=1:0-7:3) to obtain the targeted product (5.5 g, 89% yield, yellow solid). LC-MS (ESI): m/z(M+H)$^+$ 356.62.

b) Preparation of 8-bromo-6-chloro-3-(1-methyl-1H-pyrazol-5-yl)imidazo[1,2-a]pyridine: Tetratriphenylphosphine palladium (1.28 g, 1.11 mmol) was added to a solution of 8-bromo-6-chloro-3-iodoimidazo[1,2-a]pyridine (3 g, 8.4 mmol), 1-(tetrahydro-2H-pyran-2-yl)-1H-pyrazol-5-boronic acid pinacol ester (2.57 g, 9.24 mmol) and potassium phosphate trihydrate (4.41 g, 16.8 mmol) in a mixture of dioxane (50 mL) and water (5 mL). The reaction solution was stirred for 18 hrs under nitrogen protection at 80° C. Water (100 mL) was added, and the mixture was extracted with dichloromethane (50 mL×3). The extraction liquid was washed with saline solution (50 mL×2), dried over sodium sulfate, filtered and concentrated to obtain the crude product, which was purified by column chromatography (silica gel, dichloromethane:ethyl acetate=4:0-7:3) to obtain the targeted product (1.05 g, 40.1% yield, yellow solid). LC-MS (ESI): m/z(M+H)$^+$ 380.8.

c) Preparation of 6-chloro-8-(1-methyl-1H-pyrazol-5-yl)-3-(1-(tetrahydro-2H-pyran-2-yl)-1H-pyrazol-5-yl)imidazo[1,2-a]pyridine: [1,1'-Bis(diphenylphosphino)ferrocene]dichloropalladium (0.38 g, 0.52 mmol) was added to a solution of 8-bromo-6-chloro-3-(1-methyl-1H-pyrazol-5-yl)imidazo[1,2-a]pyridine (1 g, 2.62 mmol), 1-methyl-1H-pyrazol-5-boronic acid pinacol ester (0.71 g, 3.40 mmol) and potassium phosphate trihydrate (1.4 g, 5.24 mmol) in a mixture of dioxane (30 mL) and water (3 mL). The reaction liquid was stirred for 16 hrs under nitrogen protection at 100° C. Water (50 mL) was added, and the mixture was extracted with dichloromethane (50 mL×3). The extraction liquid was dried over sodium sulfate, filtered and concentrated to obtain the crude product, which was purified by column chromatography (silica gel, dichloromethane:ethyl acetate=4:1-0:1) to obtain the targeted product (0.8 g, 80.0% yield, yellow solid). LC-MS (ESI): m/z(M+H)$^+$ 383.0.

d) Preparation of (3R)-3-methyl-4-(8-(1-methyl-1H-pyrazol-5-yl)-3-(1-tetrahydro-2H-pyran-2-yl)-1H-pyrazol-5-yl)imidazo[1,2-a]pyridine-6-yl)morpholine: Under the protection of nitrogen, 6-chloro-8-(1-methyl-1H-pyrazol-5-yl)-3-(1-(tetrahydro-2H-pyran-2-yl)-1H-pyrazol-5-yl)imidazo[1,2-a]pyridine (400 mg, 668.68 mmol) was slowly added to a solution of (R)-3-methylmorpholine (405.81 mg, 4.01 mmol), sodium tert-butanol (257.05 mg, 2.67 mmol) and Methanesulfonato(2-di-tert-butylphosphino-2',4',6'-tri-isopropyl-1,1'-biphenyl)(2'-amino-1,1'-biphenyl-2-yl)palladium(II) (53.12 mg, 66.87 mmol) in tert-amyl alcohol (8.00 mL). After the atmosphere of the reaction system was replaced with nitrogen, the reaction solution was stirred at 110° C. for 0.5 hr, and LCMS showed the reaction was finished. The reaction solution was filtered and then concentrated under reduced pressure to remove the organic solvent to obtain the crude product, which was purified by column chromatography (silica gel, ethyl acetate:methanol=10:1) to obtain the targeted product (200 mg, crude product, yellow oil). LC-MS (ESI): m/z(M+H)$^+$ 448.2.

e) Preparation of (R)-3-methyl-4-(8-(1-methyl-1H-pyrazol-5-yl)-3-(1H-pyrazol-5-yl)imidazo[1,2-a]pyridin-6-yl)morpholine: At room temperature, (3R)-3-methyl-4-(8-(1-methyl-1H-pyrazol-5-yl)-3-(1-tetrahydro-2H-pyran-2-yl)-1H-pyrazol-5-yl)imidazo[1,2-a]pyridine-6-yl)morpholine (200 mg, crude product) was dissolved in methanol (2 mL), and then a 4M solution of hydrochloric acid in dioxane (5 mL) was added dropwise. The reaction liquid was stirred at 10° C. for 0.5 h. LCMS monitoring showed that raw materials were consumed completely and products were generated. The reaction solution was concentrated under reduced pressure to remove the organic solvent to get the crude product, which was purified by preparative chromatography (C18 silica gel column, 150×25 mm, 5 μm, 13-38% acetonitrile/0.05% ammonia as mobile phase) to obtain the targeted product (9 mg, 5.6% yield, white solid). LC-MS (ESI): m/z(M+H)$^+$ 364.2. $^1$H NMR (400 MHz, DMSO-d$_6$): δ 13.15 (s, 1H), 9.03 (d, J=1.8 Hz, 1H), 8.00 (s, 1H), 7.92 (s, 2H), 7.54 (s, 1H), 7.40 (d, J=2.0 Hz, 1H), 6.81 (d, J=2.0 Hz, 1H), 6.61 (d, J=1.6 Hz, 1H), 3.95-3.88 (m, 1H), 3.85 (s, 3H), 3.80-3.70 (m, 2H), 3.68-3.60 (m, 2H), 3.22-2.95 (m, 2H), 0.99 (d, J=6.8 Hz, 3H).

Example 2

(R)-3-methyl-4-(8-(1-methyl-1H-pyrazol-5-yl)-3-(1H-pyrazol-5-yl)imidazo[1,2-b]pyridazin-6-yl)morpholine a) Preparation of 8-bromo-6-chloro-3-iodoimidazo[1,2-b]pyridazine: At room temperature, N-iodosuccinimide (7.25 g, 32.25 mmol) and trifluoroacetic acid (3.35 mL, 43 mmol) were added to a solution of 6-chloro-8-bromoimidazo[1,2-b]pyridazine (5 g, 21.5 mmol) in chloroform (90 mL). The reaction liquid was stirred at room temperature for 2 hrs. The reaction was quenched with saturated sodium bicarbonate aqueous solution (100 mL) and extracted with dichloromethane (50 mL×3). The extraction liquid was washed with saline solution (50 mL×2), dried over sodium sulfate, filtered and concentrated to obtain a crude product, which was purified by column chromatography (silica gel, dichloromethane:ethyl acetate=1:0-49:1) to obtain the targeted product (5.2 g, 67.7% yield, yellow solid). LC-MS (ESI): m/z(M+H)$^+$ 357.57.

b) Preparation of 8-bromo-6-chloro-3-(1-tetrahydro-2H-pyran-2-yl)-1H-pyrazol-5-yl)imidazo[1,2-b]pyridazine: Tetrakistriphenylphosphine palladium (1.67 g, 1.45 mmol) was added to a solution of 8-bromo-6-chloro-3-iodoimidazo[1,2-b]pyridazine (4 g, 14.51 mmol), 1-(tetrahydro-2H-pyran-2-yl)-1H-pyrazol-5-boronic acid pinacol ester (4.03 g, 14.51 mmol) and potassium phosphate trihydrate (5.94 g, 22.32 mmol) in a mixture of dioxane (50 mL) and water (5 mL). The reaction solution was stirred for 16 hrs under nitrogen protection at 90° C., and then water (50 mL) was added, and the mixture was extracted with dichloromethane (50 mL×3). The extraction liquid was washed with saline solution (50 mL×2), dried over sodium sulfate, filtered and concentrated to obtain a crude product, which was purified by column chromatography (silica gel, dichloromethane:ethyl acetate=1:0-4:1) to obtain the targeted product (0.93 g, 16.7% yield, yellow solid). LC-MS (ESI): m/z(M+H)$^+$ 381.80.

c) Preparation of 6-chloro-8-(1-methyl-1H-pyrazol-5-yl)-3-(1-tetrahydro-2H-pyran-2-yl)-1H-pyrazol-5-yl)imidazo[1,2-b]pyridazine: [1,1'-Bis(diphenylphosphino)ferrocene]dichloropalladium (0.36 g, 0.47 mmol) was added to a solution of 8-bromo-6-chloro-3-(1-tetrahydro-2H-pyran-2-yl)-1H-pyrazol-5-yl)imidazo[1,2-b]pyridazine (0.93 g, 2.43 mmol), 1-methyl-1H-pyrazol-5-boronic acid pinacol ester (0.66 g, 3.16 mmol) and potassium phosphate trihydrate (1.29 g, 4.86 mmol) in a mixed solvent of dioxane (20 mL) and water (2 mL). The reaction liquid was stirred for 16 hrs under nitrogen protection at 100° C., and then water (30 ml) was added, and the mixture was extracted with dichloromethane (50 mL×3). The extraction liquid was dried over sodium sulfate, filtered and concentrated to obtain a crude product, which was purified by column chromatography (silica gel, petroleum ether:ethyl acetate=10:1-1:1) to obtain the targeted product (0.5 g, 53.8% yield, yellow solid). LC-MS (ESI): m/z(M+H)$^+$ 383.80.

d) Preparation of (3R)-3-methyl-4-(8-(1-methyl-1H-pyrazol-5-yl)-3-(1-tetrahydro-2H-pyran-2-yl)-1H-pyrazol-5-yl)imidazo[1,2-b]pyridazin-6-yl)morpholine: At room temperature, 6-chloro-8-(1-methyl-1H-pyrazol-5-yl)-3-(1-tetrahydro-2H-pyran-2-yl)-1H-pyrazol-5-yl)imidazo[1,2-b]pyridazine (500 mg, 1.3 mmol) and (R)-3-methylmorpholine (657.48 mg, 6.5 mmol) were dissolved in toluene (10 mL), and then sodium tert-butoxide (249.86 mg, 2.6 mmol), tris(dibenzylideneacetone)dipalladium (119.04 mg, 0.3 mmol) and 2,2'-bis-(diphenylphosphino)-1,1'-binaphthylene (161.89 mg, 0.26 mmol) were added. Under the protection of nitrogen, the reaction solution was stirred at reflux for 16 hrs. The reaction liquid was diluted with toluene (50 mL) and then filtered. The filtrate was concentrated under reduced pressure to obtain a crude product, which was purified by column chromatography (silica gel, petroleum ether:ethyl acetate=5:1-0:1) to obtain the targeted product (0.12 g, 20.6% yield, yellow solid). LC-MS (ESI): m/z(M+H)$^+$ 449.15.

e) Preparation of (R)-3-methyl-4-(8-(1-methyl-1H-pyrazol-5-yl)-3-(1H-pyrazol-5-yl)imidazo[1,2-b]pyridazin-6-yl)morpholine: At room temperature, concentrated hydrochloric acid (1 mL) was add to a solution of (3R)-3-methyl-4-(8-(1-methyl-1H-pyrazol-5-yl)-3-(1-tetrahydro-2H-pyran-2-yl)-1H-pyrazol-5-yl)imidazo[1,2-b]pyridazin-6-yl)morpholine (120 mg, 0.27 mmol) in ethanol (10 mL). The reaction liquid was stirred at room temperature for 2 hrs. The reaction liquid was concentrated to give a residue, which was dissolved in methanol (2 mL), and 1 drop of ammonia liquor was added. The mixture was purified by preparative liquid chromatography (C18 column, 0-100% acetonitrile/water as mobile phase) to obtain the targeted compound (5.5 mg, 5.6% yield, yellow solid).

The following compounds of Examples 3-8 were prepared using a synthesis process similar to that described in Example 2, with the starting materials of 6-chloro-8-bromoimidazo[1,2-b]pyridazine, N-iodosuccinimide, 1-(tetrahydro-2H-pyran-2-yl)-1H-pyrazol-5-boronic acid pinacol ester, corresponding aryl or heteroaryl boronic acid pinacol ester and (R)-3-methylmorpholine.

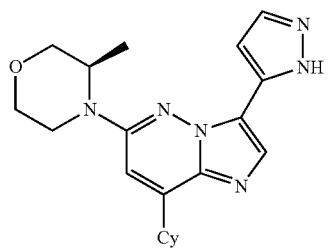

| Example | Cy | LC-MS (ESI) | ¹H NMR (400 MHz) |
|---|---|---|---|
| 2 | 1-methyl-1H-pyrazol-5-yl (*) | (M + H)⁺ 365.0 | CDCl₃: δ 7.98 (s, 1H), 7.71 (d, J = 1.9 Hz, 1H), 7.63 (d, J = 1.9 Hz, 1H), 6.84-6.79 (m, 2H), 6.69 (d, J = 1.9 Hz, 1H), 4.17-4.09 (m, 2H), 4.02 (s, 3H), 3.89-3.88 (m, 1H), 3.78-3.69 (m, 2H), 3.55-3.43 (m, 2H), 1.40 (d, J = 6.8 Hz, 3H) |
| 3 | 1-ethyl-1H-pyrazol-5-yl (*) | (M + H)⁺ 379.2 | CD₃OD: δ 7.97 (s, 1H), 7.79 (s, 1H), 7.66 (d, J = 2.0 Hz, 1H), 7.20 (s, 2H), 6.66 (d, J = 2.0 Hz, 1H), 4.36-4.35 (m, 1H), 4.30-4.24 (m, 2H), 4.08-4.05 (m, 1H), 3.90-3.88 (m, 1H), 3.86-3.84 (m, 2H), 3.71-3.70 (m, 1H), 3.43-3.42 (m, 1H), 1.37-1.32 (m, 6H) |
| 4 | 1-isopropyl-1H-pyrazol-5-yl (*) | (M + H)⁺ 393.4 | CD₃OD: δ 7.96 (s, 1H), 7.81 (s, 1H), 7.68 (d, J = 2.0 Hz, 1H), 7.22-7.15 (m, 2H), 6.60 (d, J = 1.6 Hz, 1H), 4.60-4.51 (m, 2H), 4.36-4.30 (d, J = 6.4 Hz, 1H), 4.07 (dd, J = 3.6, 11.6 Hz, 1H), 3.90 (d, J = 14.0 Hz, 1H), 3.85 (s, 2H), 3.74-3.67 (m, 1H), 3.46-3.39 (m, 1H), 1.47 (d, J = 6.8 Hz, 6H), 1.36 (d, J = 6.8 Hz, 3H). |
| 5 | 1-methyl-1H-imidazol-5-yl (*) | (M + H)⁺ 365.3 | DMSO-d₆: δ 13.08 (s, 1H), 8.27 (s, 1H), 7.96-7.86 (m, 2H), 7.83 (s, 1H), 7.22 (s, 1H), 7.01 (s, 1H), 4.37-4.35 (m, 1H), 4.03-4.00 (m, 1H), 3.91 (s, 3H), 3.88-3.84 (m, 1H), 3.81-3.75 (m, 2H), 3.59-3.58 (m, 2H), 1.28 (d, J = 3.2 Hz, 3H) |
| 6 | 6-methylpyridin-3-yl (*) | (M + H)⁺ 376.2 | DMSO-d₆: δ 13.07 (s, 1H), 9.34 (s, 1H), 8.61 (dd, J = 2.0, 8.0 Hz, 1H), 7.92 (d, J = 36.4 Hz, 1H), 7.46 (d, J = 8.0 Hz, 2H), 7.09 (s, 1H), 4.46 (d, J = 4.4 Hz, 1H), 4.01 (dd, J = 8.0, 11.6 Hz, 1H), 3.78 (d, J = 6.4 Hz, 1H), 3.76-3.59 (m, 2H), 3.39-3.37 (m, 1H), 3.31-3.27 (m, 1H), 2.57 (s, 3H), 1.24 (d, J = 6.4 Hz, 3H) |
| 7 | 4-(methylsulfonyl)phenyl (*) | (M + H)⁺ 439.2 | DMSO-d₆: δ 13.15 (s, 0.5H), 13.11 (s, 0.5H), 8.55 (d, J = 7.6 Hz, 2H), 8.11 (d, J = 8.4 Hz, 2H), 7.94 (d, J = 25.6 Hz, 1H), 7.65-7.52 (m, 1H), 7.50-7.47 (m, 1H), 7.12-7.05 (m, 1H), 4.46 (s, 1H), 4.03 (dd, J = 3.2, 11.6 Hz, 1H), 3.98-3.91 (m, 1H), 3.82-3.74 (m, 2H), 3.63-3.57 (m, 2H), 3.31-3.30 (m, 4H), 1.25 (d, J = 6.4 Hz, 1H) |
| 8 | 2-fluorophenyl (*) | (M + H)⁺ 379.4 | CD₃OD: δ 7.94 (s, 1H), 7.86-7.74 (m, 2H), 7.58-7.53 (m, 1H), 7.38-7.29 (m, 2H), 7.19 (s, 2H), 4.65-4.52 (m, 1H), 4.30 (dd, J = 6.4, 13.2 Hz, 1H), 4.06 (dd, J = 3.6, 11.6 Hz, 1H), 3.91-3.82 (m, 3H), 3.74-3.67 (m, 1H), 3.46-3.39 (m, 1H), 1.36 (d, J = 6.8 Hz, 3H) |

Example 9

(R)-3-methyl-4-(8-morpholino-3-(1H-pyrazol-5-yl)imidazo[1,2-b]pyridazin-6-yl)morpholine

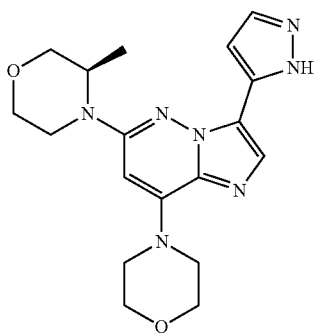 [SMILES: C[C@@H]1COCCN1c1cc(N2CCOCC2)c2ncc(-c3ccn[nH]3)n2n1]

a) Preparation of 4-(6-chloro-3-iodoimidazo[1,2-b]pyridazin-8-yl)morpholine: After the atmosphere of the reaction system was replaced with nitrogen for 3 times, a mixture of 8-bromo-6-chloro-3-iodoimidazo[1,2-b]pyridazine (2.5 g, 6.98 mmol), morpholine (729.32 mg, 8.37 mmol, 736.69 uL) and DIEA (1.98 g, 15.35 mmol, 2.67 mL) in THF (50 mL) was stirred at 80° C. under nitrogen atmosphere for 12 hours. The reaction mixture was diluted with EA (100 mL), washed with saturated saline solution (100 mL×3), dried over anhydrous sodium sulfate, filtered, and concentrated under reduced pressure to obtain a crude product, which was washed with methyl tert-butyl ether (MTBE, 30 mL) to get the targeted compound (2.5 g, yellow solid, yield 98.30%). LC-MS (ESI): m/z(M+H)+ 364.9.

b) Preparation of 4-(6-chloro-3-(1-(tetrahydro-2H-pyran-2-yl)-1H-pyrazol-5-yl)imidazo[1,2-b]pyridazin-8-yl)morpholine: After the atmosphere of the reaction system was replaced with nitrogen for 3 times, a mixture of 4-(6-chloro-3-iodoimidazo[1,2-b]pyridazin-8-yl)morpholine (2.5 g, 6.86 mmol), 1-(tetrahydro-2H-pyran-2-yl)-1H-pyrazol-5-boronic acid pinacol ester (2.10 g, 7.54 mmol), Pd(PPh$_3$)$_4$ (792.41 mg, 685.74 umol) and K$_3$PO$_4$ aqueous solution (3 M, 6.86 mL) in dioxane (35 mL) was stirred at 90° C. under nitrogen atmosphere for 8 hours. The reaction mixture was diluted with EA (50 mL), washed by saturated saline solution (35 mL×2), dried over anhydrous sodium sulfate, filtered, and concentrated under reduced pressure to obtain a crude product, which was purified by flash silica gel chromatography (ISCO®; 40 g Sepa Flash® Silica Flash Column, elution gradient 0~10% EA/PE, @50 mL/min) to obtain the targeted product (0.94 g, white solid, yield 35.25%). LC-MS (ESI): m/z (M+H)+ 389.2.

c) Preparation of (3R)-3-methyl-4-(8-morpholin-3-(1-(tetrahydro-2H-pyran-2-yl)-1H-pyrazol-5-yl)imidazo[1,2-b]pyridazin-6-yl)morpholine: After the atmosphere of the reaction system was replaced with nitrogen for 3 times, a mixture of 4-(6-chloro-3-(1-(tetrahydro-2H-pyran-2-yl)-1H-pyrazol-5-yl)imidazo[1,2-b]pyridazin-8-yl)morpholine (0.94 g, 2.42 mmol), (R)-3-methylmorpholine (1.22 g, 12.09 mmol), t-BuONa (464.64 mg, 4.83 mmol), Pd(dba)$_2$ (278.00 mg, 483.48 umol) and 1.1'-binaphthyl-2.2'-diphenyl phosphine (BINAP, 301.05 mg, 483.48 mol) in toluene (30 mL) was stirred at 100° C. under nitrogen atmosphere for 18 hours. The reaction mixture was diluted with EA (50 mL), washed by saturated saline solution (40 mL×3), dried over anhydrous sodium sulfate, filtered, and concentrated under reduced pressure to obtain a crude product, which was purified by flash silica gel chromatography (ISCO®; 20 g Sepa Flash® Silica Flash Column, elution gradient 0~20% EA/PE, @50 mL/min) to obtain the target product (0.18 g, yellow solid, yield 16.42%). LC-MS (ESI): m/z (M+H)+ 454.2.

d) Preparation of (R)-3-methyl-4-(8-morpholino-3-(1H-pyrazole-5-yl)imidazo[1,2-b]pyridazin-6-yl)morpholine: HCl/methanol solution (4 M, 4.41 mL) was added to a solution of (3R)-3-methyl-4-(8-morpholine-3-(1-(tetrahydro-2H-pyran-2-yl)-1H-pyrazol-5-yl)imidazo[1,2-b]pyridazin-6-yl)morpholine (0.16 g, 352.78 umol) in methanol (4.5 mL). The obtained mixture was stirred at 25° C. for 12 hours. The reaction mixture was concentrated under reduced pressure to obtain a residue. The residue was dissolved in methanol (20 mL). The pH of the mixture was adjusted to 7 with saturated sodium bicarbonate aqueous solution, and then the mixture was concentrated under reduced pressure to obtain a crude product, which was purified by preparative high performance liquid chromatography column (column: Waters Xbridge 150*25 mm*5 um; mobile phase: [Water (10 mM NH$_4$HCO$_3$)-ACN]; B %: 17%-47%, 10 min) to obtain the targeted compound (25 mg, off-white solid, yield 19.03%, purity 99.19%). LC-MS (ESI): m/z(M+H)+ 370.1. $^1$H NMR (400 MHz, CD$_3$OD): δ 7.85 (s, 1H), 7.74 (d, J=2.4 Hz, 1H), 7.12 (d, J=2.0 Hz, 1H), 6.22 (s, 1H), 4.27 (m, 1H), 4.03 (dd, J=3.2, 11.6 Hz, 1H), 3.92-3.90 (m, 4H), 3.82-3.64 (m, 9H), 3.38-3.35 (m, 1H), 1.29 (d, J=2.0 Hz, 3H). SFC: ee %, 100%.

Example 10

(2S,6R)-2,6-dimethyl-4-(6-((R)-3-methylmorpholino)-3-(1H-pyrazol-5-yl)imidazo[1,2-b]pyridazin-8-yl)morpholine

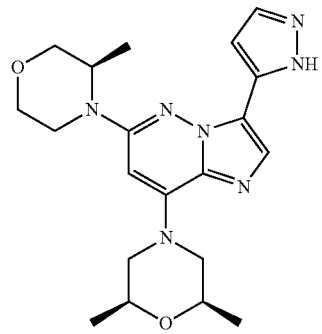 [SMILES: C[C@@H]1CN(c2cc(N3CCOC[C@H]3C)nn3c(-c4ccn[nH]4)cnc23)C[C@H](C)O1]

The compound of Example 10 was prepared using a synthesis process similar to that described in Example 9. LC-MS (ESI): m/z(M+H)+ 398.4. $^1$H NMR (400 MHz, CD$_3$OD): δ 7.82 (s, 1H), 7.80-7.59 (m, 1H), 7.21-7.01 (m, 1H), 6.13 (s, 1H), 4.60 (s, 1H), 4.49-4.39 (m, 2H), 4.27-4.24 (m, 1H), 4.02 (dd, J=3.2, 11.6 Hz, 1H), 3.94-3.85 (m, 2H), 3.83-3.74 (m, 3H), 3.70-3.64 (m, 1H), 3.36 (dd, J=4.0, 12.8 Hz, 1H), 2.63-2.55 (m, 2H), 1.30-1.25 (m, 9H).

Example 11

4-(4-(1-methyl-1H-pyrazol-5-yl)-7-(1H-pyrazol-5-yl)imidazol[1,5-b]pyridazin-2-yl)morpholine

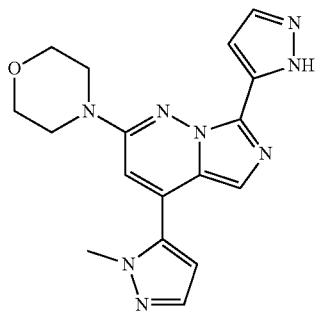 [SMILES: Cn1nccc1-c1cc(N2CCOCC2)nn2c(-c3ccn[nH]3)ncc12]

The compound of Example 11 was prepared using a synthesis process similar to that described in Example 13. Yellow solid. LC-MS (ESI): m/z (M+H)$^+$ 351.30. $^1$H NMR (400 MHz, DMSO-d$_6$): δ 7.73 (s, 1H), 7.65 (d, J=1.7 Hz, 1H), 7.44 (s, 1H), 7.14 (d, J=1.3 Hz, 1H), 7.01 (s, 1H), 6.81 (d, J=1.6 Hz, 1H), 3.97 (s, 3H), 3.83-3.74 (m, 4H), 3.63-3.57 (m, 4H).

Example 12

4-(8-(1-methyl-1H-pyrazol-5-yl)-3-(1H-pyrazol-5-yl)-[1,2,4]triazolo[4,3-b]pyridazin-6-yl)morpholine

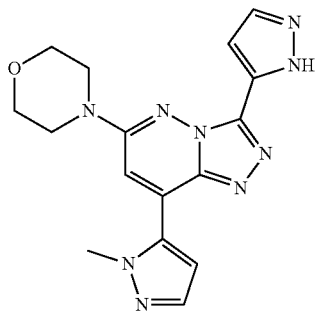 [SMILES: Cn1nccc1-c1cc(N2CCOCC2)nn2c(-c3ccn[nH]3)nnc12]

a) Preparation of 6-chloro-3-(1-tetrahydropyran-2-ylpyrazol-3-yl)-[1,2,4]triazolo[4,3-b]pyridazin-8-amine: To a solution of 1-tetrahydropyran-2-ylpyrazole-3-carbaldehyde (10.16 g, 56.40 mmol) and 6-chloro-3-hydrazino-pyridazin-4-amine (9 g, 56.40 mmol) in DCM (120 mL) was stirred at 10-20° C. for 1 hour. Then to the mixture was added PhI(OAc)$_2$ (30.88 g, 95.88 mmol) at 0° C. and stirred at 10-20° C. for 12 hours. The reaction mixture was diluted with brine (800 mL) and extracted with DCM (400 mL×3). The combined organic layers were washed with brine (400 mL), dried over anhydrous Na$_2$SO$_4$, filtered and concentrated under reduced pressure to give a residue. The residue was purified by flash silica gel chromatography (ISCO®; X g SepaFlash® Silica Flash Column, Eluent of 0~100% Ethyl acetate/Petroleum ethergradient, PE:EA=1:3) to give the targeted product (8.7 g, yellow solid, 16.08% yield). LC-MS (ESI): m/z (M+H)$^+$ 319.9.

b) Preparation of 8-bromo-6-chloro-3-(1-tetrahydropyran-2-ylpyrazol-3-yl)-[1,2,4]triazolo[4,3-b]pyridazine: To a mixture of 6-chloro-3-(1-tetrahydropyran-2-ylpyrazol-3-yl)-[1,2,4]triazolo[4,3-b]pyridazin-8-amine (0.9 g, 2.81 mmol) in CH$_3$CN (15 mL) was added HBr (69.01 mg, 281.47 umol, 46.32 uL, 33% purity), t-BuONO (493.43 mg, 4.79 mmol, 569.12 uL) and the mixture was stirred at 0° C. for 0.5 hour. Then CuBr (605.65 mg, 4.22 mmol, 128.59 uL) was added. The mixture was stirred at 10-20° C. for 12 hours. The reaction mixture was diluted with H$_2$O (80 mL) and extracted with EtOAc (150 mL×3). The combined organic layers were washed with brine (150 mL), dried over Na$_2$SO$_4$, filtered and concentrated under reduced pressure to give a residue. The residue was purified by column chromatography (SiO$_2$, Petroleum ether/Ethyl acetate=5/1 to 1/1) to give the targeted product (380 mg, black solid, 7.04% yield). LC-MS (ESI): m/z (M+H)$^+$ 382.8. $^1$H NMR (400 MHz, DMSO-d$_6$): δ 7.82 (d, J=2.4 Hz, 1H), 7.44 (s, 1H), 7.44 (d, J=3.2 Hz, 1H), 5.63-5.60 (m, 1H), 4.12-4.09 (m, 1H), 3.78-3.72 (m, 1H), 2.21-2.10 (m, 3H), 1.76-1.61 (m, 3H).

c) Preparation of 6-chloro-8-(2-methylpyrazol-3-yl)-3-(1-tetrahydropyran-2-ylpyrazol-3-yl)-[1,2,4]triazolo[4,3-b]pyridazine: To a solution of 8-bromo-6-chloro-3-(1-tetrahydropyran-2-ylpyrazol-3-yl)-[1,2,4]triazolo[4,3-b]pyridazine (120 mg, 312.80 umol) and (2-methylpyrazol-3-yl)boronic acid (39.39 mg, 312.80 umol) in dioxane (6 mL) was added Pd(PPh$_3$)$_4$ (36.15 mg, 31.28 umol) and aqueous K$_3$PO$_4$ solution (2 M, 469.20 uL) at 10-20° C., then the suspension was degassed under vacuum and purged with N$_2$ several times, and stirred at 100-110° C. for 1.5 hours. The reaction mixture was diluted with H$_2$O (30 mL) and extracted with EtOAc (40 mL×3). The combined organic layers were washed with brine (40 mL), dried over Na$_2$SO$_4$, filtered and concentrated under reduced pressure to give a residue. The residue was purified by prep-TLC (SiO$_2$, PE:EA=1:3) to give the targeted product (90 mg, yellow solid). LC-MS (ESI): m/z (M+H)$^+$ 384.9.

d) Preparation of 4-[8-(2-methylpyrazol-3-yl)-3-(1-tetrahydropyran-2-ylpyrazol-3-yl)-[1,2,4]triazolo[4,3-b]pyridazin-6-yl]morpholine: A solution of 6-chloro-8-(2-methylpyrazol-3-yl)-3-(1-tetrahydropyran-2-ylpyrazol-3-yl)-[1,2,4]triazolo[4,3-b]pyridazine (20 mg, 51.97 umol) and morpholine (22.64 mg, 259.86 umol, 22.87 uL) in sulfolane (0.5 mL) was degassed and purged with N$_2$ for 3 times, and then the mixture was stirred at 120-130° C. for 3 hours under N$_2$ atmosphere. The reaction mixture was purified by pre-HPLC (column: 3_Phenomenex Luna C18 75*30 mm*3 um; mobile phase: [water (0.05% HCl)-ACN]; B %: 24%-44%, 7 min) to give the targeted product (97 mg, yellow solid). LC-MS (ESI): m/z (M+H)$^+$ 436.0.

e) Preparation of 4-[8-(2-methylpyrazol-3-yl)-3-(1H-pyrazol-5-yl)-[1,2,4]triazolo[4,3-b]pyridazin-6-yl]morpholine: To a solution of 4-[8-(2-methylpyrazol-3-yl)-3-(1-tetrahydropyran-2-ylpyrazol-3-yl)-[1,2,4]triazolo[4,3-b]pyridazin-6-yl]morpholine (40 mg, 91.85 umol) in MeOH (1.2 mL) was added HCl/MeOH (4 M, 229.63 uL) at 0° C., and then the mixture was stirred at 25° C. for 15 hours. The reaction mixture was filtered and the filter cake was washed with EtOAc (0.5 mL×2) to give the targeted compound (57.42 mg, yellow solid, 86.91% yield). LC-MS (ESI): m/z (M+H)$^+$ 352.1. $^1$H NMR (400 MHz, DMSO-d$_6$): δ 7.94 (d, J=2.0 Hz, 1H), 7.60 (d, J=2.0 Hz, 1H), 7.54 (s, 1H), 7.21 (d, J=2.0 Hz, 1H), 6.94 (d, J=2.0 Hz, 1H), 4.03 (s, 3H), 3.80-3.77 (m, 4H), 3.66-3.64 (m, 4H).

Example 13

(R)-3-methyl-4-(4-(1-methyl-1H-pyrazol-5-yl)-7-(1H-pyrazol-5-yl)imidazo[1,5-b]pyridazin-2-yl)morpholine

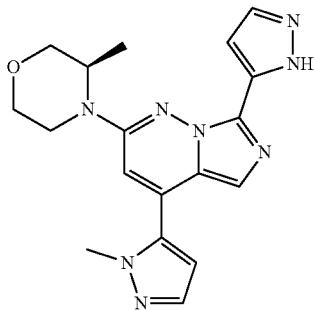 [SMILES: C[C@@H]1COCCN1c1cc(-c2ccnn2C)c2cnc(-c3ccn[nH]3)n2n1]

a) Preparation of 4-(1-methyl-1H-pyrazol-5-yl)-1,2-dihydropyridazine-3,6-dione: 4-bromo-1,2-dihydropyridazine-3,6-dione (4.0 g, 20.94 mmol), (1-methyl-1H-pyrazol-5-yl)boronic acid (5.23 g, 41.90 mmol) and potassium phosphate aqueous solution (aq. $K_3PO_4$, 63 mL, 1 M) were dissolved in N,N-dimethylformamide (DMF, 60 mL). The air in the reaction bulb was replaced with nitrogen, and under the reaction of nitrogen, [1,1'-bis(diphenylphosphino)ferrocene]dichloropalladium (Pd(dppf)Cl$_2$, 1.67 g, 2.09 mmol) was added. After the obtained mixture was reacted at 100° C. for 16 hours, the reaction mixture was concentrated to remove the solvent to obtain a crude product, which was washed with dichloromethane (DCM, 100 mL) to get the crude product of the targeted product (15.0 g, black solid). LC-MS (ESI): m/z(M+H)$^+$ 193.25.

b) Preparation of 3,6-dichloro-4-(1-methyl-1H-pyrazol-5-yl)pyridazine: 4-(1-methyl-1H-pyrazol-5-yl)-1,2-dihydropyridazine-3,6-dione (15.0 g, crude product, 20.94 mmol) was dissolved in phosphorus oxychloride (POCl$_3$, 150 mL), and the mixture was heated to 100° C. and stirred for 16 hours. Phosphorus oxychloride was removed to obtain a crude product, which was purified by silica gel column chromatography (EtOAc/PE, 10 to 30%) to obtain the targeted product (2.63 g, white solid, yield of 55% in two steps). LC-MS (ESI): m/z(M+H)$^+$ 229.15. $^1$H NMR (400 MHz, CDCl$_3$): δ 7.61 (d, J=1.3 Hz, 1H), 7.51 (s, 1H), 6.49 (d, J=1.3 Hz, 1H), 3.83 (s, 3H).

c) Preparation of (R)-4-(6-chloro-5-(1-methyl-1H-pyrazol-5-yl)pyridazin-3-yl)-3-methylmorpholine: (R)-3-methylmorpholine (1.58 g, 11.53 mmol), CuBr (3.63 g, 25.37 mmol) and N,N-diisopropylethylamine (DIEA, 2.15 g, 15.5 mmol) were added to a solution of 3,6-dichloro-4-(1-methyl-1H-pyrazol-5-yl)pyridazine (2.63 g, 11.53 mmol) in N-methylpyrrolidone (NMP, 50 mL). The resulting mixture was stirred at 150° C. for 16 hours. The reaction was quenched with water (50 mL) and the mixture was diluted with dichloromethane (DCM, 100 mL). The organic phase was washed with water (100 mL), dried over anhydrous sodium sulfate, and filtered. The filtrate was concentrated under reduced pressure to obtain a crude product, which was purified by silica gel column chromatography (EtOAc/PE, 5-20%) to obtain the targeted product (1.65 g, light red solid, yield 49%). LC-MS (ESI): m/z(M+H)$^+$ 294.25. $^1$H NMR (400 MHz, CDCl$_3$): δ 7.60 (s, 1H), 6.79 (s, 1H), 6.40 (s, 1H), 4.36-4.27 (m, 1H), 4.06 (dd, J=11.4, 3.3 Hz, 1H), 3.97 (dd, J=13.3, 2.0 Hz, 1H), 3.86-3.82 (m, 1H), 3.80 (s, 3H), 3.65 (td, J=12.0, 3.0 Hz, 1H), 3.36 (td, J=12.5, 3.7 Hz, 1H), 1.33 (d, J=6.7 Hz, 3H).

d) Preparation of (R)-4-(1-methyl-1H-pyrazol-5-yl)-6-(3-methylmorpholino)pyridazine-3-carbonitrile: Zn(CN)$_2$ (0.4 g, 3.4 mmol), [1,1'-bis(diphenylphosphino)ferrocene]dichloropalladium (DPPF, 0.2 g, 0.36 mmol), Pd$_2$(dba)$_3$ (160 mg, 0.17 mmol) and 3 drops of water were added to a solution of (R)-4-(6-chloro-5-(1-methyl-1H-pyrazol-5-yl)pyridazin-3-yl)-3-methylmorpholine (0.5 g, 1.7 mmol) and DMF (10 mL). The obtained mixture was stirred at 150° C. for 6 hours. The reaction mixture was concentrated under reduced pressure to remove the solvent to obtain a crude product, which was purified by silica gel column chromatography (EtOAc/PE, 10 to 40%) to obtain the targeted product (0.4 g, light red oil, yield 82%). LC-MS (ESI): m/z(M+H)$^+$ 285.30. $^1$H NMR (400 MHz, CDCl$_3$): δ 7.59 (d, J=1.8 Hz, 1H), 6.66 (s, 1H), 6.53 (d, J=1.8 Hz, 1H), 4.54-4.43 (m, 1H), 4.23-4.13 (m, 1H), 4.08 (dd, J=14.8, 5.7 Hz, 1H), 3.89 (s, 3H), 3.84 (brs, 1H), 3.78 (dd, J=12.0, 2.8 Hz, 1H), 3.64 (td, J=12.4, 2.8 Hz, 1H), 3.49-3.38 (m, 1H), 1.38 (d, J=6.8 Hz, 3H).

e) Preparation of (R)-(4-(1-methyl-1H-pyrazol-5-yl)-6-(3-methylmorpholino)pyridazin-3-yl)carbonitrile: Raney Ni (~0.3 g) was added to a solution of (R)-4-(1-methyl-1H-pyrazol-5-yl)-6-(3-methylmorpholino)pyridazine-3-carbonitrile (0.22 g, 0.77 mmol) in MeOH (7 mL). The obtained mixture was stirred at room temperature under hydrogen for 16 hours. After the reaction was finished, the obtained mixture was filtered by diatomite, and the filtrate was concentrated to obtain a crude product, which was purified by preparative high performance liquid chromatography column (C18, CH$_3$CN/H$_2$O, 5~30%, with 0.1% TFA added) to obtain the targeted product (0.1 g, colorless oily matter, yield 45%). LC-MS (ESI): m/z(M+H)$^+$ 289.30. $^1$H NMR (400 MHz, CD$_3$OD): δ 7.61 (s, 1H), 7.32 (s, 1H), 6.51 (s, 1H), 4.47-4.38 (m, 1H), 4.14 (s, 2H), 4.00 (dt, J=16.5, 9.0 Hz, 2H), 3.85-3.72 (m, 4H), 3.63 (dd, J=16.4, 7.3 Hz, 1H), 3.33 (brs, 2H), 1.28 (d, J=6.4 Hz, 3H).

f) Preparation of N-((4-(1-methyl-1H-pyrazol-5-yl)-6-((R)-3-methylmorpholino)-2,3-dihydropyridazin-3-yl)methyl)-1H-pyrazol-5-formamide: 1H-Pyrazol-5-carboxylic acid (0.05 g, 0.35 mmol), 2-(7-azabenzotriazol)-N,N,N',N'-tetramethylurea hexafluorophosphate (HATU, 200 mg, 0.75 mmol) and DIEA (0.12 g, 0.87 mmol) were added to a solution of (R)-(4-(1-methyl-1H-pyrazol-5-yl)-6-(3-methylmorpholino)pyridazin-3-yl)methylamine (0.1 g, 0.35 mmol) in DMF (5 mL). The obtained mixture was stirred at room temperature over night. The reaction mixture was distilled under reduced pressure to remove the solvent to obtain a crude product, which was purified by preparative thin layer chromatography plate (DCM:MeOH=20:1) to get the targeted product (0.085 g, white solid, yield 64%). LC-MS (ESI): m/z(M+H)$^+$ 383.35. $^1$H NMR (400 MHz, CDCl$_3$): δ 10.40 (s, 1H), 8.73 (s, 1H), 7.62-7.52 (m, 2H), 6.82-6.72 (m, 2H), 6.45 (s, 1H), 4.58 (d, J=5.5 Hz, 2H), 4.36-4.25 (m, 1H), 4.02 (ddd, J=22.3, 12.2, 2.6 Hz, 1H), 3.79 (s, 3H), 3.64 (ddd, J=15.7, 12.1, 5.0 Hz, 2H), 3.40-3.30 (m, 1H), 3.16-3.05 (m, 2H), 1.31 (d, J=6.9 Hz, 3H).

g) Preparation of (R)-3-methyl-4-(4-(1-methyl-1H-pyrazol-5-yl)-7-(1H-pyrazol-5-yl)imidazo[1,5-b]pyridazin-2-yl)morpholine: a solution of N-((4-(1-methyl-1H-pyrazol-5-yl)-6-((R)-3-methylmorpholino)-2,3-dihydropyridazin-3-yl)methyl)-1H-pyrazol-5-formamide (0.085 g, 0.22 mmol) in POCl$_3$ (5 mL) was stirred at 150° C. for 3 hours. The reaction mixture was distilled under reduced pressure to remove the solvent to obtain a crude product, which was purified by preparative high performance liquid chromatography column (C18, CH₃CN/H₂O, 15~45%, with 0.1% TFA added) to obtain the targeted compound (0.02 g, yellow solid, yield 25%). LC-MS (ESI): m/z(M+H)⁺ 365.25. ¹H NMR (400 MHz, CD₃OD): δ 7.93 (s, 1H), 7.84 (s, 1H), 7.67 (d, J=1.8 Hz, 1H), 7.40 (d, J=1.0 Hz, 1H), 7.27 (s, 1H), 6.80 (d, J=1.7 Hz, 1H), 4.46 (d, J=6.3 Hz, 1H), 4.11-4.02 (m, 2H), 4.00 (s, 3H), 3.87-3.80 (m, 2H), 3.68 (td, J=11.6, 3.0 Hz, 1H), 3.56-3.44 (m, 1H), 1.41 (d, J=6.8 Hz, 3H).

Example 14

(R)-3-methyl-4-(3-(1H-pyrazol-5-yl)-8-(1H-pyrrolo[2,3-b]pyridin-4-yl)imidazo[1,2-b]pyridazin-6-yl)morpholine

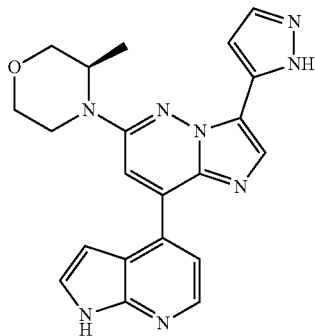 [SMILES: C[C@@H]1COCCN1c1cc(-c2ccnc3[nH]ccc23)c2ncc(-c3ccn[nH]3)n2n1]

The compound of Example 14 was prepared using a synthesis process similar to that described in Example 2.

Example 15

(R)-3-methyl-4-(8-(1-methyl-1H-pyrazol-5-yl)-3-(1H-pyrazol-5-yl)-[1,2,4]triazolo[4,3-b]pyridazin-6-yl)morpholine

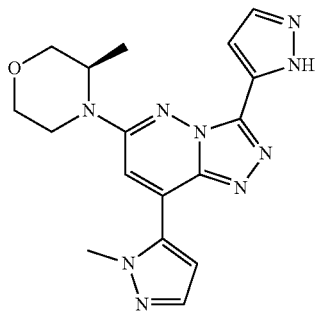 [SMILES: C[C@@H]1COCCN1c1cc(-c2ccnn2C)c2nnc(-c3ccn[nH]3)n2n1]

The compound of Example 15 was prepared using a synthesis process similar to that described in Example 12. Off-white solid. LC-MS (ESI): m/z(M+H)⁺ 366.1. ¹H NMR (400 MHz, CD₃OD): δ 7.88 (br, s, 1H), 7.66 (d, J=1.6 Hz, 1H), 7.41 (s, 1H), 7.28 (s, 1H), 6.88 (d, J=1.6 Hz, 1H), 4.42 (d, J=6.4 Hz, 1H), 4.08-4.05 (m, 1H), 4.03 (s, 3H), 4.00-3.97 (m, 1H), 3.85 (s, 2H), 3.72-3.72 (m, 1H), 3.46-3.41 (m, 1H), 1.39 (d, J=6.8 Hz, 3H).

Example 16

(R)-3-methyl-4-(7-(1-methyl-1H-pyrazol-5-yl)-3-(1H-pyrazol-5-yl)pyrazolo[1,5-a]pyrimidin-5-yl)morpholine

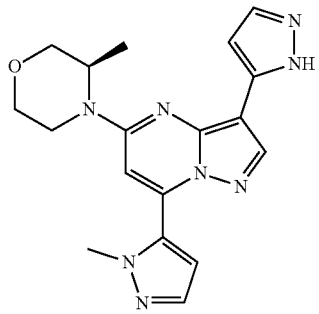 [SMILES: C[C@@H]1COCCN1c1cc(-c2ccnn2C)n2ncc(-c3ccn[nH]3)c2n1]

a) Preparation of 5-chloro-7-(1-methyl-1H-pyrazol-5-yl)pyrazolo[1,5-a]pyrimidine: To a solution of 5,7-dichloropyrazolo[1,5-a]pyrimidine (5 g, 26.59 mmol) in dioxane (100 mL) was added Pd(dppf)Cl₂ and aqueous K₃PO₄ solution (14.16 g, 53.19 mmol, 10 mL) at room temperature. The mixture was stirred at 80° C. under nitrogen protection for 16 hours. After reaction completion, the reaction liquor was cooled down to room temperature, and water (100 mL) was added. The mixture was extracted with EtOAc (100 Ml×2), the organic layers were combined, washed with brine, dried with anhydrous sodium sulfate, filtered, and concentrated to give the crude product, which was purified by column chromatography (SiO₂, PE/EtOAc=50/1 to 3/1) to give the targeted product (3.35 g, yellow solid, 53.91% yield). LC-MS (ESI): m/z (M+H)⁺ 234.30.

b) Preparation of (R)-3-methyl-4-(7-(1-methyl-1H-pyrazol-5-yl)pyrazolo[1,5-a]pyrimidin-5-yl)morpholine: To a solution of 5-chloro-7-(1-methyl-1H-pyrazol-5-yl)pyrazolo[1,5-a]pyrimidine (500 mg, 2.14 mmol) in toluene (30 mL) was added sodium tert-butoxide (514.11 mg, 5.35 mmol), (±)-2,2'-bis(diphenylphosphino)-1,1'-binaphthalene (BINAP, 133.24 mg, 213.99 mmol) and tris(dibenzylideneacetone)dipalladium (195.95 mg, 213.99 mmol) at room temperature. The reaction liquor was refluxed and stirred for 16 hours under nitrogen protection. The mixture was cooled down to room temperature and extracted with EtOAc (100 mL×3). The organic layer was washed with brine, dried with anhydrous sodium sulfate, filtered, and concentrated to give the crude product, which was purified by column chromatography (SiO₂, PE/EtOAc=20/1 to 3/1) to give the targeted product (69 mg, yellow solid, 10.8% yield). ¹H NMR (400 MHz, CDCl₃): δ 7.92 (d, J=2.1 Hz, 1H), 7.62 (d, J=1.9 Hz, 1H), 6.64 (d, J=1.9 Hz, 1H), 6.33 (s, 1H), 6.22 (d, J=2.2 Hz, 1H), 4.34 (d, J=6.3 Hz, 1H), 4.06 (s, 2H), 3.89 (s, 3H), 3.81 (s, 2H), 3.65-3.58 (m, 1H), 3.39-3.32 (m, 1H), 1.36 (d, J=6.8 Hz, 3H).

c) Preparation of (R)-4-(3-iodo-7-(1-methyl-1H-pyrazol-5-yl)pyrazolo[1,5-a]pyrimidin-5-yl)-3-methylmorpholine: To a solution of (R)-3-methyl-4-(7-(1-methyl-1H-pyrazol-5-yl)pyrazolo[1,5-a]pyrimidin-5-yl)morpholine (59 mg, 197.76 μmol) in CHCl₃ (5 mL) was added N-iodosuccinimide (NIS, 40 mg, 177.98 μmol) and trifluoroacetic acid (TFA, 22.55 mg, 197.76 μmol) at room temperature. The resulting liquor was stirred at room temperature for 2 hours, and quenched with saturated sodium bicarbonate (5 mL). The reaction liquor was concentrated to give the crude product, which was purified by column chromatography (SiO$_2$, PE/EtOAc=20/1 to 3/1) to give the targeted product (59 mg, yellow solid, 70.3% yield). LC-MS (ESI): (M+H)$^+$: 425.4. $^1$H NMR (400 MHz, CDCl$_3$): δ 7.90 (s, 1H), 7.62 (d, J=1.9 Hz, 1H), 6.62 (d, J=2.0 Hz, 1H), 6.33 (s, 1H), 4.38 (s, 1H), 4.22 (d, J=13.4 Hz, 1H), 4.07 (dd, J=11.5, 3.8 Hz, 1H), 3.86 (s, 3H), 3.83 (s, 2H), 3.62 (td, J=11.9, 3.0 Hz, 1H), 3.42-3.34 (m, 1H), 1.25 (d, J=3.7 Hz, 3H).

d) Preparation of (3R)-3-methyl-4-(7-(1-methyl-1H-pyrazol-5-yl)-3-(1-(tetrahydro-2H-pyran-2-yl)-1H-pyrazol-5-yl)pyrazolo[1,5-a]pyrimidin-5-yl)morpholine: To a solution of (R)-4-(3-iodo-7-(1-methyl-1H-pyrazol-5-yl)pyrazolo[1,5-a]pyrimidin-5-yl)-3-methylmorpholine (33 mg, 77.79 µmol), 1-(tetrahydro-2H-pyran-2-yl)-5-(4,4,5,5-tetramethyl-1,3,2-dioxaborolan-2-yl)-1H-pyrazole (64.91 mg, 233.36 µmol), potassium trihydrate phosphate (41.43 mg, 155.57 µmol) in the mixed solvent of dioxane (8 mL) and water (1.5 mL) was added Pd(dppf)Cl$_2$ (5.69 mg, 7.78 µmol). The mixture was stirred at 82° C. for 2 hours. After reaction completion, the reaction liquor was concentrated to give the crude product, which was purified by column chromatography (SiO$_2$, PE/EtOAc=20/1 to 3/1) to give the targeted product (30 mg, yellow solid, 86.0% yield). LC-MS (ESI): m/z (M+H)$^+$: 449.47.

e) Preparation of (R)-3-methyl-4-(7-(1-methyl-1H-pyrazol-5-yl)-3-(1H-pyrazol-5-yl)pyrazolo[1,5-a]pyrimidin-5-yl)morpholine: The mixture of (3R)-3-methyl-4-(7-(1-methyl-1H-pyrazol-5-yl)-3-(1-(tetrahydro-2H-pyran-2-yl)-1H-pyrazol-5-yl)pyrazolo[1,5-a]pyrimidin-5-yl)morpholine (30 mg, 66.89 µmol), 4M HCl/dioxane (1 mL) and water (1 mL) was stirred at room temperature for 2 hours, and then the mixture was concentrated under reduced pressure. The value of pH was adjusted to 8 with a drop of ammonium hydroxide. The mixed liquor was purified by pre-HPLC (C18 column, 0-100% acetonitrile/water as mobile phase) to give the title compound (6.5 mg, yellow solid, 26.67%). LC-MS (ESI): m/z(M+H)$^+$ 365.1. $^1$H NMR (400 MHz, MeOD): δ 8.28 (s, 1H), 7.64 (d, J=2.0 Hz, 1H), 7.63 (br d, J=1.2 Hz, 1H), 6.90-6.83 (m, 1H), 6.80 (s, 1H), 6.76 (d, J=2.0 Hz, 1H), 4.65-4.57 (m, 1H), 4.25 (d, J=12.8 Hz, 1H), 4.05 (dd, J=3.6, 11.6 Hz, 1H), 3.86 (s, 4H), 3.81-3.75 (m, 1H), 3.64 (dt, J=2.8, 12.0 Hz, 1H), 3.42 (dt, J=3.6, 12.8 Hz, 1H), 1.39 (d, J=6.8 Hz, 3H).

Example 17

(R)-3-methyl-4-(5-(methylsulfonyl)-1-(1H-pyrrolo[2,3-b]pyridin-4-yl)pyrrolo[1,2-c]pyrimidin-3-yl)morpholine

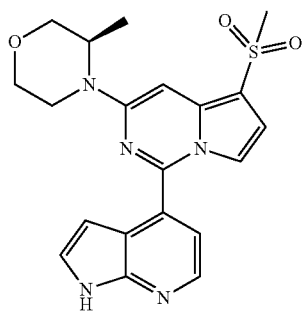

Example 18

(R)-3-methyl-4-(1-(methylsulfonyl)-5-(1H-pyrrolo[2,3-b]pyridin-4-yl)imidazo[1,5-c]pyrimidin-7-yl)morpholine

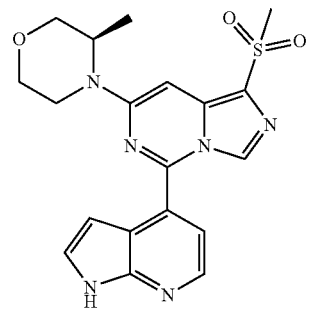 [SMILES: C[C@@H]1COCCN1c1cc2c(S(C)(=O)=O)ccn2c(-c2ccnc3[nH]ccc23)n1]

Example 19

(R)-3-methyl-4-(6-(methylsulfonyl)-1-(1H-pyrrolo[2,3-b]pyridin-4-yl)pyrrolo[1,2-a]pyrazin-3-yl)morpholine

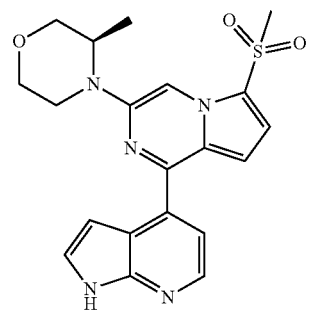 [SMILES: C[C@@H]1COCCN1c1cn2c(S(C)(=O)=O)ccc2c(-c2ccnc3[nH]ccc23)n1]

Example 20

(R)-3-methyl-4-(3-(methylsulfonyl)-8-(1H-pyrrolo[2,3-b]pyridin-4-yl)-[1,2,4]triazolo[4,3-a]pyrazin-6-yl)morpholine

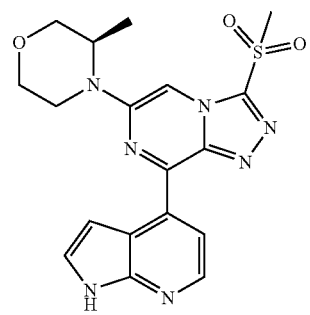 [SMILES: C[C@@H]1COCCN1c1cn2c(S(C)(=O)=O)nnc2c(-c2ccnc3[nH]ccc23)n1]

The following compounds of Examples 21-25 were prepared using a synthesis process similar to that described in Example 13.

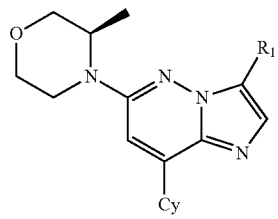

| Example | R₁ | Cy | LC-MS (ESI) | ¹H NMR (400 MHz) |
|---|---|---|---|---|
| 21 | pyrrole (3-yl, NH) | 1-methylpyrazol-5-yl | (M + H)⁺ 364.25 | CD₃OD: δ 8.04 (s, 1H), 7.77 (s, 1H), 7.67 (d, J = 1.9 Hz, 1H), 7.22 (s, 1H), 7.01 (d, J = 2.5 Hz, 1H), 6.96-6.90 (m, 1H), 6.79 (d, J = 1.9 Hz, 1H), 4.52-4.38 (m, 1H), 4.09-4.01 (m, 2H), 4.00 (s, 3H), 3.88-3.79 (m, 2H), 3.68 (td, J = 11.9, 2.6 Hz, 1H), 3.48 (td, J = 13.0, 3.9 Hz, 1H), 1.41 (d, J = 6.8 Hz, 3H) |
| 22 | pyrrole (2-yl, NH) | 1-methylpyrazol-5-yl | (M + H)⁺ 364.30 | CD₃OD: δ 7.79 (s, 1H), 7.67 (d, J = 1.9 Hz, 1H), 7.24 (dd, J = 2.1, 1.1 Hz, 1H), 7.22-7.18 (m, 2H), 6.78 (d, J = 1.9 Hz, 1H), 6.43 (t, J = 3.2 Hz, 1H), 4.46 (q, J = 4.9 Hz, 1H), 4.12-4.03 (m, 2H), 4.00 (s, 3H), 3.88-3.78 (m, 2H), 3.67 (td, J = 12.1, 3.2 Hz, 1H), 3.49 (td, J = 13.2, 4.0 Hz, 1H), 1.39 (d, J = 6.8 Hz, 3H) |
| 23 | imidazol-4-yl | 1-methylpyrazol-5-yl | (M + H)⁺ 365.30 | CD₃OD: δ 8.50 (s, 1H), 8.21 (s, 1H), 7.66 (d, J = 1.7 Hz, 1H), 7.60 (s, 1H), 7.07 (s, 1H), 6.79-6.74 (m, 1H), 4.45-4.38 (m, 1H), 4.06 (dd, J = 11.8, 2.3 Hz, 1H), 3.99 (s, 3H), 3.98-3.94 (m, 1H), 3.84 (s, 2H), 3.68 (td, J = 13.0, 3.2 Hz, 1H), 3.51-3.40 (m, 1H), 1.38 (d, J = 6.8 Hz, 3H) |
| 24 | pyrazol-3-yl | 6-methylpyridin-3-yl | (M + H)⁺ 376.3 | DMSO-d₆: δ 8.93 (s, 1H), 8.33 (s, 0.12H), 8.18 (d, J = 7.7 Hz, 1H), 7.72 (s, 1H), 7.59 (s, 1H), 7.48 (d, J = 8.0 Hz, 1H), 7.14 (s, 1H), 7.02 (s, 1H), 4.44 (d, J = 5.5 Hz, 1H), 3.98 (dd, J = 21.5, 11.8 Hz, 2H), 3.75 (q, J = 11.0 Hz, 2H), 3.57 (t, J = 11.0 Hz, 1H), 3.30-3.26 (m, 1H), 2.58 (s, 3H), 1.25 (d, J = 6.4 Hz, 3H). |
| 25 | pyrazol-3-yl | 2-fluorophenyl | (M + H)⁺ 379.15 | DMSO-d₆: δ 8.37 (s, 0.31H), 7.72 (t, J = 6.8 Hz, 2H), 7.63-7.55 (m, 1H), 7.48-7.36 (m, 2H), 7.27 (s, 1H), 7.11 (s, 1H), 6.97-6.88 (m, 1H), 4.38-4.30 (m, 1H), 3.93 (dd, J = 32.2, 11.1 Hz, 2H), 3.71 (q, J = 11.0 Hz, 2H), 3.59-3.48 (m, 1H), 1.22 (d, J = 6.3 Hz, 3H). |

Example 26

(R)-4-(4-(1-isopropyl-1H-pyrazol-5-yl)-7-(1H-pyrazol-5-yl)imidazo[1,5-b]pyridazin-2-yl)-3-methylmorpholine

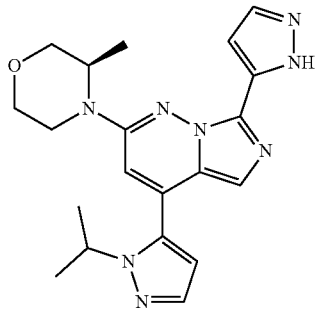 [SMILES: CC(C)n1nccc1-c1cc(N2CCOC[C@H]2C)nn2c(-c3ccn[nH]3)ncc12]

a) Preparation of 3,6-dichloro-4-(2,5-dimethyl-1H-pyrrol-1-yl)pyridazine: A solution of 3,6-dichloropyridazin-4-amine (20.0 g, 121.9 mmol), hexane-2,5-dione (16.7 g, 146.3 mmol) and TsOH·H$_2$O (9.26 g, 48.76 mmol) in toluene (300 mL) was stirred at 140° C. using a Dean Stark apparatus for 16 hours. The mixture was cooled down to room temperature and the toluene layer was decanted. The residue was purified by chromatography over silica gel (EtOAc/PE, 10 to 20%) to give the title compound (10.2 g, brown solid, yield: 35%). $^1$H NMR (400 MHz, CDCl$_3$): δ 7.47 (s, 1H), 5.96 (s, 2H), 1.99 (s, 6H).

b) Preparation of (R)-4-(6-chloro-5-(2,5-dimethyl-1H-pyrrol-1-yl)pyridazin-3-yl)-3-methylmorpholine: To a solution of 3,6-dichloro-4-(2,5-dimethyl-1H-pyrrol-1-yl)pyridazine (10.2 g, 42.3 mmol) in NMP (100 mL) was added (R)-3-methylmorpholine (5.1 g, 50.8 mmol), and DIEA (16.4 g, 126.9 mmol). The mixture was stirred at 190° C. for 6 hours. After completion, to the mixture was added water (200 mL) and the mixture was extracted with EtOAc (100 mL×3). The combined organic phase was washed with brine, dried over anhydrous sodium sulfate and concentrated. The residue was purified by chromatography over silica gel (EtOAc/PE, 10 to 30%) to give the title compound (9.25 g, brown solid, yield: 71%). LC-MS (ESI): m/z(M+H)$^+$ 307.10. $^1$H NMR (400 MHz, CDCl$_3$): δ 6.77 (d, J=4.6 Hz, 1H), 5.94 (d, J=4.6 Hz, 2H), 4.16 (d, J=7.6 Hz, 1H), 4.02 (dd, J=17.8, 13.0 Hz, 2H), 3.80 (d, J=4.5 Hz, 2H), 3.62 (d, J=12.1 Hz, 1H), 3.35 (d, J=12.7 Hz, 1H), 1.99 (s, 6H), 1.28 (d, J=6.2 Hz, 3H).

c) Preparation of (R)-4-(2,5-dimethyl-1H-pyrrol-1-yl)-6-(3-methylmorpholino)pyridazine-3-carbonitrile: To a solution of (R)-4-(6-chloro-5-(2,5-dimethyl-1H-pyrrol-1-yl)pyridazin-3-yl)-3-methylmorpholine (9.25 g, 30.2 mmol) in DMF (100 mL) was added Zn(CN)$_2$ (7.09 g 136.0 mmol), 1,1'-Bis(diphenylphosphino)ferrocene (DPPF, 7.54 g, 13.6 mmol), Pd$_2$(dba)$_3$ (0.85 g, 0.93 mmol) and water (2 mL). The mixture was stirred at 150° C. for 6 hours. After completion, to the mixture was added water (200 mL) and filtered. The filtrate was extracted with EtOAc (200 mL×3). The combined organic phase was washed with brine, dried over anhydrous sodium sulfate and concentrated. The residue was purified by chromatography over silica gel (EtOAc/PE, 20 to 50%) to give the title compound (8.4 g, brown solid, yield: 93%). $^1$H NMR (400 MHz, CDCl$_3$): δ 6.58 (s, 1H), 5.97 (s, 2H), 4.35 (s, 1H), 4.20 (d, J=13.8 Hz, 1H), 4.13-4.05 (m, 1H), 3.89-3.75 (m, 2H), 3.70-3.61 (m, 1H), 3.51-3.37 (m, 1H), 2.07 (d, J=5.0 Hz, 6H), 1.36 (d, J=6.8 Hz, 3H).

d) Preparation of (R)-(4-(2,5-dimethyl-1H-pyrrol-1-yl)-6-(3-methylmorpholino)pyridazin-3-yl)methanamine: To a solution of (R)-4-(2,5-dimethyl-1H-pyrrol-1-yl)-6-(3-methylmorpholino)pyridazine-3-carbonitrile (8.4 g, 28.3 mmol) in MeOH (100 mL) was added Raney Ni (~40 g, W/W). The system was evacuated and backfilled with H$_2$ three times and the mixture was stirred at rt for 16 hours. After completion, the mixture was filtered over Celite and the cake was washed with MeOH (90 mL×10). The filtrate was combined and concentrated to give the title compound (5.6 g, black solid). $^1$H NMR (400 MHz, MeOD): δ 7.43 (s, 1H), 5.95 (s, 2H), 4.36 (s, 1H), 4.03 (d, J=12.2 Hz, 2H), 3.74-3.83 (m, 3H), 3.60 (d, J=11.6 Hz, 1H), 3.35 (s, 2H), 1.96 (s, 6H), 1.27 (d, J=7.0 Hz, 3H).

e) Preparation of (R)—N-((4-(2,5-dimethyl-1H-pyrrol-1-yl)-6-(3-methylmorpholino)pyridazin-3-yl)methyl)-1H-pyrazole-5-carboxamid: To a solution of (R)-(4-(2,5-dimethyl-1H-pyrrol-1-yl)-6-(3-methylmorpholino)pyridazin-3-yl)methanamine (5.6 g, 18.6 mmol) in DCM (60 mL) was added 1H-pyrazole-5-carboxylic acid (2.5 g, 22.3 mmol), HATU (4.3 g, 11.2 mmol) and DIEA (7.2 g, 55.8 mmol). The mixture was stirred at rt overnight. Then K$_2$CO$_3$ (5.1 g, 37.2 mmol) was added and the mixture was stirred at rt for 1 hour. After completion, to the mixture was added water (100 mL) and the mixture was extracted with DCM (100 mL×3). The combined organic phase was washed with brine, dried over anhydrous sodium sulfate and concentrated. The residue was purified by chromatography over silica gel (MeOH/DCM, 1 to 3%) to give the title compound (4.3 g, yellow solid, yield: 38%). LC-MS (ESI): m/z(M+H)$^+$ 396.20. $^1$H NMR (400 MHz, DMSO-d$_6$): δ 8.34 (s, 1H), 7.81 (s, 1H), 7.29 (s, 1H), 6.61 (s, 1H), 5.89 (s, 2H), 4.38 (s, 1H), 4.14-4.00 (m, 3H), 3.99-3.92 (m, 1H), 3.75-3.66 (m, 2H), 3.55-3.48 (m, 1H), 3.20-3.15 (m, 2H), 1.94 (s, 6H), 1.16 (d, J=6.6 Hz, 3H).

f) Preparation of (R)-4-(4-(2,5-dimethyl-1H-pyrrol-1-yl)-7-(1H-pyrazol-5-yl)imidazo[1,5-b]pyridazin-2-yl)-3-methylmorpholine: A solution of (R)—N-((4-(2,5-dimethyl-1H-pyrrol-1-yl)-6-(3-methylmorpholino)pyridazin-3-yl)methyl)-1H-pyrazole-5-carboxamide (4.3 g, 10.9 mmol) in POCl$_3$ (40 mL) was stirred at 120° C. for 4 hours. After completion, the solvent was removed. To the mixture was added water (5 mL) and the pH was adjusted to 8 with aq. ammonium hydroxide (25% w/w) and the mixture was extracted with DCM (40 mL×2). The combined organic phase was washed with brine, dried over anhydrous sodium sulfate and concentrated. The residue was purified by chromatography over silica gel (EtOAc/PE, 20 to 100%) to give the title compound (2.7 g, yellow solid, yield: 66%). LC-MS (ESI): m/z(M+H)$^+$ 378.11. $^1$H NMR (400 MHz, CDCl$_3$): δ 7.71 (s, 1H), 7.29 (s, 1H), 7.24 (s, 1H), 7.11 (s, 1H), 6.37 (s, 1H), 5.98 (s, 2H), 4.16-4.03 (m, 2H), 3.95-3.75 (m, 3H), 3.72-3.66 (m, 1H), 3.52-3.41 (m, 1H), 2.11 (s, 6H), 1.37 (d, J=6.7 Hz, 3H).

g) Preparation of (R)-2-(3-methylmorpholino)-7-(1H-pyrazol-5-yl)imidazo[1,5-b]pyridazin-4-ol: A solution of (R)-4-(4-(2,5-dimethyl-1H-pyrrol-1-yl)-7-(1H-pyrazol-5-yl)imidazo[1,5-b]pyridazin-2-yl)-3-methylmorpholine (2.7 g, 7.16 mmol) in TFA/H$_2$O (20 mL/2.0 mL) was stirred at 85° C. for 16 hours. After completion, the solvent was removed. The residue was purified by chromatography over silica gel (MeOH/DCM, 1 to 10%) to give the title compound (1.5 g, yellow solid, yield: 71%). LC-MS (ESI): m/z(M+H)$^+$ 301.40. $^1$H NMR (400 MHz, DMSO-d$_6$): δ 13.33 (s, 1H), 7.63 (s, 1H), 7.46 (s, 1H), 7.03 (s, 1H), 5.93

(s, 1H), 4.06 (s, 1H), 3.92 (d, J=11.3 Hz, 1H), 3.67 (s, 3H), 3.48 (s, 1H), 3.18-3.12 (m, 1H), 1.15 (s, 3H).

h) Preparation of (R)-2-(3-methylmorpholino)-7-(1-((trifluoromethyl)sulfonyl)-1H-pyrazol-5-yl)imidazo[1,5-b]pyridazin-4-yl trifluoromethanesulfonate: To a solution of (R)-2-(3-methylmorpholino)-7-(1H-pyrazol-5-yl)imidazo[1,5-b]pyridazin-4-ol (1.5 g, 5 mmol) in dry DCM (40 mL) was added TEA (1.5 g, 15.0 mmol) at 0° C. under nitrogen atmosphere and stirred at 0° C. for 10 min. Then Tf$_2$O (4.2 g, 15.0 mmol) was added slowly and the mixture was stirred at 0° C. for 30 min, then warm to rt. After stirred for 1.5 hours, the mixture was washed with water, brine, dried over anhydrous sodium sulfate and concentrated. The residue was purified by chromatography over silica gel (DCM/PE, 10 to 30%) to give the title compound (1.2 g, yellow solid, yield: 38%). LC-MS (ESI): m/z(M+H)$^+$ 565.05. $^1$H NMR (400 MHz, CDCl$_3$): δ 8.16 (s, 1H), 7.65 (s, 1H), 7.42 (s, 1H), 6.54 (s, 1H), 4.16-4.03 (m, 2H), 3.83 (m, 3H), 3.73-3.62 (m, 1H), 3.44 (d, J=13.4 Hz, 1H), 1.38 (d, J=6.8 Hz, 3H).

i) Preparation of (R)-4-(4-(1-isopropyl-1H-pyrazol-5-yl)-7-(1H-pyrazol-5-yl)imidazo[1,5-b]pyridazin-2-yl)-3-methylmorpholine: To a solution of (R)-2-(3-methylmorpholino)-7-(1-((trifluoromethyl)sulfonyl)-1H-pyrazol-5-yl)imidazo[1,5-b]pyridazin-4-yl trifluoromethanesulfonate (0.3 g, 0.53 mmol), 1-isopropyl-5-(4,4,5,5-tetramethyl-1,3,2-dioxaborolan-2-yl)-1H-pyrazole (150.2 mg, 0.64 mmol) and K$_2$CO$_3$ (219.4 mg, 1.59 mmol) in dioxane (2 mL) was added Pd(dppf)Cl$_2$ (77.6 mg, 0.11 mmol). The system was evacuated and backfilled with Ar three times and stirred at 90° C. for 16 hours. After completion, the mixture was cooled down to room temperature and 2 N LiOH (1 mL) was added. After stirred at rt for 0.5 h, the mixture was filtered and the filtrate was concentrated. The residue was purified by Prep-TLC twice (MeOH/DCM=10:1) to the targeted compound (17 mg, yellow solid, yield: 8%). LC-MS (ESI): m/z(M+H)$^+$ 393.15. $^1$H NMR (400 MHz, MeOD): δ 7.73 (s, 1H), 7.68 (s, 1H), 7.26 (s, 1H), 7.19 (s, 1H), 6.77 (s, 1H), 6.59 (s, 1H), 4.61 (dd, J=12.9, 6.2 Hz, 1H), 4.33 (d, J=7.3 Hz, 1H), 4.07-3.99 (m, 1H), 3.91 (d, J=13.3 Hz, 1H), 3.86-3.75 (m, 2H), 3.67 (t, J=11.9 Hz, 1H), 3.41 (t, J=12.8 Hz, 1H), 1.46 (d, J=6.5 Hz, 6H), 1.35 (d, J=6.7 Hz, 3H).

Example 27

(R)-4-(4,7-di(1H-pyrazol-5-yl)imidazo[1,5-b]pyridazin-2-yl)-3-methylmorpholine

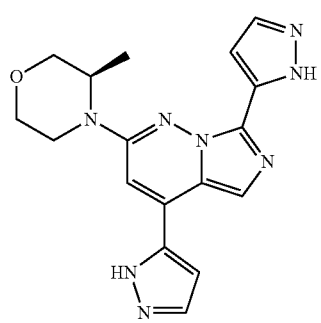 [SMILES: C[C@@H]1COCCN1c1cc(-c2ccn[nH]2)c2cnc(-c3ccn[nH]3)n2n1]

The compound of Example 27 was prepared using a synthesis process similar to that described in Example 26. The compound of Example 27 is a yellow solid. LC-MS (ESI): m/z(M+H)$^+$ 351.35. $^1$H NMR (400 MHz, DMSO-d$_6$): δ 13.43 (s, 1H), 8.00 (s, 1H), 7.95 (s, 1H), 7.69 (s, 1H), 7.22 (t, J=3.2 Hz, 2H), 7.12 (s, 1H), 4.43 (s, 1H), 4.01 (d, J=11.3 Hz, 1H), 3.92 (d, J=13.3 Hz, 1H), 3.78 (t, J=10.1 Hz, 2H), 3.61-3.58 (m, 1H), 3.29-3.26 (m, 1H), 1.24 (d, J=6.8 Hz, 3H).

Example 28

(R)-3-methyl-4-(4-(1-methyl-1H-pyrazol-5-yl)-8-(1H-pyrazol-5-yl)imidazo[1,5-a]pyrimidin-2-yl)morpholine

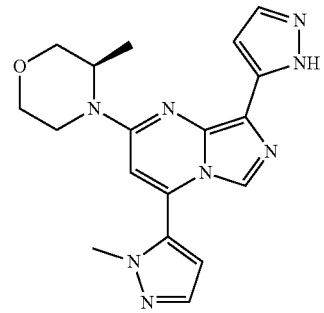 [SMILES: C[C@@H]1COCCN1c1cc(-c2ccnn2C)n2cnc(-c3ccn[nH]3)c2n1]

Example 29

(R)-3-methyl-4-(4-(1-methyl-1H-pyrazol-5-yl)-7-(1H-pyrazol-3-yl)imidazo[5,1-f][1,2,4]triazin-2-yl)morpholine

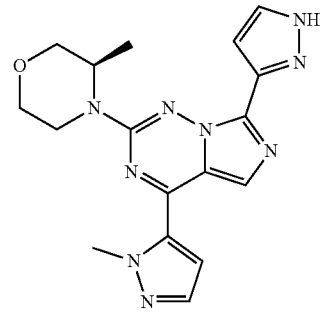 [SMILES: C[C@@H]1COCCN1c1nc(-c2ccnn2C)c2cnc(-c3cc[nH]n3)n2n1]

Example 30

(R)-3-methyl-4-(8-(1-methyl-1H-pyrazol-5-yl)-3-(1H-pyrazol-5-yl)-[1,2,4]triazolo[3,4-f][1,2,4]triazin-6-yl)morpholine

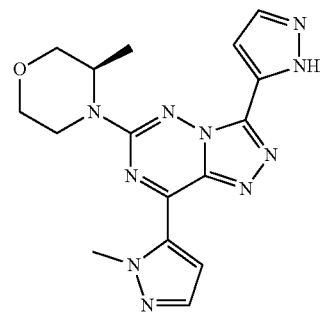 [SMILES: C[C@@H]1COCCN1c1nc(-c2ccnn2C)c2nnc(-c3ccn[nH]3)n2n1]

Example 31

(R)-3-methyl-4-(4-(1-methyl-1H-pyrazol-5-yl)-8-(1H-pyrazol-5-yl)imidazo[1,5-a][1,3,5]triazin-2-yl)morpholine

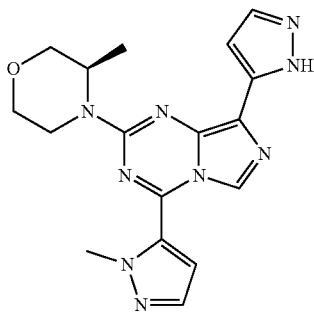

Example 32

(R)-4-(4-cyclopropyl-7-(1H-pyrazol-5-yl)imidazo[1,5-b]pyridazin-2-yl)-3-methylmorpholine

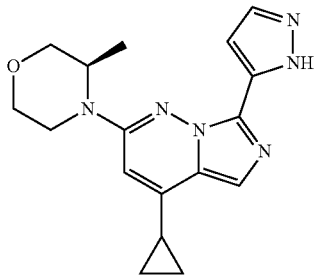 [SMILES: C[C@@H]1COCCN1c1cc(C2CC2)c2cnc(-c3ccn[nH]3)n2n1]

a) Preparation of (R)-4-(5-chloro-6-methylpyridazin-3-yl)-3-methylmorpholine: A solution of 4,6-dichloro-3-methylpyridazine (3.0 g, 18.4 mmol), (R)-3-methylmorpholine (2.8 g, 27.6 mmol) and DIEA (4.8 g, 36.8 mmol) in NMP (30 mL) was stirred at 150° C. for 8 hours. After completion of the reaction, to the mixture was added water (50 mL) and the mixture was extracted with EtOAc (40 mL×3). The combined organic phases were washed with brine, dried over anhydrous sodium sulfate, filtered and concentrated under reduced pressure. The residue was purified by chromatography over silica gel (EtOAc/PE, 10% to 30%) to give the title compound (0.55 g, yellow solid, yield: 13%). LC-MS (ESI): m/z(M+H)+ 228.45. $^1$H NMR (400 MHz, CDCl$_3$): δ 6.81 (s, 1H), 4.29-4.15 (m, 1H), 4.04-3.95 (m, 1H), 3.87-3.73 (m, 3H), 3.60 (t, J=11.8 Hz, 1H), 3.27 (m, 1H), 2.58 (s, 3H), 1.24 (d, J=6.8 Hz, 4H).

b) Preparation of (R)-4-chloro-6-(3-methylmorpholino)pyridazine-3-carbaldehyde: A mixture of (R)-4-(5-chloro-6-methylpyridazin-3-yl)-3-methylmorpholine (510 mg, 2.24 mmol) and SeO$_2$ (298 mg, 2.68 mmol) in 1,4-dioxane (10 mL) was stirred at 95° C. for 16 hours. After cooling to room temperature, the mixture was concentrated under reduced pressure. The residue was purified by column chromatography over silica gel (EtOAc/PE, 10 to 30%) to give the title compound (370 mg, yellow solid, yield: 68%). $^1$H NMR (400 MHz, CDCl$_3$): δ 10.18 (s, 1H), 6.78 (s, 1H), 4.51 (s, 1H), 4.17 (d, J=13.2 Hz, 1H), 4.08 (d, J=10.8 Hz, 1H), 3.87-3.76 (m, 2H), 3.64 (t, J=11.8 Hz, 1H), 3.54-3.33 (m, 1H), 1.38 (d, J=6.4 Hz, 3H).

c) Preparation of (R)-1-(4-chloro-6-(3-methylmorpholino)pyridazin-3-yl)-N-(2,4-dimethoxybenzyl)methanamine: To a solution of methyl (R)-4-chloro-6-(3-methylmorpholino)pyridazine-3-carbaldehyde (470 mg, 1.94 mmol) and (2,4-dimethoxyphenyl)methanamine (390 mg, 2.33 mmol) in DCE (8 ml) was added AcOH (349 mg, 5.82 mmol). The resulting solution was stirred at room temperature for 1 hour. NaBH(OAc)$_3$ (822 mg, 3.88 mmol, 2.0 equiv) was added in portions and the resulting mixture was stirred at room temperature overnight. The reaction mixture was quenched with ice water (10 mL) and extracted with EtOAc (15 mL×3). The organic layers were combined, washed with brine, dried over Na$_2$SO$_4$, filtered and concentrated under reduce pressure. The residue was purified by flash column chromatography on silica gel (DCM/MeOH=100/1 to 50/1) to give the title compound (420 mg, yellow solid, yield: 55%). LC-MS (ESI): m/z(M+H)+ 393.30.

d) Preparation of (R)-(4-chloro-6-(3-methylmorpholino)pyridazin-3-yl)methanamine: A solution of (R)-1-(4-chloro-6-(3-methylmorpholino)pyridazin-3-yl)-N-(2,4-dimethoxybenzyl)methanamine (420 mg, 1.07 mmol) in TFA (3 mL) was stirred at 80° C. for 3 h. After the solvent was removed, to the residue was added DCM (5 mL) and aq. ammonium hydroxide (~25% w/w, 0.5 mL). The solution was stirred at rt for 5 min and then concentrated. The residue was purified by flash column chromatography on silica gel (DCM/MeOH=100/1 to 15/1) to give the title compound (210 mg, yellow solid, yield: 81%) as yellow solid. LC-MS (ESI): m/z(M+H)+ 243.15.

e) Preparation of N-((4-chloro-6-((R)-3-methylmorpholino)-2,3-dihydropyridazin-3-yl)methyl)-1H-pyrazole-5-carboxamide: To a solution of (R)-(4-chloro-6-(3-methylmorpholino)pyridazin-3-yl)methanamine (190 mg, 0.78 mmol) in DMF (4 mL) was added 1H-pyrazole-5-carboxylic acid (88 mg, 0.78 mmol), HATU (593 mg, 1.56 mmol) and DIEA (202 mg, 1.56 mmol). The mixture was stirred at rt overnight. The reaction mixture was quenched with water (10 mL) and extracted with EtOAc (10 mL×3). All the organic layers were combined, washed with brine, dried over Na$_2$SO$_4$, filtered and concentrated under reduce pressure. The residue was purified by flash column chromatography on silica gel (DCM/MeOH=100/1 to 10/1) to give the title compound (181 mg, yellow solid, yield: 69%). LC-MS (ESI): m/z(M+H)+ 337.20.

f) Preparation of (R)-4-(4-chloro-7-(1H-pyrazol-5-yl)imidazo[1,5-b]pyridazin-2-yl)-3-methylmorpholine: A solution of N-((4-(1-methyl-1H-pyrazol-5-yl)-6-((R)-3-methylmorpholino)-2,3-dihydropyridazin-3-yl)methyl)-1H-pyrazole-5-carboxamide (181 mg, 0.54 mmol) in POCl$_3$ (3 mL) was stirred at 120° C. for 3 hour. After the solvent was removed, the residue was diluted with DCM (15 mL) and washed with saturated aq. NaHCO$_3$, dried over Na$_2$SO$_4$, filtered, and concentrated under reduced pressure. The residue was purified by flash column chromatography on silica gel (DCM/MeOH=100/1 to 10/1) to give the title compound (88 mg, yellow solid, yield: 51%). LC-MS (ESI): m/z(M+H)+ 319.20. $^1$H NMR (400 MHz, CDCl$_3$): δ 7.72 (s, 1H), 7.64 (s, 1H), 7.09 (s, 1H), 6.57 (s, 1H), 4.16-4.00 (m, 2H), 3.86-3.78 (m, 2H), 3.78-3.60 (m, 2H), 3.48-3.36 (m, 1H), 1.36 (d, J=6.4 Hz, 3H).

g) Preparation of (R)-4-(4-cyclopropyl-7-(1H-pyrazol-5-yl)imidazo[1,5-b]pyridazin-2-yl)-3-methylmorpholine: To a mixture of (R)-4-(4-chloro-7-(1H-pyrazol-5-yl)imidazo[1, 5-b]pyridazin-2-yl)-3-methylmorpholine (70 mg, 0.22 mmol), cyclopropylboronic acid (11, 38 mg, 0.44 mmol), $K_3PO_4 \cdot 3H_2O$ (176 mg, 0.22 mmol) in 1,4-dioxane (1 mL) and toluene (1 mL) were added $Pd(OAc)_2$ (5 mg, 0.02 mmol) and tricyclohexylphosphine (11 mg, 0.04 mmol) under $N_2$ protection. The system was evacuated and backfilled with $N_2$ three times. The mixture was stirred at 100° C. for 16 h. After completion, the mixture was filtered and concentrated under reduced pressure. The residue was purified by Prep-TLC (DCM/MeOH=10/1) to give the targeted compound (15 mg, slightly yellow solid, yield: 21%). LC-MS (ESI): m/z(M+H)$^+$ 325.25. $^1$H NMR (400 MHz, $CDCl_3$): δ 7.70 (s, 1H), 7.61 (s, 1H), 7.08 (s, 1H), 6.07 (s, 1H), 4.16-4.05 (m, 2H), 3.87-3.81 (m, 2H), 3.75-3.63 (m, 2H), 3.46-3.36 (m, 1H), 2.15-2.07 (m, 1H), 1.33 (d, J=5.6 Hz, 3H), 1.20-1.15 (m, 2H), 1.03-0.97 (m, 2H).

The following compounds of Examples 33-63 were prepared using a synthesis process similar to that described in Example 13, Example 26 or Example 32.

| Example | R$_0$ | R$_1$ | R$_2$ | MW/LC-MS (ESI) | $^1$H NMR (400 MHz) |
|---|---|---|---|---|---|
| 33 | (3S)-3-methylmorpholinyl | 1H-pyrazol-3-yl | 1-methyl-1H-pyrazol-5-yl | (M + H)$^+$ 365.4 | CD$_3$OD: δ 7.75 (d, J = 2.2 Hz, 1H), 7.65 (s, 1H), 7.38 (s, 1H), 7.20 (s, 1H), 6.88 (s, 1H), 6.74 (s, 1H), 4.36 (d, J = 6.1 Hz, 1H), 4.05 (d, J = 10.5 Hz, 1H), 3.98 (s, 3H), 3.93 (d, J = 13.9 Hz, 1H), 3.83 (s, 2H), 3.68 (t, J = 11.6 Hz, 1H), 3.42 (t, J = 12.6 Hz, 1H), 1.36 (d, J = 6.5 Hz, 3H). |
| 34 | 3,5-dimethylmorpholinyl | 1H-pyrazol-3-yl | 1-methyl-1H-pyrazol-5-yl | (M + H)$^+$ 379.45 | CDCl$_3$: δ 7.71 (s, 1H), 7.62 (d, J = 2.1 Hz, 1H), 7.46 (s, 1H), 7.12 (s, 1H), 6.61 (s, 1H), 6.44 (s, 1H), 4.02-3.99 (m, 1H), 3.96 (s, 3H), 3.94-3.88 (m, 2H), 3.62 (dt, J = 11.5, 5.9 Hz, 2H), 3.47 (d, J = 6.3 Hz, 1H), 1.28 (s, 3H), 1.27 (s, 3H). |
| 35 | (3S)-3-methylmorpholinyl | 1H-pyrazol-3-yl | (CF$_3$-phenyl) | (M + H)$^+$ 439.25 | DMSO-d$_6$: δ 8.13 (s, 4H), 7.73 (s, 1H), 7.59 (s, 1H), 7.15 (s, 1H), 7.05 (s, 1H), 4.44 (s, 1H), 3.98 (dd, J = 22.6, 11.5 Hz, 2H), 3.75 (dd, J = 24.0, 10.9 Hz, 2H), 3.56 (s, 1H), 3.31-3.23 (m, 4H), 1.25 (d, J = 5.9 Hz, 3H). |
| 36 | (3S)-3-methylmorpholinyl | 1H-pyrazol-3-yl | 2,5-dimethyl-1H-pyrrol-1-yl | (M + H)$^+$ 378.15 | CDCl$_3$: δ 7.71 (s, 1H), 7.28 (s, 1H), 7.24 (s, 1H), 7.10 (s, 1H), 6.37 (s, 1H), 5.98 (s, 2H), 4.09 (dd, J = 14.8, 8.1 Hz, 2H), 3.87-3.83 (m, 2H), 3.83-3.76 (m, 1H), 3.69 (t, J = 11.4 Hz, 1H), 3.51-3.40 (m, 1H), 2.10 (s, 6H), 1.37 (d, J = 6.6 Hz, 3H). |
| 37 | (3S)-3-methylmorpholinyl | 1H-pyrazol-3-yl | 1-ethyl-1H-pyrazol-5-yl | (M + H)$^+$ 379.4 | CDCl$_3$: δ 7.73 (s, 1H), 7.67 (s, 1H), 7.44 (s, 1H), 7.12 (s, 1H), 6.57 (s, 1H), 6.44 (s, 1H), 4.25 (q, J = 7.0 Hz, 2H), 4.19-4.08 (m, 2H), 3.87 (s, 2H), 3.81 (d, J = 12.1 Hz, 1H), 3.71 (td, J = 11.6, 3.0 Hz, 1H), 3.56-3.42 (m, 1H), 1.45 (t, J = 7.3 Hz, 3H), 1.43-1.39 (m, 3H). |
| 38 | (3S)-3-methylmorpholinyl | 1H-pyrazol-3-yl | 3-methyl-1H-pyrazol-4-yl | (M + H)$^+$ 365.30 | CD$_3$OD: δ 8.01 (s, 1H), 7.70 (s, 1H), 7.47 (s, 1H), 7.15 (s, 1H), 6.64 (s, 1H), 4.31 (d, J = 7.3 Hz, 1H), 4.03 (d, J = 12.0 Hz, 1H), 3.88 (d, J = 13.4 Hz, 1H), 3.82 (s, 2H), 3.67 (t, J = 11.6 Hz, 1H), 3.38 (t, J = 12.3 Hz, 1H), 2.46 (s, 3H), 1.33 (d, J = 6.7 Hz, 3H). |

-continued

[Core structure: pyrazolo[1,5-b]pyridazine-like bicyclic scaffold with R₀ at position 6, R₁ at position 3, R₂ at position 8]

| Example | R₀ | R₁ | R₂ | MW/LC-MS (ESI) | ¹H NMR (400 MHz) |
|---|---|---|---|---|---|
| 39 | (S)-3-methylmorpholin-4-yl | 3-methyl-1H-pyrazol-5-yl | 6-methylpyridin-3-yl | (M + H)⁺ 390.45 | CDCl₃: δ 8.81 (s, 1H), 7.95 (s, 1H), 7.54 (s, 1H), 7.34 (d, J = 8.1 Hz, 1H), 6.82 (s, 1H), 6.47 (s, 1H), 4.18 (d, J = 7.3 Hz, 1H), 4.12-4.01 (m, 1H), 3.84 (s, 2H), 3.79 (d, J = 13.3 Hz, 1H), 3.68 (t, J = 11.9 Hz, 1H), 3.51-3.37 (m, 1H), 2.65 (s, 3H), 2.39 (s, 3H), 1.37 (d, J = 6.8 Hz, 3H). |
| 40 | (S)-3-methylmorpholin-4-yl | 1H-pyrazol-3-yl | 2-methylphenyl | (M + H)⁺ 375.35 | CD₃OD: δ 7.73 (s, 1H), 7.41-7.26 (m, 4H), 7.18 (s, 1H), 6.96 (s, 1H), 6.67 (s, 1H), 4.31 (d, J = 7.4 Hz, 1H), 4.04-3.97 (m, 1H), 3.90 (d, J = 13.4 Hz, 1H), 3.79 (s, 2H), 3.65 (t, J = 12.5 Hz, 1H), 3.39 (t, J = 12.9 Hz, 1H), 2.24 (s, 3H), 1.33 (d, J = 6.6 Hz, 3H). |
| 41 | (S)-3-methylmorpholin-4-yl | 1H-pyrazol-3-yl | 1,4-dimethyl-1H-pyrazol-5-yl | (M + H)⁺ 379.2 | DMSO-d₆: δ 7.79-7.58 (m, 1H), 7.47 (s, 1H), 7.24 (s, 1H), 7.13 (s, 1H), 6.93 (s, 1H), 4.37 (s, 1H), 4.00 (d, J = 11.7 Hz, 1H), 3.93 (d, J = 13.4 Hz, 1H), 3.78 (s, 3H), 3.72 (dd, J = 15.8, 4.6 Hz, 2H), 3.57 (t, J = 11.6 Hz, 1H), 3.28 (s, 1H), 2.00 (s, 3H), 1.25 (d, J = 6.6 Hz, 3H). |
| 42 | (S)-3-methylmorpholin-4-yl | 1H-pyrazol-3-yl | 2-methylpyridin-3-yl | (M + H)⁺ 376.1 | CDCl₃: δ 8.64 (d, J = 4.8 Hz, 1H), 7.71 (s, 1H), 7.65 (d, J = 7.7 Hz, 1H), 7.27 (dd, J = 8.3, 5.3 Hz, 1H), 7.23 (s, 1H), 7.13 (s, 1H), 6.38 (d, J = 2.6 Hz, 1H), 4.19-4.07 (m, 2H), 3.84 (s, 2H), 3.80 (s, 1H), 3.69 (dd, J = 13.2, 10.2 Hz, 1H), 3.50-3.43 (m, 1H), 2.53 (s, 3H), 1.47-1.33 (m, 3H). |
| 43 | (S)-3-methylmorpholin-4-yl | 1H-pyrazol-3-yl | 3-fluoropyridin-4-yl | (M + H)⁺ 380.1 | DMSO-d₆: δ 8.83 (s, 1H), 8.65 (d, J = 4.8 Hz, 1H), 7.83 (t, J = 5.6 Hz, 1H), 7.73 (s, 1H), 7.38 (s, 1H), 7.14 (s, 1H), 7.08 (s, 1H), 4.37 (d, J = 7.5 Hz, 1H), 4.00 (d, J = 11.4 Hz, 1H), 3.92 (d, J = 13.4 Hz, 1H), 3.74 (q, J = 11.7 Hz, 2H), 3.57 (t, J = 11.7 Hz, 1H), 3.26 (brs, 1H), 1.26 (d, J = 6.6 Hz, 3H). |
| 44 | (S)-3-methylmorpholin-4-yl | 1H-pyrazol-3-yl | 4-methyl-6-(methylsulfonyl)pyridin-3-yl | (M + H)⁺ 454.25 | DMSO-d₆: δ 8.79 (s, 1H), 8.16 (s, 1H), 7.79-7.57 (m, 1H), 7.22 (s, 1H), 7.15 (s, 1H), 6.99 (s, 1H), 4.40-4.31 (m, 1H), 4.05-3.90 (m, 2H), 3.74 (q, J = 11.5 Hz, 2H), 3.57 (t, J = 11.8 Hz, 1H), 3.34-3.24 (m, 4H), 2.44 (s, 3H), 1.26 (d, J = 6.2 Hz, 3H). |
| 45 | (S)-3-methylmorpholin-4-yl | 1H-pyrazol-3-yl | 4-methylpyrimidin-5-yl | (M + H)⁺ 377.1 | DMSO-d₆: δ 920 (s, 1H), 8.82 (s, 1H), 7.70 (s, 1H), 7.26 (s, 1H), 7.14 (s, 1H), 6.99 (s, 1H), 4.40-4.29 (m, 1H), 4.00 (d, J = 11.0 Hz, 1H), 3.92 (d, J = 13.4 Hz, 1H), 3.74 (q, J = 11.3 Hz, 2H), 3.58 (d, J = 12.0 Hz, 1H), 3.29 (s, 1H), 2.48 (s, 3H), 1.26 (d, J = 6.7 Hz, 3H). |

-continued

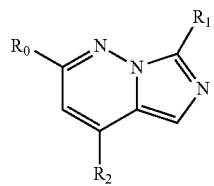

| Example | R₀ | R₁ | R₂ | MW/LC-MS (ESI) | ¹H NMR (400 MHz) |
|---|---|---|---|---|---|
| 46 | (S)-3-methylmorpholin-4-yl | 1H-pyrazol-3-yl | morpholin-4-yl | (M + H)⁺ 370.2 | CDCl₃: δ 7.72 (s, 1H), 7.53 (s, 1H), 7.09 (s, 1H), 5.65 (s, 1H), 4.15-4.06 (m, 2H), 3.95-3.89 (brs, 4H), 3.86-3.75 (brs, 2H), 3.67 (t, J = 12.2 Hz, 2H), 3.49-3.40 (m, 5H), 1.34 (d, J = 6.3 Hz, 3H). |
| 47 | (S)-3-methylmorpholin-4-yl | 1H-pyrazol-3-yl | 2-(trifluoromethyl)pyridin-3-yl | (M + H)⁺ 430.05 | CD₃OD: δ 8.84 (d, J = 4.6 Hz, 1H), 8.09 (d, J = 7.9 Hz, 1H), 7.81 (t, J = 6.2 Hz, 1H), 7.74 (s, 1H), 7.20 (s, 1H), 7.03 (s, 1H), 6.79 (s, 1H), 4.32-4.24 (m, 1H), 4.07-4.00 (m, 1H), 3.91 (d, J = 13.4 Hz, 1H), 3.81 (s, 2H), 3.71-3.61 (m, 1H), 3.49-3.34 (m, 1H), 1.33 (d, J = 6.8 Hz, 3H). |
| 48 | (S)-3-methylmorpholin-4-yl | 1H-pyrazol-3-yl | 6-methyl-5-(methylsulfonyl)pyridin-3-yl | (M + H)⁺ 454.25 | DMSO-d₆: δ 8.19 (d, J = 7.9 Hz, 1H), 8.01 (d, J = 7.7 Hz, 1H), 7.68 (s, 1H), 7.18 (s, 1H), 7.11 (s, 1H), 6.97 (s, 1H), 4.31 (s, 1H), 3.97 (d, J = 11.7 Hz, 1H), 3.89 (d, J = 13.3 Hz, 1H), 3.71 (q, J = 11.5 Hz, 3H), 3.55 (d, J = 11.5 Hz, 1H), 3.31-3.25 (m, 3H), 2.54 (s, 3H), 1.22 (d, J = 6.7 Hz, 3H). |
| 49 | (S)-3-methylmorpholin-4-yl | 1H-pyrazol-3-yl | 3-methyl-4-(methylsulfonyl)phenyl | (M + H)⁺ 453.3 | DMSO-d₆: δ 7.97 (s, 1H), 7.87 (d, J = 8.0 Hz, 1H), 7.68 (d, J = 8.3 Hz, 2H), 7.11 (s, 1H), 7.08 (s, 1H), 6.84 (s, 1H), 4.32 (d, J = 7.2 Hz, 1H), 4.01-3.85 (m, 2H), 3.70 (q, J = 11.5 Hz, 2H), 3.53 (t, J = 11.6 Hz, 2H), 3.26 (s, 3H), 2.34 (s, 3H), 1.22 (d, J = 6.5 Hz, 3H). |
| 50 | (S)-3-methylmorpholin-4-yl | 1H-pyrazol-3-yl | 6-methyl-5-(methylsulfinyl)pyridin-3-yl | (M + H)⁺ 438.25 | DMSO-d₆: δ 8.18 (d, J = 8.0 Hz, 1H), 7.91 (d, J = 7.9 Hz, 1H), 7.70 (dt, J = 26.3, 13.4 Hz, 1H), 7.21 (s, 1H), 7.15 (s, 1H), 6.97 (s, 1H), 4.36 (s, 1H), 3.97 (dd, J = 29.9, 12.3 Hz, 2H), 3.74 (q, J = 11.6 Hz, 2H), 3.57 (t, J = 11.9 Hz, 1H), 3.25 (s, 1H), 2.87 (s, 3H), 2.53 (d, J = 4.3 Hz, 3H), 1.26 (d, J = 6.6 Hz, 3H). |
| 51 | (S)-3-methylmorpholin-4-yl | 1H-pyrazol-3-yl | 3-methylpyridin-4-yl | (M + H)⁺ 376.25 | DMSO-d₆: δ 8.61 (s, 1H), 8.53 (d, J = 4.8 Hz, 1H), 7.68 (s, 1H), 7.42 (d, J = 4.9 Hz, 1H), 7.10 (s, 2H), 6.83 (s, 1H), 4.37-4.29 (m, 1H), 3.92 (dd, J = 31.4, 12.3 Hz, 2H), 3.69 (q, J = 10.7, 9.8 Hz, 2H), 3.55-3.50 (m, 1H), 3.25-3.20 (m, 1H), 2.23 (s, 3H), 1.21 (d, J = 6.6 Hz, 3H). |

-continued

| Example | R₀ | R₁ | R₂ | MW/LC-MS (ESI) | ¹H NMR (400 MHz) |
|---|---|---|---|---|---|
| 52 | (S)-3-methylmorpholinyl | 1H-pyrazol-3-yl | 3-cyanophenyl | (M + H)⁺ 386.1 | DMSO-d₆: δ 8.34 (s, 1H), 8.22 (d, J = 7.8 Hz, 1H), 8.04 (d, J = 7.2 Hz, 1H), 7.80 (t, J = 7.7 Hz, 1H), 7.63 (s, 2H), 7.14 (s, 1H), 7.07 (s, 1H), 4.51-4.40 (m, 1H), 4.06-3.92 (m, 2H), 3.76 (q, J = 11.2 Hz, 2H), 3.57 (t, J = 11.0 Hz, 2H), 1.26 (d, J = 6.2 Hz, 3H). |
| 53 | (S)-3-methylmorpholinyl | 1H-pyrazol-3-yl | 3,6-dihydro-2H-pyran-4-yl | (M + H)⁺ 367.25 | CDCl₃: δ 8.84 (d, J = 8.1 Hz, 1H), 7.95-7.77 (m, 1H), 7.57-7.39 (m, 1H), 6.34 (d, J = 11.5 Hz, 1H), 5.96 (d, J = 17.2 Hz, 1H), 4.32-4.17 (m, 1H), 4.14-3.93 (m, 2H), 3.93-3.78 (m, 3H), 3.77-3.61 (m, 3H), 3.45 (dq, J = 26.3, 14.4, 13.7 Hz, 2H), 2.33-2.13 (m, 1H), 1.84 (dd, J = 37.1, 12.6 Hz, 1H), 1.42-1.33 (m, 3H). |
| 54 | (S)-3-methylmorpholinyl | 1H-pyrazol-3-yl | tetrahydro-2H-pyran-4-yl | MW 368.44 | / |
| 55 | (S)-3-methylmorpholinyl | 1H-pyrazol-3-yl | 1H-pyrrolo[2,3-b]pyridin-4-yl | (M + H)⁺ 401.45 | DMSO-d₆: δ 12.00 (s, 1H), 8.40 (d, J = 4.9 Hz, 1H), 7.73 (s, 1H), 7.63 (s, 1H), 7.44 (d, J = 4.8 Hz, 1H), 7.38 (s, 1H), 7.16 (s, 1H), 7.04 (s, 1H), 6.51 (s, 1H), 4.42-4.34 (m, 1H), 4.01 (d, J = 10.6 Hz, 1H), 3.94 (d, J = 13.2 Hz, 1H), 3.76 (t, J = 9.8 Hz, 3H), 3.58 (s, 1H), 1.28 (d, J = 6.6 Hz, 3H). |
| 56 | (S)-3-methylmorpholinyl | 1H-pyrazol-3-yl | 1,5-dimethyl-1H-pyrazol-4-yl | (M + H)⁺ 379.15 | CDCl₃: δ 7.76 (s, 1H), 7.71 (s, 1H), 7.51 (s, 1H), 7.09 (s, 1H), 6.30 (s, 1H), 4.19-4.08 (m, 2H), 3.91 (s, 3H), 3.86 (s, 2H), 3.79 (d, J = 13.0 Hz, 1H), 3.70 (t, J = 11.9 Hz, 1H), 3.47 (dt, J = 13.3, 6.0 Hz, 1H), 2.43 (s, 3H), 1.38 (d, J = 6.7 Hz, 3H). |
| 57 | (S)-3-methylmorpholinyl | 1H-pyrazol-3-yl | 1-methyl-1H-pyrazol-4-yl | (M + H)⁺ 365.4 | DMSO-d₆: δ 7.95 (s, 1H), 7.71 (s, 1H), 7.55 (d, J = 8.6 Hz, 2H), 7.12 (s, 1H), 6.84 (s, 1H), 4.42-4.33 (m, 1H), 4.01 (d, J = 11.4 Hz, 1H), 3.90 (d, J = 13.1 Hz, 1H), 3.83 (s, 3H), 3.75 (d, J = 9.9 Hz, 2H), 3.57 (s, 2H), 1.24 (d, J = 7.8 Hz, 3H). |
| 58 | (S)-3-methylmorpholinyl | 1H-pyrazol-3-yl | 1,3-dimethyl-1H-pyrazol-4-yl | (M + H)⁺ 379.1 | DMSO-d₆: δ 8.32 (s, 1H), 7.73-7.65 (m, 1H), 7.59 (s, 1H), 7.11 (s, 1H), 6.66 (s, 1H), 4.36-4.27 (m, 1H), 4.02 (q, J = 9.2, 8.3 Hz, 2H), 3.87-3.83 (m, 4H), 3.74 (q, J = 11.6 Hz, 2H), 3.34-3.17 (m, 1H), 2.38 (s, 3H), 1.23 (d, J = 6.7 Hz, 3H). |
| 59 | (S)-3-methylmorpholinyl | 1H-pyrazol-3-yl | 1,5-dimethyl-1H-1,2,3-triazol-4-yl | MW 379.43 | / |

-continued

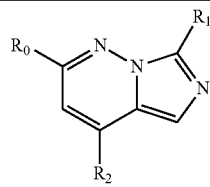

| Example | R₀ | R₁ | R₂ | MW/LC-MS (ESI) | $^1$H NMR (400 MHz) |
|---|---|---|---|---|---|
| 60 | (R)-3-methylmorpholine | 1H-pyrazol-3-yl | 1-(2-fluoroethyl)-1H-pyrazol-5-yl | MW 396.43 | / |
| 61 | (R)-3-methylmorpholine | 1H-pyrazol-3-yl | 1-(2-fluoroethyl)-1H-pyrazol-3-yl | (M + H)⁺ 397.3 | CD$_3$OD: δ 8.01 (s, 1H), 7.81 (d, J = 2.4 Hz, 1H), 7.68 (d, J = 8.8 Hz, 1H), 7.15 (d, J = 23.4 Hz, 2H), 7.04 (s, 1H), 4.91 (t, J = 4.6 Hz, 1H), 4.79 (t, J = 4.8 Hz, 1H), 4.61 (t, J = 4.7 Hz, 1H), 4.55 (t, J = 4.7 Hz, 1H), 4.44-4.33 (m, 1H), 4.05 (d, J = 11.0 Hz, 1H), 3.92 (d, J = 13.3 Hz, 1H), 3.84 (s, 2H), 3.75-3.64 (m, 1H), 3.49-3.35 (m, 1H), 1.35 (d, J = 6.7 Hz, 3H). |
| 62 | (R)-3-methylmorpholine | 1H-pyrazol-3-yl | 1-(difluoromethyl)-1H-pyrazol-5-yl | MW 400.39 | / |
| 63 | (R)-3-methylmorpholine | 1H-pyrazol-3-yl | 1-(difluoromethyl)-1H-pyrazol-3-yl | (M + H)⁺ 401.15 | CD$_3$OD: δ 8.36 (s, 1H), 8.21 (d, J = 2.8 Hz, 1H), 8.03 (s, 1H), 7.73 (s, 1H), 7.28 (d, J = 3.0 Hz, 1H), 7.22 (s, 1H), 7.17 (s, 1H), 4.47-4.35 (m, 1H), 4.05 (d, J = 11.4 Hz, 1H), 3.94 (d, J = 13.5 Hz, 1H), 3.84 (s, 2H), 3.69 (t, J = 11.8 Hz, 1H), 3.42 (t, J = 13.2 Hz, 1H), 1.35 (d, J = 6.5 Hz, 3H). |

Example 64

Determination of the Inhibitory Effect of (R)-3-methyl-4-(8-(1-methyl-1H-pyrazol-5-yl)-3-(1H-pyrazol-5-yl)imidazo[1,2-b]pyridazin-6-yl)morpholine And its Analogues on ATR Enzyme Activity Using ATR Enzyme Activity Experiment ATR enzyme activity was measured using HTRF reagent (Cisbio) in a 384-well plate (Greiner, #784075). The test compound was diluted to a 4× final concentration with reaction buffer (25 mM HEPES (pH8.0), 10 mM MnCl$_2$, 1% glycerol, 0.01% Brij-35, 5 mM DTT and 0.1% BSA). 2.5 μL of the diluted compound was added to the corresponding well, then 2.5 μL of 80 nM of p53 substrate (Eurofins, #14-952) and 2.5 μL of 2 ng/μL of ATR/ATRIP enzyme (Eurofins, 14-953) solution were added successively, and finally 2.5 μL of 40 μM of ATP solution was added. The mixture was centrifuged at 1000 rpm for 1 minute, and reacted at room temperature protected from light for 30 minutes. Then 5 μL of EDTA stop solution (250 mM) was added to stop the reaction. After 5 μL of detection mixture (Anti-phospho-p53 (ser15)-K (Cisbio, #61P08KAE, 0.084 ng/μL) and Anti-GST-d2 (Cisbio, #61GSTDLA, 5.00 ng/μL)) was finally added to each well, the fluorescence values at 665 nm and 615 nm were measured on the Envision 2104 instrument. Relative fluorescence ratio was calculated: Ratio$_{665nm/615nm}$−Ratio$_{background}$, and inhibition rate %=(1−(relative fluorescence ratio of test compound well−relative fluorescence ratio of positive control well)/(relative fluorescence ratio of blank control well−relative fluorescence ratio of positive control well))×100 was calculated. Data were analyzed using GraphPad Prism6.0, and fitted using the curve equation: Y=Bottom+(Top−Bottom)/(1+10^((Log IC$_{50}$−X)*HillSlope)) and IC$_{50}$ values were calculated.

Table 1 summarizes the inhibitory effects of compounds on ATR kinase activity (IC$_{50}$).

Table 2 summarizes the inhibitory effects of compounds on ATR kinase activity at 50 nM (Inh %).

TABLE 1

| | Example | | | | |
|---|---|---|---|---|---|
| | 1 | 2 | 5 | 6 | 13 | 21 |
| IC$_{50}$ (nM) | >10000 | 938 | 58.9 | 379 | 4 | 6.78 |

TABLE 1-continued

| | Example | | | | | |
|---|---|---|---|---|---|---|
| | 22 | 23 | 24 | 25 | 26 | 32 |
| $IC_{50}$ (nM) | 2.06 | >1000 | 2 | 7 | 6 | 15 |

| | Example | | | | | |
|---|---|---|---|---|---|---|
| | 37 | 39 | 40 | 41 | 42 | 43 |
| $IC_{50}$ (nM) | 7 | 3 | 2 | 2 | 2 | 12 |

| | Example | | | | | |
|---|---|---|---|---|---|---|
| | 45 | 46 | 47 | 48 | 49 | 50 |
| $IC_{50}$ (nM) | 5 | 12 | 1 | 11 | 6 | 16 |

| | Example | |
|---|---|---|
| | 52 | BAY-1895344 |
| $IC_{50}$ (nM) | 9 | 42* |

*This $IC_{50}$ value is obtained by comparing with the compound of Example 13.

TABLE 2

| | Example | | | | | |
|---|---|---|---|---|---|---|
| | 11 | 33 | 35 | 36 | 38 | 44 |
| Inh % | 63 | 27 | 71 | 63 | 90 | 58 |

Therefore, as determined by the ATR enzyme activity experiment, (R)-3-methyl-4-(4-(1-methyl-1H-pyrazol-5-yl)-7-(1H-pyrazol-5-yl)imidazo[1,5-b]pyridazin-2-yl)morpholine (Example 13) and the analogues have a good inhibitory effect on ATR kinase activity.

Example 65

Determination of the Inhibitory Effect of (R)-3-methyl-4-(8-(1-methyl-1H-pyrazol-5-yl)-3-(1H-pyrazol-5-yl)imidazo[1,2-b]pyridazin-6-yl)morpholine And its Analogues on the Proliferation of Human Prostate Cancer Cell DU145 Using MTT Assay The thawed human prostate cancer cells DU145 were cultured and passaged until they grew well and had a confluence about 90%, and then they were used for experiments. The cells were digested by trypsinase and centrifuged at 800 rpm for 5 minutes, the supernatant was discarded, and the residual was resuspended with fresh medium (DMEM medium+10% FBS+non-essential amino acid) and counted. The cells were seeded into 96-well cell culture plate with a density of 2000 cells per well and incubated overnight in a 5% $CO_2$ incubator at 37° C. The stock solutions of the test substances (including the test compounds and the reference compound BAY-1895344) were serially diluted to 8 concentrations by DMSO at the ratios of 1:3 and 1:10, respectively. 5 μL of each concentration was added to 120 μL of medium (25 times diluted) and mixed by shaking. The overnight cell plates were taken and the culture medium was removed, 195 μL of fresh medium was added to each well, and 5 μL of diluted medium containing the corresponding concentration of the test compound was added respectively (the final concentrations of compounds are shown in Table 3, the final concentration of DMSO is 1%), and the culture plate was then placed in a 5% $CO_2$ incubator at 37° C. for 4 days. After removing the original solution, 100 μL of fresh serum-free DMEM medium containing MTT (0.5 mg/mL) was added to each well, the culture was continued. After 4 hours, the original solution was removed, 100 μL of DMSO was added to each well, the 96-well plates were shaken for 10 minutes in the dark and placed in a multi-function reader to read the absorbance at the wavelength of 552/690 nm. GraphPad Prism 6.0 was used to analyze the data. The inhibitory activity of compounds on cell proliferation was plotted based on cell viability and the logarithm of compound concentration. Cell viability %=($OD_{compound}$−$OD_{background}$)/($OD_{DMSO}$−$OD_{background}$)×100. The $IC_{50}$ value was fitted by a sigmoidal dose response curve equation Y=100/(1+10^(Log C−Log $IC_{50}$)), wherein C was the concentration of compound.

Table 2 summarizes the inhibitory effects of compounds on the proliferation of human prostate cancer cell DU145.

TABLE 3

| | Example | | | | | | | |
|---|---|---|---|---|---|---|---|---|
| | 2 | 3 | 4 | 6 | 7 | 8 | 9 | 10 |
| $IC_{50}$ (nM) | 1217 | 1097 | 1093 | 913.7 | 1196 | 1108 | 1631 | 2298 |

| | Example | | |
|---|---|---|---|
| | 13 | 16 | BAY-1895344 |
| $IC_{50}$ (nM) | 130.9 | 1374 | 33.92* |

*This $IC_{50}$ value is obtained by comparing with the compound of Example 13.

Therefore, as determined by MTT assay, (R)-3-methyl-4-(8-(1-methyl-1H-pyrazol-5-yl)-3-(1H-pyrazol-5-yl)imidazo[1,2-b]pyridazin-6-yl)morpholine (Example 2) has a inhibitory effect on the proliferation of DU145 cell. (R)-3-methyl-4-(4-(1-methyl-1H-pyrazol-5-yl)-7-(1H-pyrazol-5-yl)imidazo[1,5-b]pyridazin-2-yl)morpholine (Example 13) has a good inhibitory effect on the proliferation of DU145 cell.

Example 66

Determination of the Inhibitory Effect of (R)-3-methyl-4-(8-(1-methyl-1H-pyrazol-5-yl)-3-(1H-pyrazol-5-yl)imidazo[1,2-b]pyridazin-6-yl)morpholine And its Analogues on the Proliferation of Human Lung Cancer Cell NCI-H460 Using MTT Assay The thawed human lung cancer cells NCI-H460 were cultured and passaged until they grew well and had a confluence about 90%, and then they were used for experiments. The cells were digested by trypsinase and centrifuged at 800 rpm for 5 minutes, the supernatant was discarded, and the residual was resuspended with fresh medium (1640 medium+10% FBS) and counted. The cells were seeded into 96-well cell culture plate with a density of 2000/4000 cells per well and incubated overnight in a 5% $CO_2$ incubator at 37° C. The stock solutions of the test substances (including the test compounds and the reference compound BAY-1895344) were serially diluted to 8 concentrations by DMSO at the ratios of 1:3 and 1:10, respectively. 5 L diluent of each concentration was added to 120 μL of medium (25 times diluted) and mixed by shaking. The overnight cell plates were taken and the culture medium was removed, 195 μL of fresh medium was added to each well, and 5 μL of diluted medium containing the corresponding concentration of the test compound was added respectively (the final concentration of DMSO is 1%), and the culture plate was then placed in a 5% $CO_2$ incubator at 37° C. for 4 days. After removing the original solution, 100 μL of fresh serum-free DMEM medium containing MTT (0.5 mg/mL) was added to each well, the culture was continued. After 4 hours, the original solution was removed, 100 μL of DMSO was added to each well, the 96-well plates were shaken for 10 minutes in the dark and placed in a multi-function reader to read the absorbance at the wavelength of 552/690 nm. Cell viability (%)=($OD_{compound}$−$OD_{background}$)/($OD_{DMSO}$−$OD_{background}$)×100. GraphPad Prism 6.0 was used to analyze the data. The inhibitory activity of compounds on cell proliferation was plotted based on cell viability and the logarithm of compound concentration. The $IC_{50}$ value was fitted by a sigmoidal dose response curve equation Y=100/(1+10^(Log C−Log $IC_{50}$)), wherein C was the concentration of compound.

Table 3 summarizes the inhibitory effect data ($IC_{50}$) of compounds on the proliferation of human lung cancer cell NCI-H460.

Example 67

Determination of the Inhibitory Effect of (R)-3-methyl-4-(8-(1-methyl-1H-pyrazol-5-yl)-3-(1H-pyrazol-5-yl)imidazo[1,2-b]pyridazin-6-yl)morpholine And its Analogues on the Proliferation of Human Colon Cancer Cell LoVo Using MTT Assay The thawed human colon cancer cells LoVo were cultured and passaged until they grew well and had a confluence about 90%, and then they were used for experiments. The cells were digested by trypsinase and centrifuged at 800 rpm for 5 minutes, the supernatant was discarded, and the residual was resuspended with fresh medium (1640 medium+10% FBS) and counted. The cells were seeded into 96-well cell culture plate with a density of 2000/4000 cells per well and incubated overnight in a 5% $CO_2$ incubator at 37° C. The stock solutions of the test substances (including the test compounds and the reference compound BAY-1895344) were serially diluted to 8 concentrations by DMSO at the ratios of 1:3 and 1:10, respectively. 5 μL diluent of each concentration was added to 120 μL of medium (25 times diluted) and mixed by shaking. The overnight cell plates were taken and the culture medium was removed, 195 μL of fresh medium was added to each well,

TABLE 4

| | Example | | | | | | | |
|---|---|---|---|---|---|---|---|---|
| | 2 | 3 | 4 | 5 | 6 | 7 | 8 | 9 |
| IC50 (nM) | 907.2 | 1038 | 531.0 | 1607 | 321.9 | 863.5 | 409.4 | 582.8 |
| | Example | | | | | | | |
| | 10 | 11 | 12 | 13 | 15 | 16 | 21 | 22 |
| IC50 (nM) | 1114 | 158.8 | >10000 | 41.33 | 1916 | 526.8 | 243.8 | 1149 |
| | Example | | | | | | | |
| | 23 | 24 | 25 | 26 | 27 | 32 | 33 | 34 |
| IC50 (nM) | 1801 | 27.84 | 40.36 | 55.24 | 286.7 | 78.58 | 255.9 | 1522 |
| | Example | | | | | | | |
| | 35 | 36 | 37 | 38 | 39 | 40 | 41 | 42 |
| IC50 (nM) | 170.7 | 115.9 | 58.76 | 418.7 | 26.05 | 17.35 | 48.75 | 30.63 |
| | Example | | | | | | | |
| | 43 | 44 | 45 | 46 | 47 | 48 | 49 | 50 |
| IC50 (nM) | 18.19 | 289.1 | 78.80 | 77.81 | 18.18 | 155.7 | 43.02 | 86.82 |
| | Example | | | | | | | |
| | 51 | 52 | 55 | | 61 | | BAY-1895344 | |
| IC50 (nM) | 76.33 | 26.34 | 95.31 | | 169.1 | | 21.47* | |

*This $IC_{50}$ value is obtained by comparing with the compound of Example 13.

Therefore, as determined by MTT assay, (R)-3-methyl-4-(8-(1-methyl-1H-pyrazol-5-yl)-3-(1H-pyrazol-5-yl)imidazo[1,2-b]pyridazin-6-yl)morpholine (Example 2) has a inhibitory effect on the proliferation of NCI-H460 cell. (R)-3-methyl-4-(4-(1-methyl-1H-pyrazol-5-yl)-7-(1H-pyrazol-5-yl)imidazo[1,5-b]pyridazin-2-yl)morpholine (Example 13) and the analogues have a good inhibitory effect on the proliferation of NCI-H460 cell.

and 5 μL of diluted medium containing the corresponding concentration of the test compound was added respectively (the final concentration of DMSO is 1%), and the culture plate was then placed in a 5% $CO_2$ incubator at 37° C. for 4 days. After removing the original solution, 100 μL of fresh serum-free DMEM medium containing MTT (0.5 mg/mL) was added to each well, the culture was continued. After 4 hours, the original solution was removed, 100 μL of DMSO was added to each well, the 96-well plates were shaken for 10 minutes in the dark and placed in a multi-function reader to read the absorbance at the wavelength of 552/690 nm. Cell viability (%)=(OD$_{compound}$–OD$_{background}$)/(OD$_{DMSO}$–OD$_{background}$)×100. GraphPad Prism 6.0 was used to analyze the data. The inhibitory activity of compounds on cell proliferation was plotted based on cell viability and the logarithm of compound concentration. The IC$_{50}$ value was fitted by a sigmoidal dose response curve equation Y=100/(1+10^(Log C–Log IC$_{50}$)), wherein C was the concentration of compound.

Table 5 summarizes the inhibitory effect data (IC$_{50}$) of compounds on the proliferation of human colon cancer cell LoVo.

TABLE 5

| | \multicolumn{7}{c}{Example} |
|---|---|---|---|---|---|---|---|
| | 5 | 11 | 12 | 13 | 15 | 21 | 22 | 23 |
| IC$_{50}$ (nM) | 557.2 | 167.7 | 3226 | 53.5 | 597.3 | 155.1 | 854.3 | 1528 |

| | \multicolumn{7}{c}{Example} |
|---|---|---|---|---|---|---|---|
| | 24 | 25 | 26 | 27 | 32 | 33 | 34 | 35 |
| IC$_{50}$ (nM) | 34.39 | 61.92 | 68.20 | 124.0 | 87.31 | 230.3 | 953.3 | 75.39 |

| | \multicolumn{7}{c}{Example} |
|---|---|---|---|---|---|---|---|
| | 36 | 37 | 38 | 39 | 40 | 41 | 42 | 43 |
| IC$_{50}$ (nM) | 114.0 | 45.02 | 127.9 | 30.74 | 21.83 | 49.52 | 44.69 | 23.12 |

| | \multicolumn{7}{c}{Example} |
|---|---|---|---|---|---|---|---|
| | 44 | 45 | 46 | 47 | 48 | 49 | 50 | 51 |
| IC$_{50}$ (nM) | 138.2 | 84.15 | 72.80 | 20.73 | 133.4 | 32.94 | 59.87 | 76.66 |

| | \multicolumn{4}{c}{Example} | |
|---|---|---|---|---|
| | 52 | 55 | 61 | BAY-1895344 |
| IC$_{50}$ (nM) | 41.87 | 51.02 | 175.3 | 26.02 |

*This IC$_{50}$ value is obtained by comparing with the compound of Example 13.

Therefore, as determined by MTT assay, (R)-3-methyl-4-(8-(1-methyl-1H-pyrazol-5-yl)-3-(1H-pyrazol-5-yl)imidazo[1,2-b]pyridazin-6-yl)morpholine (Example 2) has a inhibitory effect on the proliferation of LoVo cell. (R)-3-methyl-4-(4-(1-methyl-1H-pyrazol-5-yl)-7-(1H-pyrazol-5-yl)imidazo[1,5-b]pyridazin-2-yl)morpholine (Example 13) and the analogues have a good inhibitory effect on the proliferation of LoVo cell.

Having now fully described this disclosure, it will be understood by those of ordinary skill in the art that the same can be performed within a wide and equivalent range of conditions, formulations and other parameters without affecting the scope of the disclosure or any embodiment thereof. All patents, patent applications and publications cited herein are fully incorporated by reference herein in their entirety.

What is claimed is:

1. A compound of Formula IV:

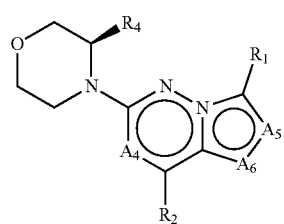

IV or a stereoisomer, a tautomer, a hydrate, a solvate or a pharmaceutically acceptable salt thereof, or a mixture thereof, wherein:

the penta-fused hexa-heteroaryl containing A$_4$, A$_5$ and A$_6$ is:

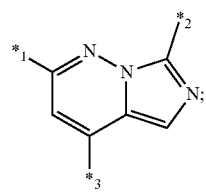

R$_1$ is a C$_6$-C$_{14}$ aryl, a saturated or partially saturated 3-7 membered monocyclic or 7-10 membered bicyclic group, a C$_3$-C$_8$ cycloalkyl, or a heteroaryl having 5 to 14 ring atoms, wherein R$_1$ is optionally substituted by 1-3 substituents selected from the group consisting of C$_1$-C$_4$ alkyl, halogen, hydroxyl, C$_1$-C$_4$ alkoxy and amino;

R$_2$ is a C$_3$-C$_6$ cycloalkyl, a C$_6$-C$_{14}$ aryl, a saturated or partially saturated 3-7 membered monocyclic or 7-10 membered bicyclic group, or a heteroaryl having 5 to 14 ring atoms, wherein R$_2$ is optionally substituted by 1-3 substituents selected from the group consisting of C$_1$-C$_6$ alkyl optionally substituted by 1 to 4 halogens, cyano, hydroxy, carboxyl, amino, halogen, C$_1$-C$_4$ alkylsulfinyl and C$_1$-C$_4$ alkylsulfonyl; and R$_4$ is hydrogen or C$_1$-C$_4$ alkyl.

2. The compound of claim 1, wherein

R$_1$ is pyrazolyl, pyrrolyl, or imidazolyl optionally substituted with 1 or 2 substituents selected from the group consisting of C$_1$-C$_4$ alkyl, halogen, hydroxyl, C$_1$-C$_4$ alkoxy and amino; and/or R$_2$ is an optionally substituted cyclopropyl, an optionally substituted phenyl, an optionally substituted pyrazolyl, an optionally substituted pyrrolyl, an optionally substituted imidazolyl, an optionally substituted triazolyl, an optionally substituted furanyl, an optionally substituted pyridyl, an optionally substituted pyrimidinyl, an optionally substituted morpholinyl, an optionally substituted dihydropyranyl, an optionally substituted tetrahydropyranyl, or an optionally substituted pyrrolopyridyl; wherein the substituent on R$_2$ is selected from the group consisting of optionally substituted C$_1$-C$_6$ alkyl, cyano, hydroxy, carboxyl, amino, halogen, optionally substituted alkylsulfinyl and optionally substituted alkylsulfonyl.

3. The compound of claim 1, or a stereoisomer, a tautomer, a hydrate, a solvate or a pharmaceutically acceptable salt thereof, or a mixture thereof, wherein R$_1$ is a 5- or 6-membered heteroaryl containing at least one nitrogen atom, optionally substituted by 1-3 substituents selected from the group consisting of C$_1$-C$_4$ alkyl, halogen, hydroxyl, C$_1$-C$_4$ alkoxy and amino.

4. The compound of claim 1, or a stereoisomer, a tautomer, a hydrate, a solvate or a pharmaceutically acceptable salt thereof, or a mixture thereof, wherein R$_1$ is unsubstituted pyrazolyl, unsubstituted pyrrolyl, or unsubstituted imidazolyl, or is pyrazolyl, pyrrolyl, or imidazolyl substituted with 1 or 2 substituents selected from a group consisting of C$_1$-C$_4$ alkyl, halogen, hydroxyl, C$_1$-C$_4$ alkoxy and amino.

5. The compound of claim 1, or a stereoisomer, a tautomer, a hydrate, a solvate or a pharmaceutically acceptable salt thereof, or a mixture thereof, wherein R$_2$ is a 5- or 6-membered heteroaryl containing at least one nitrogen atom, optionally substituted by 1-3 substituents selected from a group consisting of C$_1$-C$_6$ alkyl optionally substituted by 1 to 4 halogens, cyano, hydroxy, carboxyl, amino, halogen, C$_1$-C$_4$ alkylsulfinyl and C$_1$-C$_4$ alkylsulfonyl.

6. The compound of claim 1, or a stereoisomer, a tautomer, a hydrate, a solvate or a pharmaceutically acceptable salt thereof, or a mixture thereof, wherein R$_2$ is cyclopropyl, phenyl, pyrazolyl, pyrrolyl, imidazolyl, triazolyl, furanyl, pyridyl, pyrimidinyl, morpholinyl, dihydropyranyl, tetrahydropyranyl or pyrrolopyridyl optionally substituted by 1-3 substituents selected from a group consisting of C$_1$-C$_6$ alkyl optionally substituted by 1 to 4 halogens, cyano, hydroxy, carboxyl, amino, halogen, C$_1$-C$_4$ alkylsulfinyl and C$_1$-C$_4$ alkylsulfonyl.

7. The compound of claim 1, or a stereoisomer, a tautomer, a hydrate, a solvate or a pharmaceutically acceptable salt thereof, or a mixture thereof, wherein:

R$_1$ is pyrazolyl, pyrrolyl or imidazolyl optionally substituted with 1-2 C$_1$-C$_4$ alkyl;

R$_2$ is pyrazolyl, pyrrolyl, pyridinyl, pyrrolopyridinyl, pyrimidinyl, triazolyl or imidazolyl optionally substituted by one or two substituents selected from the group consisting of halogen, C$_1$-C$_4$ alkylsulfonyl, C$_1$-C$_4$ alkylsulfinyl, C$_1$-C$_4$ alkyl optionally substituted by one to three halogen atoms; phenyl optionally substituted with 1-2 substituents selected from the group consisting of C$_1$-C$_4$ alkyl, —CN, C$_1$-C$_4$ alkylsulfonyl and halogen; or morpholinyl, dihydropyranyl or tetrahydropyranyl optionally substituted by one or two C$_1$-C$_4$ alkyl; and R$_4$ is hydrogen or C$_1$-C$_4$ alkyl.

8. The compound of claim 1 or a stereoisomer, a tautomer, a hydrate, a solvate or a pharmaceutically acceptable salt thereof, or a mixture thereof, wherein:

R$_1$ is pyrazolyl optionally substituted by a C$_1$-C$_3$ alkyl;

R$_2$ is pyrazolyl optionally substituted by one or two substituents selected from the group consisting of unsubstituted C$_1$-C$_4$ alkyl and C$_1$-C$_4$ alkyl substituted by one to three halogen atoms; and R$_4$ is C$_1$-C$_4$ alkyl.

9. The compound of claim 1, or a stereoisomer, a tautomer, a hydrate, a solvate or a pharmaceutically acceptable salt thereof, or a mixture thereof, wherein R$_4$ is methyl.

10. The compound of claim 1, or a stereoisomer, a tautomer, a hydrate, a solvate or a pharmaceutically acceptable salt thereof, or a mixture thereof, wherein R$_2$ is a pyrazolyl optionally substituted with a C$_1$-C$_6$ alkyl optionally substituted by 1-4 halogen.

11. The compound of claim 10, or a stereoisomer, a tautomer, a hydrate, a solvate or a pharmaceutically acceptable salt thereof, or a mixture thereof, wherein one or two ring N atoms of the pyrazolyl are substituted.

12. The compound of claim 1, wherein the compound is selected from the group consisting of:

4-(4-(1-methyl-1H-pyrazol-5-yl)-7-(1H-pyrazol-5-yl)imidazo[1,5-b]pyridazin-2-yl)morpholine;

(R)-3-methyl-4-(4-(1-methyl-1H-pyrazol-5-yl)-7-(1H-pyrazol-5-yl)imidazo[1,5-b]pyridazin-2-yl)morpholine;

(R)-3-methyl-4-(4-(1-methyl-1H-pyrazol-5-yl)-7-(1H-pyrrol-3-yl)imidazo[1,5-b]pyridazin-2-yl)morpholine;

(R)-3-methyl-4-(4-(1-methyl-1H-pyrazol-5-yl)-7-(1H-pyrrol-2-yl)imidazo[1,5-b]pyridazin-2-yl)morpholine;

(R)-4-(7-(1H-imidazol-4-yl)-4-(1-methyl-1H-pyrazol-5-yl)imidazo[1,5-b]pyridazin-2-yl)-3-methylmorpholine;

(R)-3-methyl-4-(4-(6-methylpyridin-3-yl)-7-(1H-pyrazol-5-yl)imidazo[1,5-b]pyridazin-2-yl)morpholine;

(R)-4-(4-(2-fluorophenyl)-7-(1H-pyrazol-5-yl)imidazo[1,5-b]pyridazin-2-yl)-3-methylmorpholine;

(R)-4-(4-(1-isopropyl-1H-pyrazol-5-yl)-7-(1H-pyrazol-5-yl)imidazo[1,5-b]pyridazin-2-yl)-3-methylmorpholine;

(R)-4-(4,7-di(1H-pyrazol-5-yl)imidazol[1,5-b]pyridazin-2-yl)-3-methylmorpholine;

(R)-4-(4-cyclopropyl-7-(1H-pyrazol-5-yl)imidazo[1,5-b]pyridazin-2-yl)-3-methylmorpholine;

(S)-3-methyl-4-(4-(1-methyl-1H-pyrazol-5-yl)-7-(1H-pyrazol-5-yl)imidazo[1,5-b]pyridazin-2-yl)morpholine;

(R)-3-methyl-4-(4-(4-(methylsulfonyl)phenyl)-7-(1H-pyrazol-5-yl)imidazo[1,5-b]pyridazin-2-yl)morpholine;

(R)-4-(4-(2,5-dimethyl-1H-pyrrol-1-yl)-7-(1H-pyrazol-5-yl)imidazo[1,5-b]pyridazin-2-yl)-3-methylmorpholine;

(R)-4-(4-(1-ethyl-1H-pyrazol-5-yl)-7-(1H-pyrazol-5-yl)imidazo[1,5-b]pyridazin-2-yl)-3-methylmorpholine;

(R)-3-methyl-4-(4-(3-methyl-1H-pyrazol-4-yl)-7-(1H-pyrazol-5-yl)imidazo[1,5-b]pyridazin-2-yl)morpholine;

(R)-3-methyl-4-(7-(3-methyl-1H-pyrazol-5-yl)-4-(6-methylpyridin-3-yl)imidazo[1,5-b]pyridazin-2-yl)morpholine;
(R)-4-(7-(1H-pyrazol-5-yl)-4-(o-tolyl)imidazo[1,5-b]pyridazin-2-yl)-3-methylmorpholine;
(R)-4-(4-(1,4-dimethyl-1H-pyrazol-5-yl)-7-(1H-pyrazol-5-yl)imidazo[1,5-b]pyridazin-2-yl)-3-methylmorpholine;
(R)-3-methyl-4-(4-(2-methylpyridin-3-yl)-7-(1H-pyrazol-5-yl)imidazo[1,5-b]pyridazin-2-yl)morpholine;
(R)-4-(4-(3-fluoropyridin-4-yl)-7-(1H-pyrazol-5-yl)imidazo[1,5-b]pyridazin-2-yl)-3-methylmorpholine;
(R)-3-methyl-4-(4-(4-methyl-6-(methylsulfonyl)pyridin-3-yl)-7-(1H-pyrazol-5-yl)imidazo[1,5-b]pyridazin-2-yl)morpholine;
(R)-3-methyl-4-(4-(4-methylpyrimidin-5-yl)-7-(1H-pyrazol-5-yl)imidazo[1,5-b]pyridazin-2-yl)morpholine;
(R)-3-methyl-4-(4-morpholino-7-(1H-pyrazol-5-yl)imidazo[1,5-b]pyridazin-2-yl)morpholine;
(R)-4-(7-(1H-pyrazol-5-yl)-4-(2-(trifluoromethyl)pyridin-3-yl)imidazo[1,5-b]pyridazin-2-yl)-3-methylmorpholine;
(R)-3-methyl-4-(4-(2-methyl-6-(methylsulfonyl)pyridin-3-yl)-7-(1H-pyrazol-5-yl)imidazo[1,5-b]pyridazin-2-yl)morpholine;
(R)-3-methyl-4-(4-(2-methyl-4-(methylsulfonyl)phenyl)-7-(1H-pyrazol-5-yl)imidazo[1,5-b]pyridazin-2-yl)morpholine;
(3R)-3-methyl-4-(4-(2-methyl-6-(methylsulfinyl)pyridin-3-yl)-7-(1H-pyrazol-5-yl)imidazo[1,5-b]pyridazin-2-yl)morpholine;
(R)-3-methyl-4-(4-(3-methylpyridin-4-yl)-7-(1H-pyrazol-5-yl)imidazo[1,5-b]pyridazin-2-yl)morpholine;
(R)-3-(2-(3-methylmorpholino)-7-(1H-pyrazol-5-yl)imidazo[1,5-b]pyridazin-4-yl)benzonitrile;
(R)-4-(4-(3,6-dihydro-2H-pyran-4-yl)-7-(1H-pyrazol-5-yl)imidazo[1,5-b]pyridazin-2-yl)-3-methylmorpholine;
(R)-4-(7-(1H-pyrazol-5-yl)-4-(tetrahydro-2H-pyran-4-yl)imidazo[1,5-b]pyridazin-2-yl)-3-methylmorpholine;
(R)-4-(7-(1H-pyrazol-5-yl)-4-(1H-pyrrolo[2,3-b]pyridin-4-yl)imidazo[1,5-b]pyridazin-2-yl)-3-methylmorpholine;
(R)-4-(4-(1,5-dimethyl-1H-pyrazol-4-yl)-7-(1H-pyrazol-5-yl)imidazo[1,5-b]pyridazin-2-yl)-3-methylmorpholine;
(R)-3-methyl-4-(4-(1-methyl-1H-imidazol-5-yl)-7-(1H-pyrazol-5-yl)imidazo[1,5-b]pyridazin-2-yl)morpholine;
(R)-4-(4-(1,3-dimethyl-1H-pyrazol-4-yl)-7-(1H-pyrazol-5-yl)imidazo[1,5-b]pyridazin-2-yl)-3-methylmorpholine;
(R)-4-(4-(1,5-dimethyl-1H-1,2,3-triazol-4-yl)-7-(1H-pyrazol-5-yl)imidazo[1,5-b]pyridazin-2-yl)-3-methylmorpholine;
(R)-4-(4-(1-(2-fluoroethyl)-1H-pyrazol-5-yl)-7-(1H-pyrazol-5-yl)imidazo[1,5-b]pyridazin-2-yl)-3-methylmorpholine;
(R)-4-(4-(1-(2-fluoroethyl)-1H-pyrazol-3-yl)-7-(1H-pyrazol-5-yl)imidazo[1,5-b]pyridazin-2-yl)-3-methylmorpholine;
(R)-4-(4-(1-(difluoromethyl)-1H-pyrazol-5-yl)-7-(1H-pyrazol-5-yl)imidazo[1,5-b]pyridazin-2-yl)-3-methylmorpholine; and
(R)-4-(4-(1-(difluoromethyl)-1H-pyrazol-3-yl)-7-(1H-pyrazol-5-yl)imidazo[1,5-b]pyridazin-2-yl)-3-methylmorpholine;

or a stereoisomer, a tautomer, a hydrate, a solvate or a pharmaceutically acceptable salt thereof, or a mixture thereof.

13. A pharmaceutical composition comprising the compound of Formula IV of claim 1 and a pharmaceutically acceptable carrier, optionally, the composition further includes at least one known anticancer drug or pharmaceutically acceptable salts thereof.

14. The pharmaceutical composition of claim 13, wherein the at least one known anticancer drug is selected from the group consisting of: busulfan, melphalan, chlorambucil, cyclophosphamide, ifosfamide, temozolomide, bendamustine, cis-platin, mitomycin C, bleomycin, carboplatin, camptothecin, irinotecan, topotecan, doxorubicin, epirubicin, aclarubicin, mitoxantrone, methylhydroxy ellipticine, etoposide, 5-azacytidine, gemcitabine, 5-fluorouracil, capecitabine, methotrexate, 5-fluoro-2'-deoxy-uridine, fludarabine, nelarabine, ara-C, pralatrexate, pemetrexed, hydroxyurea, thioguanine, colchicine, vinblastine, vincristine, vinorelbine, paclitaxel, ixabepilone, cabazitaxel, docetaxel, mAb, panitumumab, necitumumab, nivolumab, pembrolizumab, ramucirumab, bevacizumab, pertuzumab, trastuzumab, cetuximab, obinutuzumab, ofatumumab, rituximab, alemtuzumab, ibritumomab, tositumomab, brentuximab, daratumumab, elotuzumab, T-DM1, Ofatumumab, Dinutuximab, Blinatumomab, ipilimumab, avastin, herceptin, mabthera, imatinib, gefitinib, erlotinib, osimertinib, afatinib, ceritinib, alectinib, crizotinib, erlotinib, lapatinib, sorafenib, sunitinib, nilotinib, dasatinib, pazopanib, torisel, everolimus, vorinostat, romidepsin, panobinostat, belinostat, tamoxifen, letrozole, fulvestrant, mitoguazone, octreotide, retinoic acid, arsenic trioxide, zoledronic acid, bortezomib, carfilzomib, Ixazomib, vismodegib, sonidegib, denosumab, thalidomide, lenalidomide, Venetoclax, Aldesleukin (recombinant human interleukin-2), sipueucel-T (prostate cancer therapeutic vaccine), palbociclib, olaparib, niraparib, rucaparib, talazoparib and senaparib.

15. The pharmaceutical composition of claim 13, wherein the compound is selected from the group consisting of:
4-(4-(1-methyl-1H-pyrazol-5-yl)-7-(1H-pyrazol-5-yl)imidazo[1,5-b]pyridazin-2-yl)morpholine;
(R)-3-methyl-4-(4-(1-methyl-1H-pyrazol-5-yl)-7-(1H-pyrazol-5-yl)imidazo[1,5-b]pyridazin-2-yl)morpholine;
(R)-3-methyl-4-(4-(1-methyl-1H-pyrazol-5-yl)-7-(1H-pyrrol-3-yl)imidazo[1,5-b]pyridazin-2-yl)morpholine;
(R)-3-methyl-4-(4-(1-methyl-1H-pyrazol-5-yl)-7-(1H-pyrrol-2-yl)imidazo[1,5-b]pyridazin-2-yl)morpholine;
(R)-4-(7-(1H-imidazol-4-yl)-4-(1-methyl-1H-pyrazol-5-yl)imidazo[1,5-b]pyridazin-2-yl)-3-methylmorpholine;
(R)-3-methyl-4-(4-(6-methylpyridin-3-yl)-7-(1H-pyrazol-5-yl)imidazo[1,5-b]pyridazin-2-yl)morpholine;
(R)-4-(4-(2-fluorophenyl)-7-(1H-pyrazol-5-yl)imidazo[1,5-b]pyridazin-2-yl)-3-methylmorpholine;
(R)-4-(4-(1-isopropyl-1H-pyrazol-5-yl)-7-(1H-pyrazol-5-yl)imidazo[1,5-b]pyridazin-2-yl)-3-methylmorpholine;
(R)-4-(4,7-di(1H-pyrazol-5-yl)imidazol[1,5-b]pyridazin-2-yl)-3-methylmorpholine;
(R)-4-(4-cyclopropyl-7-(1H-pyrazol-5-yl)imidazo[1,5-b]pyridazin-2-yl)-3-methylmorpholine;
(S)-3-methyl-4-(4-(1-methyl-1H-pyrazol-5-yl)-7-(1H-pyrazol-5-yl)imidazo[1,5-b]pyridazin-2-yl)morpholine;
(R)-3-methyl-4-(4-(4-(methylsulfonyl)phenyl)-7-(1H-pyrazol-5-yl)imidazo[1,5-b]pyridazin-2-yl)morpholine;

(R)-4-(4-(2,5-dimethyl-1H-pyrrol-1-yl)-7-(1H-pyrazol-5-yl)imidazo[1,5-b]pyridazin-2-yl)-3-methylmorpholine;
(R)-4-(4-(1-ethyl-1H-pyrazol-5-yl)-7-(1H-pyrazol-5-yl)imidazo[1,5-b]pyridazin-2-yl)-3-methylmorpholine;
(R)-3-methyl-4-(4-(3-methyl-1H-pyrazol-4-yl)-7-(1H-pyrazol-5-yl)imidazo[1,5-b]pyridazin-2-yl)morpholine;
(R)-3-methyl-4-(7-(3-methyl-1H-pyrazol-5-yl)-4-(6-methylpyridin-3-yl)imidazo[1,5-b]pyridazin-2-yl)morpholine;
(R)-4-(7-(1H-pyrazol-5-yl)-4-(o-tolyl)imidazo[1,5-b]pyridazin-2-yl)-3-methylmorpholine;
(R)-4-(4-(1,4-dimethyl-1H-pyrazol-5-yl)-7-(1H-pyrazol-5-yl)imidazo[1,5-b]pyridazin-2-yl)-3-methylmorpholine;
(R)-3-methyl-4-(4-(2-methylpyridin-3-yl)-7-(1H-pyrazol-5-yl)imidazo[1,5-b]pyridazin-2-yl)morpholine;
(R)-4-(4-(3-fluoropyridin-4-yl)-7-(1H-pyrazol-5-yl)imidazo[1,5-b]pyridazin-2-yl)-3-methylmorpholine;
(R)-3-methyl-4-(4-(4-methyl-6-(methylsulfonyl)pyridin-3-yl)-7-(1H-pyrazol-5-yl)imidazo[1,5-b]pyridazin-2-yl)morpholine;
(R)-3-methyl-4-(4-(4-methylpyrimidin-5-yl)-7-(1H-pyrazol-5-yl)imidazo[1,5-b]pyridazin-2-yl)morpholine;
(R)-3-methyl-4-(4-morpholino-7-(1H-pyrazol-5-yl)imidazo[1,5-b]pyridazin-2-yl)morpholine;
(R)-4-(7-(1H-pyrazol-5-yl)-4-(2-(trifluoromethyl)pyridin-3-yl)imidazo[1,5-b]pyridazin-2-yl)-3-methylmorpholine;
(R)-3-methyl-4-(4-(2-methyl-6-(methylsulfonyl)pyridin-3-yl)-7-(1H-pyrazol-5-yl)imidazo[1,5-b]pyridazin-2-yl)morpholine;
(R)-3-methyl-4-(4-(2-methyl-4-(methylsulfonyl)phenyl)-7-(1H-pyrazol-5-yl)imidazo[1,5-b]pyridazin-2-yl)morpholine;
(3R)-3-methyl-4-(4-(2-methyl-6-(methylsulfinyl)pyridin-3-yl)-7-(1H-pyrazol-5-yl)imidazo[1,5-b]pyridazin-2-yl)morpholine;
(R)-3-methyl-4-(4-(3-methylpyridin-4-yl)-7-(1H-pyrazol-5-yl)imidazo[1,5-b]pyridazin-2-yl)morpholine;
(R)-3-(2-(3-methylmorpholino)-7-(1H-pyrazol-5-yl)imidazo[1,5-b]pyridazin-4-yl)benzonitrile;
(R)-4-(4-(3,6-dihydro-2H-pyran-4-yl)-7-(1H-pyrazol-5-yl)imidazo[1,5-b]pyridazin-2-yl)-3-methylmorpholine;
(R)-4-(7-(1H-pyrazol-5-yl)-4-(tetrahydro-2H-pyran-4-yl)imidazo[1,5-b]pyridazin-2-yl)-3-methylmorpholine;
(R)-4-(7-(1H-pyrazol-5-yl)-4-(1H-pyrrolo[2,3-b]pyridin-4-yl)imidazo[1,5-b]pyridazin-2-yl)-3-methylmorpholine;
(R)-4-(4-(1,5-dimethyl-1H-pyrazol-4-yl)-7-(1H-pyrazol-5-yl)imidazo[1,5-b]pyridazin-2-yl)-3-methylmorpholine;
(R)-3-methyl-4-(4-(1-methyl-1H-imidazol-5-yl)-7-(1H-pyrazol-5-yl)imidazo[1,5-b]pyridazin-2-yl)morpholine;
(R)-4-(4-(1,3-dimethyl-1H-pyrazol-4-yl)-7-(1H-pyrazol-5-yl)imidazo[1,5-b]pyridazin-2-yl)-3-methylmorpholine;
(R)-4-(4-(1,5-dimethyl-1H-1,2,3-triazol-4-yl)-7-(1H-pyrazol-5-yl)imidazo[1,5-b]pyridazin-2-yl)-3-methylmorpholine;
(R)-4-(4-(1-(2-fluoroethyl)-1H-pyrazol-5-yl)-7-(1H-pyrazol-5-yl)imidazo[1,5-b]pyridazin-2-yl)-3-methylmorpholine;
(R)-4-(4-(1-(2-fluoroethyl)-1H-pyrazol-3-yl)-7-(1H-pyrazol-5-yl)imidazo[1,5-b]pyridazin-2-yl)-3-methylmorpholine;
(R)-4-(4-(1-(difluoromethyl)-1H-pyrazol-5-yl)-7-(1H-pyrazol-5-yl)imidazo[1,5-b]pyridazin-2-yl)-3-methylmorpholine; and
(R)-4-(4-(1-(difluoromethyl)-1H-pyrazol-3-yl)-7-(1H-pyrazol-5-yl)imidazo[1,5-b]pyridazin-2-yl)-3-methylmorpholine;
or a stereoisomer, a tautomer, a hydrate, a solvate or a pharmaceutically acceptable salt thereof, or a mixture thereof.

16. A method for treating an ataxia telangiectasia mutant gene Rad-3-related (ATR) kinase mediated disease which is a cancer, comprising administering a subject in need thereof a compound of Formula IV of claim 1 or a stereoisomer, a tautomer, a hydrate, a solvate or a pharmaceutically acceptable salt thereof, or a mixture thereof, or a pharmaceutical composition comprising the compound or a stereoisomer, a tautomer, a hydrate, a solvate or a pharmaceutically acceptable salt thereof, or a mixture thereof, optionally, the method further comprises administering at least one known anticancer drug or a pharmaceutically acceptable salt thereof wherein the ATR kinase mediated disease is prostate cancer, lung cancer, or colon cancer.

17. The method of claim 16, wherein
the anticancer drug is selected from the group consisting of busulfan, melphalan, chlorambucil, cyclophosphamide, ifosfamide, temozolomide, bendamustine, cisplatin, mitomycin C, bleomycin, carboplatin, camptothecin, irinotecan, topotecan, doxorubicin, epirubicin, aclarubicin, mitoxantrone, methylhydroxy ellipticine, etoposide, 5-azacytidine, gemcitabine, 5-fluorouracil, capecitabine, methotrexate, 5-fluoro-2'-deoxy-uridine, fludarabine, nelarabine, ara-C, pralatrexate, pemetrexed, hydroxyurea, thioguanine, colchicine, vinblastine, vincristine, vinorelbine, paclitaxel, ixabepilone, cabazitaxel, docetaxel, mAb, panitumumab, necitumumab, nivolumab, pembrolizumab, ramucirumab, bevacizumab, pertuzumab, trastuzumab, cetuximab, obinutuzumab, ofatumumab, rituximab, alemtuzumab, ibritumomab, tositumomab, brentuximab, daratumumab, elotuzumab, T-DM1, Ofatumumab, Dinutuximab, Blinatumomab, ipilimumab, avastin, herceptin, mabthera, imatinib, gefitinib, erlotinib, osimertinib, afatinib, ceritinib, alectinib, crizotinib, erlotinib, lapatinib, sorafenib, sunitinib, nilotinib, dasatinib, pazopanib, torisel, everolimus, vorinostat, romidepsin, panobinostat, belinostat, tamoxifen, letrozole, fulvestrant, mitoguazone, octreotide, retinoic acid, arsenic trioxide, zoledronic acid, bortezomib, carfilzomib, Ixazomib, vismodegib, sonidegib, denosumab, thalidomide, lenalidomide, Venetoclax, Aldesleukin (recombinant human interleukin-2), sipueucel-T (prostate cancer therapeutic vaccine), palbociclib, olaparib, niraparib, rucaparib, talazoparib and senaparib.

18. The method of claim 16, wherein the subjected is treated with the compound of Formula IV or a stereoisomer, a tautomer, a hydrate, a solvate or a pharmaceutically acceptable salt thereof, or a mixture thereof, or the pharmaceutical composition in combination with radiotherapy.

19. The method of claim 16, wherein the compound is selected from the group consisting of:
4-(4-(1-methyl-1H-pyrazol-5-yl)-7-(1H-pyrazol-5-yl)imidazo[1,5-b]pyridazin-2-yl)morpholine;
(R)-3-methyl-4-(4-(1-methyl-1H-pyrazol-5-yl)-7-(1H-pyrazol-5-yl)imidazo[1,5-b]pyridazin-2-yl)morpholine;

(R)-3-methyl-4-(4-(1-methyl-1H-pyrazol-5-yl)-7-(1H-pyrrol-3-yl)imidazo[1,5-b]pyridazin-2-yl)morpholine;
(R)-3-methyl-4-(4-(1-methyl-1H-pyrazol-5-yl)-7-(1H-pyrrol-2-yl)imidazo[1,5-b]pyridazin-2-yl)morpholine;
(R)-4-(7-(1H-imidazol-4-yl)-4-(1-methyl-1H-pyrazol-5-yl)imidazo[1,5-b]pyridazin-2-yl)-3-methylmorpholine;
(R)-3-methyl-4-(4-(6-methylpyridin-3-yl)-7-(1H-pyrazol-5-yl)imidazo[1,5-b]pyridazin-2-yl)morpholine;
(R)-4-(4-(2-fluorophenyl)-7-(1H-pyrazol-5-yl)imidazo[1,5-b]pyridazin-2-yl)-3-methylmorpholine;
(R)-4-(4-(1-isopropyl-1H-pyrazol-5-yl)-7-(1H-pyrazol-5-yl)imidazo[1,5-b]pyridazin-2-yl)-3-methylmorpholine;
(R)-4-(4,7-di(1H-pyrazol-5-yl)imidazol[1,5-b]pyridazin-2-yl)-3-methylmorpholine;
(R)-4-(4-cyclopropyl-7-(1H-pyrazol-5-yl)imidazo[1,5-b]pyridazin-2-yl)-3-methylmorpholine;
(S)-3-methyl-4-(4-(1-methyl-1H-pyrazol-5-yl)-7-(1H-pyrazol-5-yl)imidazo[1,5-b]pyridazin-2-yl)morpholine;
(R)-3-methyl-4-(4-(methylsulfonyl)phenyl)-7-(1H-pyrazol-5-yl)imidazo[1,5-b]pyridazin-2-yl)morpholine;
(R)-4-(4-(2,5-dimethyl-1H-pyrrol-1-yl)-7-(1H-pyrazol-5-yl)imidazo[1,5-b]pyridazin-2-yl)-3-methylmorpholine;
(R)-4-(4-(1-ethyl-1H-pyrazol-5-yl)-7-(1H-pyrazol-5-yl)imidazo[1,5-b]pyridazin-2-yl)-3-methylmorpholine;
(R)-3-methyl-4-(4-(3-methyl-1H-pyrazol-4-yl)-7-(1H-pyrazol-5-yl)imidazo[1,5-b]pyridazin-2-yl)morpholine;
(R)-3-methyl-4-(7-(3-methyl-1H-pyrazol-5-yl)-4-(6-methylpyridin-3-yl)imidazo[1,5-b]pyridazin-2-yl)morpholine;
(R)-4-(7-(1H-pyrazol-5-yl)-4-(o-tolyl)imidazo[1,5-b]pyridazin-2-yl)-3-methylmorpholine;
(R)-4-(4-(1,4-dimethyl-1H-pyrazol-5-yl)-7-(1H-pyrazol-5-yl)imidazo[1,5-b]pyridazin-2-yl)-3-methylmorpholine;
(R)-3-methyl-4-(4-(2-methylpyridin-3-yl)-7-(1H-pyrazol-5-yl)imidazo[1,5-b]pyridazin-2-yl)morpholine;
(R)-4-(4-(3-fluoropyridin-4-yl)-7-(1H-pyrazol-5-yl)imidazo[1,5-b]pyridazin-2-yl)-3-methylmorpholine;
(R)-3-methyl-4-(4-(4-methyl-6-(methylsulfonyl)pyridin-3-yl)-7-(1H-pyrazol-5-yl)imidazo[1,5-b]pyridazin-2-yl)morpholine;
(R)-3-methyl-4-(4-(4-methylpyrimidin-5-yl)-7-(1H-pyrazol-5-yl)imidazo[1,5-b]pyridazin-2-yl)morpholine;
(R)-3-methyl-4-(4-morpholino-7-(1H-pyrazol-5-yl)imidazo[1,5-b]pyridazin-2-yl)morpholine;
(R)-4-(7-(1H-pyrazol-5-yl)-4-(2-(trifluoromethyl)pyridin-3-yl)imidazo[1,5-b]pyridazin-2-yl)-3-methylmorpholine;
(R)-3-methyl-4-(4-(2-methyl-6-(methylsulfonyl)pyridin-3-yl)-7-(1H-pyrazol-5-yl)imidazo[1,5-b]pyridazin-2-yl)morpholine;
(R)-3-methyl-4-(4-(2-methyl-4-(methylsulfonyl)phenyl)-7-(1H-pyrazol-5-yl)imidazo[1,5-b]pyridazin-2-yl)morpholine;
(3R)-3-methyl-4-(4-(2-methyl-6-(methylsulfinyl)pyridin-3-yl)-7-(1H-pyrazol-5-yl)imidazo[1,5-b]pyridazin-2-yl)morpholine;
(R)-3-methyl-4-(4-(3-methylpyridin-4-yl)-7-(1H-pyrazol-5-yl)imidazo[1,5-b]pyridazin-2-yl)morpholine;
(R)-3-(2-(3-methylmorpholino)-7-(1H-pyrazol-5-yl)imidazo[1,5-b]pyridazin-4-yl)benzonitrile;
(R)-4-(4-(3,6-dihydro-2H-pyran-4-yl)-7-(1H-pyrazol-5-yl)imidazo[1,5-b]pyridazin-2-yl)-3-methylmorpholine;
(R)-4-(7-(1H-pyrazol-5-yl)-4-(tetrahydro-2H-pyran-4-yl)imidazo[1,5-b]pyridazin-2-yl)-3-methylmorpholine;
(R)-4-(7-(1H-pyrazol-5-yl)-4-(1H-pyrrolo[2,3-b]pyridin-4-yl)imidazo[1,5-b]pyridazin-2-yl)-3-methylmorpholine;
(R)-4-(4-(1,5-dimethyl-1H-pyrazol-4-yl)-7-(1H-pyrazol-5-yl)imidazo[1,5-b]pyridazin-2-yl)-3-methylmorpholine;
(R)-3-methyl-4-(4-(1-methyl-1H-imidazol-5-yl)-7-(1H-pyrazol-5-yl)imidazo[1,5-b]pyridazin-2-yl)morpholine;
(R)-4-(4-(1,3-dimethyl-1H-pyrazol-4-yl)-7-(1H-pyrazol-5-yl)imidazo[1,5-b]pyridazin-2-yl)-3-methylmorpholine;
(R)-4-(4-(1,5-dimethyl-1H-1,2,3-triazol-4-yl)-7-(1H-pyrazol-5-yl)imidazo[1,5-b]pyridazin-2-yl)-3-methylmorpholine;
(R)-4-(4-(1-(2-fluoroethyl)-1H-pyrazol-5-yl)-7-(1H-pyrazol-5-yl)imidazo[1,5-b]pyridazin-2-yl)-3-methylmorpholine;
(R)-4-(4-(1-(2-fluoroethyl)-1H-pyrazol-3-yl)-7-(1H-pyrazol-5-yl)imidazo[1,5-b]pyridazin-2-yl)-3-methylmorpholine;
(R)-4-(4-(1-(difluoromethyl)-1H-pyrazol-5-yl)-7-(1H-pyrazol-5-yl)imidazo[1,5-b]pyridazin-2-yl)-3-methylmorpholine; and
(R)-4-(4-(1-(difluoromethyl)-1H-pyrazol-3-yl)-7-(1H-pyrazol-5-yl)imidazo[1,5-b]pyridazin-2-yl)-3-methylmorpholine;

or a stereoisomer, a tautomer, a hydrate, a solvate or a pharmaceutically acceptable salt thereof, or a mixture thereof.

\* \* \* \* \*